US009934624B2

(12) United States Patent
Lewis et al.

(10) Patent No.: US 9,934,624 B2
(45) Date of Patent: Apr. 3, 2018

(54) METHOD AND SYSTEM FOR PROVIDING DIAGNOSTIC FILTER LISTS

(71) Applicant: Snap-on Incorporated, Kenosha, WI (US)

(72) Inventors: Bradley R. Lewis, Gilroy, CA (US); Patrick S. Merg, Hollister, CA (US); Roy S. Brozovich, Campbell, CA (US); Jacob G. Foreman, San Jose, CA (US); Joshua C. Covington, San Juan Bautista, CA (US); Brett A. Kelley, San Jose, CA (US); Steven E. Miskovic, Gilberts, IL (US)

(73) Assignee: Snap-on Incorporated, Kenosha, WI (US)

(*) Notice: Subject to any disclaimer, the term of this patent is extended or adjusted under 35 U.S.C. 154(b) by 0 days.

(21) Appl. No.: 15/236,123

(22) Filed: Aug. 12, 2016

(65) Prior Publication Data

US 2018/0047223 A1 Feb. 15, 2018

(51) Int. Cl.
*G01M 17/00* (2006.01)
*G07C 5/08* (2006.01)
(Continued)

(52) U.S. Cl.
CPC ..... *G07C 5/0808* (2013.01); *G06F 17/30876* (2013.01); *G07C 5/008* (2013.01)

(58) Field of Classification Search
CPC .. G07C 5/0808; G07C 5/008; G06F 17/30876
See application file for complete search history.

(56) References Cited

U.S. PATENT DOCUMENTS 5,058,044 A * 10/1991 Stewart .................. G07C 5/008
340/10.41
5,553,235 A 9/1996 Chen et al.
(Continued)

FOREIGN PATENT DOCUMENTS

DE 10235416 A1 * 2/2004 .......... G01M 13/028
EP 1079053 A2 * 2/2001 ........... B60R 25/245
(Continued)

OTHER PUBLICATIONS

Satnam et al., "Data-driven framework for detecting anomalies in field failure data," Year: 2011, pp. 1-14.*
(Continued)

*Primary Examiner* — Tuan C. To
(74) *Attorney, Agent, or Firm* — McDonnell Boehnen Hulbert & Berghoff LLP

(57) ABSTRACT

An example method for outputting a PID filter list (PFL) includes: receiving RO data from one or more ROs that indicate particular vehicle identifying information (PVII), at least one symptom identifier, and a particular vehicle component; determining, symptom-to-parameter-identifier (PID) mapping data (MD) based on the received RO data and component-to-PID MD; determining, based on the set of available PIDs for the SOV and the symptom-to-PID MD, a PFL, wherein the PFL is associated with the PVII and the at least one symptom identifier, and wherein the PFL indicates a symptom-based subset of PIDs from the set of available PIDs for the SOV; receiving, a request sent over a communication network from a display device, wherein the request comprises the PVII and the at least one symptom identifier; and transmitting, over the communication network to the display device, a response to the request, the response comprising the PFL.

28 Claims, 36 Drawing Sheets

(51) Int. Cl.
*G06F 17/30* (2006.01)
*G07C 5/00* (2006.01)

(56) References Cited

U.S. PATENT DOCUMENTS

| | | | | |
|---|---|---|---|---|
| 6,484,080 | B2 | 11/2002 | Breed | |
| 6,609,050 | B2 | 8/2003 | Li | |
| 6,609,051 | B2 | 8/2003 | Fiechter et al. | |
| 6,768,935 | B1 | 7/2004 | Morgan et al. | |
| 6,959,235 | B1 * | 10/2005 | Abdel-Malek | B61L 27/0094 340/988 |
| 7,020,546 | B2 | 3/2006 | Nagai et al. | |
| 7,082,359 | B2 | 7/2006 | Breed | |
| 7,379,801 | B2 | 5/2008 | Heffington | |
| 7,751,955 | B2 | 7/2010 | Chinnadurai et al. | |
| 7,953,530 | B1 | 5/2011 | Pederson et al. | |
| 8,024,084 | B2 | 9/2011 | Breed | |
| 8,036,788 | B2 | 10/2011 | Breed | |
| 8,055,403 | B2 | 11/2011 | Lowrey et al. | |
| 8,135,509 | B1 | 3/2012 | Thompson et al. | |
| 8,160,767 | B1 | 4/2012 | Thompson et al. | |
| 8,370,018 | B2 | 2/2013 | Andreasen et al. | |
| 8,433,472 | B2 | 4/2013 | Singh et al. | |
| 8,560,164 | B2 | 10/2013 | Nielsen et al. | |
| 8,666,588 | B2 | 3/2014 | Geilen et al. | |
| 9,117,319 | B2 * | 8/2015 | Chen | G07C 5/008 |
| 9,342,934 | B2 | 5/2016 | Chen | |
| 2002/0007237 | A1 | 1/2002 | Phung et al. | |
| 2002/0007289 | A1 | 1/2002 | Malin et al. | |
| 2002/0073000 | A1 | 6/2002 | Sage | |
| 2004/0172177 | A1 | 9/2004 | Nagai et al. | |
| 2005/0027403 | A1 | 2/2005 | Nagai | |
| 2006/0020477 | A1 * | 1/2006 | Retzbach | G06Q 30/016 705/1.1 |
| 2006/0030981 | A1 | 2/2006 | Robb et al. | |
| 2006/0136104 | A1 | 6/2006 | Brozovich et al. | |
| 2006/0142907 | A1 | 6/2006 | Cancilla et al. | |
| 2006/0184383 | A1 * | 8/2006 | Davis | G06Q 20/20 705/16 |
| 2007/0294003 | A1 * | 12/2007 | Underdal | G06N 5/02 701/32.1 |
| 2008/0161989 | A1 | 7/2008 | Breed | |
| 2008/0243488 | A1 | 10/2008 | Balmelli et al. | |
| 2009/0204287 | A1 * | 8/2009 | Blanz | G07C 5/008 701/31.4 |
| 2009/0259358 | A1 | 10/2009 | Andreasen | |
| 2010/0010702 | A1 * | 1/2010 | Gilbert | G06N 5/04 701/31.4 |
| 2010/0138701 | A1 | 6/2010 | Costantino | |
| 2011/0035094 | A1 | 2/2011 | Van Den Berg et al. | |
| 2013/0204485 | A1 | 8/2013 | Chen et al. | |
| 2013/0304278 | A1 | 11/2013 | Chen | |
| 2013/0304306 | A1 | 11/2013 | Selkirk et al. | |
| 2013/0317694 | A1 | 11/2013 | Merg et al. | |
| 2014/0025253 | A1 | 1/2014 | Rybak et al. | |
| 2014/0074344 | A1 * | 3/2014 | Amirpour | G07C 5/008 701/29.6 |
| 2014/0075356 | A1 | 3/2014 | Gray et al. | |
| 2014/0207515 | A1 | 7/2014 | Merg et al. | |
| 2014/0207771 | A1 * | 7/2014 | Merg | G06Q 10/20 707/731 |
| 2014/0277902 | A1 | 9/2014 | Koch | |
| 2014/0279707 | A1 | 9/2014 | Joshua et al. | |
| 2015/0121275 | A1 | 4/2015 | Marshall et al. | |
| 2015/0218872 | A1 | 8/2015 | Breed | |
| 2015/0371457 | A1 | 12/2015 | Bakfan et al. | |
| 2016/0071334 | A1 * | 3/2016 | Johnson | G06Q 10/20 701/29.1 |
| 2017/0098200 | A1 * | 4/2017 | Merg | G06Q 10/20 |
| 2017/0132576 | A1 * | 5/2017 | Merg | G06Q 10/20 |

FOREIGN PATENT DOCUMENTS

| | | | | | |
|---|---|---|---|---|---|
| GB | 2249398 | A | * | 5/1992 | G01R 31/007 |
| JP | 201221219 | | * | 11/2012 | |
| WO | 02/17118 | A2 | | 2/2002 | |
| WO | 2004/092918 | A2 | | 10/2004 | |
| WO | 2014/001799 | A1 | | 1/2014 | |

OTHER PUBLICATIONS

Hu et al., "The development of vehicle diagnostic system based on Android platform," Year: 2015, pp. 42047.*

Auterra, LLC, DashDyno SPD Automotive Computer, Feb. 21, 2011, http://www.auterraweb.com/ (1 page).

Jain, A.K., et al., Data Clustering: A Review, ACM Computing Surveys, vol. 31, No. 3, Sep. 1999, pp. 264-323 (60 pages).

Seyfert, Karl, OBD II Generic PID Diagnosis, Motor Magazine, Sep. 2007, Troy Michigan (7 pages).

Seyfert, Karl, "OBD II includes many helpful diagnostic trouble codes, designed to identify the possible causes of hundreds of potential system faults. But can it correctly identify a loose nut behind the wheel?", Motor Magazine, Oct. 2015, Troy, Michigan, pp. 4 and 6 (2 pages).

Seyfert, Karl, "OBD II's self-diagnostic capabilities have been a real boon to repair on many vehicles. But the systems on some early vehicles can really throw you a curve.", Motor Magazine, Jun. 2005, Troy, Michigan, pp. 6 and 8 (2 pages).

Müller, Tobias Carsten, et al., A Heuristic Approach for Offboard-Diagnostics in Advanced Automotive Systems, SAE World Congress 2009, Apr. 20, 2009, Detroit, MI, SAE Doc. No. 2009-01-1027 (9 pages).

Sankavaram, Chaitanya, et al., Event-driven Data Mining Techniques for Automotive Fault Diagnosis, 21st International Workshop on Principles of Diagnosis, Oct. 13-16, 2010, pp. 1-8 (8 pages).

Singh, Satnam, et al., Data-Driven Framework for Detecting Anomalies in Field Failure Data, Aerospace Conference, 2011 IEEE, updated Jan. 3, 2011, pp. 1-14 (14 pages).

Weyer, Jake, Identifix Leader Charts New Course, http://ratchetandwrench.com/core/pagetools.php?pageid=22705&url=%2FRatchetWrench%2FJanuary-2016%2FIdentifix-Leader-Charts-New-Course%2F . . . , Apr. 21, 2016 (2 pages).

Zhang, Yilu, et al., Remote Vehicle State of Health Monitoring and its Application to Vehicle No-Start Prediction, AUTEST 2009, Anaheim, CA, Sep. 2009, IEEE, pp. 88-93 (6 pages).

U.S. Appl. No. 15/236,060, inventors: Bradley R. Lewis, Patrick S. Merg, Roy S. Brozovich, Jacob G. Foreman, Joshua C. Covington, Brett A. Kelley, and Steven E. Miskovic; filed Aug. 12, 2016.

U.S. Appl. No. 15/815,574, inventors Bradley R. Lewis, Patrick S. Merg, Roy S. Brozovich, Jacob G. Foreman, Joshua C. Covington, Brett A. Kelley, and Steven E. Miskovic, filed Nov. 16, 2017.

U.S. Appl. No. 15/815,466, inventors Bradley R. Lewis, Patrick S. Merg, Roy S. Brozovich, Jacob G. Foreman, Joshua C. Covington, Brett A. Kelley, and Steven E. Miskovic, filed Nov. 16, 2017.

International Search Report, International Application No. PCT/US2017/046215, dated Nov. 22, 2017 (5 pages).

Written Opinion of the International Searching Authority, International Application No. PCT/US2017/046215, dated Nov. 22, 2017 (9 pages).

* cited by examiner

SYMPTOM 1 (P0171, P0101): PID19
SYMPTOM 2 (P0171, P0174): PID6
SYMPTOM 3 (FOULED SPARK PLUG): PID17
SYMPTOM 4 (P0174): PID12, PID19

71

SYMPTOM 1 (P0171, P0101): CT1, CT4
SYMPTOM 2 (P0171, P0174): CT1, CT4
SYMPTOM 3 (FOULED SPARK PLUG): NULL
SYMPTOM 4 (P0174): CT1, CT4

73

SYMPTOM 1 (P0171, P0101): FT5, FT6, FT7, FT8
SYMPTOM 2 (P0171, P0174): FT5, FT6, FT7, FT8
SYMPTOM 3 (FOULED SPARK PLUG): FT5, FT6, FT7, FT8
SYMPTOM 4 (P0174): FT5, FT6, FT7, FT8

75

SYMPTOM 1 (P0171, P0101): RP5
SYMPTOM 2 (P0171, P0174): RP5
SYMPTOM 3 (FOULED SPARK PLUG): NULL
SYMPTOM 4 (P0174): RP5
SYMPTOM 5 (THEFT DETERRENT – NO START): RP2, RP3

COMPONENT 1 (EGR VALVE): PID13, PID14, PID24
COMPONENT 2 (FUEL TANK): PID6, PID15, PID17
COMPONENT 3 (THERMOSTAT): PID3, PID27
COMPONENT 4 (VEHICLE SPEED SENSOR): PID9

72

COMPONENT 1 (EGR VALVE): CT1, CT4
COMPONENT 2 (FUEL TANK): CT1, CT4, CT5
COMPONENT 3 (THERMOSTAT): CT5, CT8, CT11
COMPONENT 4 (VEHICLE SPEED SENSOR): CT1, CT4
COMPONENT 5 (CATALYTIC CONVERTER): CT10

74

COMPONENT 1 (EGR VALVE): FT13, FT14
COMPONENT 2 (FUEL TANK): NULL
COMPONENT 3 (THERMOSTAT): FT3, FT4
COMPONENT 4 (VEHICLE SPEED SENSOR): NULL
COMPONENT 5 (CATALYTIC CONVERTER): NULL
COMPONENT 6 (FUEL PUMP): FT1

76

COMPONENT 1 (EGR VALVE): NULL
COMPONENT 2 (FUEL TANK): NULL
COMPONENT 3 (THERMOSTAT): NULL
COMPONENT 4 (VEHICLE SPEED SENSOR): NULL
COMPONENT 5 (CATALYTIC CONVERTER): NULL
COMPONENT 6 (FUEL PUMP): NULL
COMPONENT 7 (THEFT DETERRENT): RP2, RP3
COMPONENT 8 (ENGINE CONTROL ECU): RP5, RP10

PID1: 1 – Fuel System Status
PID2: 2 – Calculated Engine Load
PID3: 3 – Engine Coolant Temperature
PID4: 4 – Short Term Fuel Trim – Bank 1
PID5: 5 – Long Term Fuel Trim – Bank 1
PID6: 6 – Fuel Pressure
PID7: 7 – Intake Manifold Absolute Pressure
PID8: 8 – Engine RPM
PID9: 9 – Vehicle Speed
PID10: 10 – Timing Advance
PID11: 11 – Intake Air Temperature
PID12: 12 – MAF Air Flow Rate
PID13: 13 – Commanded EGR
PID14: 14 – EGR Error
PID15: 15 – Fuel Tank Level Input
PID16: 16 – Relative Throttle Position
PID17: 17 – Fuel Type
PID18: 18 – Evaporator System Vapor Pressure
PID19: 19 – Mass Air Flow Sensor
PID20: 20 – Intake Air Temperature Sensor
PID21: 21 – Fuel Injection Timing
PID22: 22 – Engine Oil Temperature
PID23: 23 – Boost Pressure Control
PID24: 24 – Exhaust Gas Recirculation Temperature
PID25: 25 – Turbocharger RPM
PID26: 26 – Wastegate Control
PID27: 27 – Engine Run Time
PID28: 28 - Fuel Pressure Control System
PID29: 29 – Engine Percent Torque Data
PID30: 30 – Injection Pressure Control System
PID31: 31 – Reserved
PID32: 32 – Reserved

COMPONENT TEST 1: 40 – FREQUENCY TEST
COMPONENT TEST 2: 41 – SIGNATURE TEST
COMPONENT TEST 3: 42 – OUT OF RANGE NO SIGNAL TEST
COMPONENT TEST 4: 43 – VOLTAGE TEST
COMPONENT TEST 5: 44 – CURRENT TEST
COMPONENT TEST 6: 45 – RESISTANCE TEST
COMPONENT TEST 7: 46 – CAPACITANCE TEST
COMPONENT TEST 8: 47 – TEMPERATURE TEST
COMPONENT TEST 9: 48 – PRESSURE TEST
COMPONENT TEST 10: 49 – TAIL PIPE EMISSION TEST
COMPONENT TEST 11: 50 – CONTINUITY TEST
COMPONENT TEST 12: 51 – RESERVED
COMPONENT TEST 13: 52 – RESERVED
COMPONENT TEST 14: 53 – RESERVED
COMPONENT TEST 15: 54 – RESERVED
COMPONENT TEST 16: 55 – RESERVED

Functional test 1: 60 – Fuel Pump Engagement
Functional test 2: 61 – Close Evaporator Canister Vent Valve
Functional test 3: 62 – Engine Cooling Fan High
Functional test 4: 63 – Engine Cooling Fan Low
Functional test 5: 64 – Fuel Injector #1 On
Functional test 6: 65 – Fuel Injector #2 On
Functional test 7: 66 – Fuel Injector #3 On
Functional test 8: 67 – Fuel Injector #4 On
Functional test 9: 68 – Fuel Injector #5 On
Functional test 10: 69 – Fuel Injector #6 On
Functional test 11: 70 – Fuel Injector #7 On
Functional test 12: 71 – Fuel Injector #8 On
Functional test 13: 72 – EGR Valve Open
Functional test 14: 73 – EGR Valve Closed
Functional test 15: 74 – Reserved
Functional test 16: 75 – Reserved

Reset Procedure 1: 80 – Oil Change Interval Reset
Reset Procedure 2: 81 – Vehicle Theft Deterrent Reset
Reset Procedure 3: 82 – Ignition Key Identifier Reset
Reset Procedure 4: 83 – VIN Learn Reset
Reset Procedure 5: 84 – Calibrate Engine Control ECU
Reset Procedure 6: 85 – Calibrate Anti-lock Brake ECU
Reset Procedure 7: 86 – Calibrate Traction Control ECU
Reset Procedure 8: 87 – Calibrate Airbag System ECU
Reset Procedure 9: 88 – Calibrate Powertrain Control ECU
Reset Procedure 10: 89 – Clear Engine Control ECU DTC
Reset Procedure 11: 90 – Clear Anti-lock Brake ECU DTC
Reset Procedure 12: 91 - Clear Traction Control ECU DTC
Reset Procedure 13: 92 - Clear Airbag System ECU DTC
Reset Procedure 14: 93 - Clear Powertrain Control ECU DTC
Reset Procedure 15: 94 – Reserved
Reset Procedure 16: 95 – Reserved

| | | | |
|---|---|---|---|
| RTR Car Repair, Tuscaloosa, Alabama | February 18, 2009 | Part Description | Part # | Price |

RTR Car Repair, Tuscaloosa, Alabama    February 18, 2009

Customer: C. N. Saban    VIN: 1GYSP74WXVR123456

Vehicle: 1997 Ford Crown Vic. 4.6L, V8, (W), Auto Trans.

Complaint: Failed emissions test. Check engine light on. Change oil and filter.

Service procedure:

| | Time | Rate | Cost | Part Description | Part # | Price |
|---|---|---|---|---|---|---|
| Check DTC – P0171 and P0174. (C45) | 0.3 | $100 | $30 | MAF sensor | 6012980 | $89.99 |
| Check system vacuum and fuel pressures 30/40 PSI. (C117, C245) MAF readings bad. (C772) | 0.5 | $100 | $50 | Oil Filter | 6043011 | $19.99 |
| Cleaned MAF, retested, replaced bad MAF. Verify repair. (C415, R550) | 1.0 | $100 | $100 | ECT sensor | 6563772 | $73.99 |
| Change engine oil and filter. (C085) | 0.2 | $100 | $20 | | | |
| Lubricate chassis. (C086) | 0.5 | $50 | $25 | | | |
| Check DTC. Diagnose DTC 117. (C100) | 0.2 | $50 | $10 | | | |
| Coolant sensor short. R/R coolant sensor. (R199) | 0.4 | $100 | $40 | | | |
| | 0.4 | $100 | $40 | | | |
| Verify repair. (V18) | 0.2 | $100 | $20 | | | |

Sub-total $183.97

Labor $335.00

Tax $51.90

Total $570.87

Mileage: 23,411

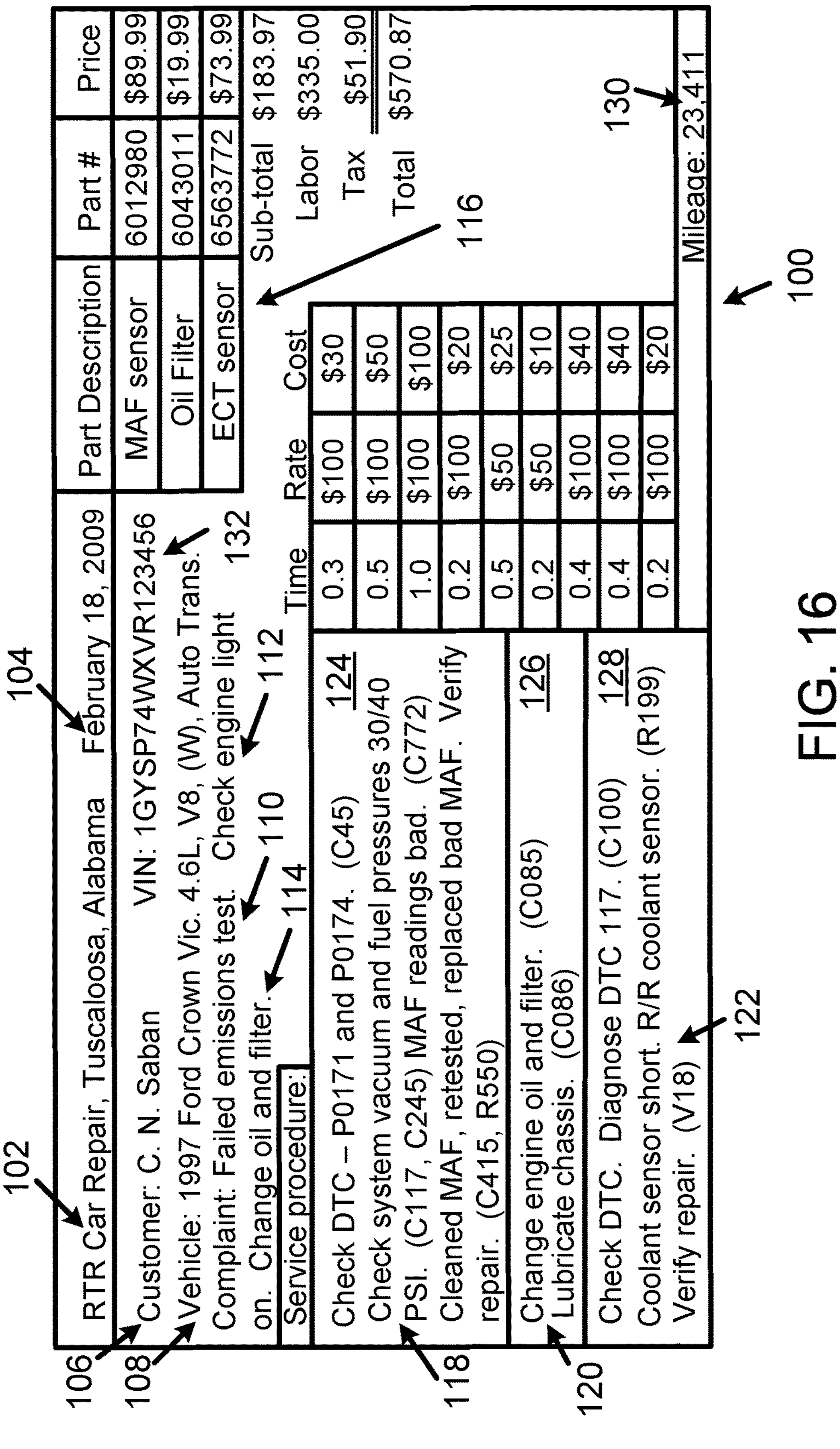

FIG. 16

| | PID | PID VALUES | DTCs |
|---|---|---|---|
| Vehicle 1 – | PID 6: | 37, 39, 40, 37, 40 | Inactive |
| Vehicle 2 – | PID 6: | 39, 40, 41, 39, 39, 40 | Inactive |
| Vehicle 3 – | PID 6: | 35, 35, 38, 39, 38 | Inactive |
| . . . . . . . – | PID 6: | . . . . . . . . . . . . . . . . . . . | Inactive |
| Vehicle X – | PID 6: | 38, 39, 40, 37, 39, 40 | Inactive |
| 251 | 253 | 255 | 257 |

| | PID | PID VALUES | DTCs |
|---|---|---|---|
| Vehicle 1 – | PID 6: | 27, 29, 26, 25, 23 | DTCs: 5, 9 |
| Vehicle 2 – | PID 6: | 29, 26, 26, 24, 22, 24 | DTCs: 5, 9 |
| Vehicle 3 – | PID 6: | 28, 25, 24, 26, 26 | DTCs: 5, 9 |
| . . . . . . . – | PID 6: | . . . . . . . . . . . . . . . . . . . | DTCs: 5, 9 |
| Vehicle Y – | PID 6: | 28, 27, 24, 24, 25, 26 | DTCs: 5, 9 |
| 259 | 253 | 261 | 263 |

FIG. 22

Engine (Gasoline)

- Electrical system
  - ❖ Ignition sub-system
    - ❑ Coil
    - ❑ Spark Plug
  - ❖ Charging sub-system
    - ❑ Alternator
    - ❑ Battery
    - ❑ Voltage Regulator
- Exhaust system
  - ❑ Catalytic Converter
  - ❑ EGR Valve
  - ❑ Oxygen Sensor
  - ❑ Turbocharger Boost Pressure Sensor
- Fuel system
  - ❑ Fuel Filter
  - ❑ Fuel Pump
  - ❑ Fuel Rail
  - ❑ Fuel Tank Level sending unit
- Intake System
  - ❑ Mass Airflow Sensor
  - ❑ PCV Hose
  - ❑ PCV Valve

METHOD AND SYSTEM FOR PROVIDING DIAGNOSTIC FILTER LISTS

BACKGROUND

Most vehicles are serviced at least once during their useful life. In many instances, a vehicle is serviced at a facility with professional mechanics (e.g., technicians). The technicians can use any of a variety of non-computerized hand tools to service (e.g., repair) any of the wide variety of mechanical components on a vehicle. While servicing a vehicle, a technician sometimes needs information for diagnosing and/or repairing the vehicle, and for post-repair activities performed to the repaired vehicle. Such technician may use a vehicle information system that provides parameter identifier (PID) values. With hundreds of PIDs being available for each of hundreds of different types of vehicles, the technician may not know which PIDs are applicable or helpful for diagnosing a particular symptom for a particular vehicle. This may lead to a technician guessing which PIDs should be requested to diagnose the symptom. If the technician guesses incorrectly, the technician may not see PID values that would lead to a quicker and more accurate diagnosis of the symptom. In that situation or in another situation, the technician does not have the ability to obtain a filtered list of PID values based on repair order data, past user selection of PID values and/or anomalous PID values.

Overview

Several example embodiments that relate to diagnostic lists, such as a PID filter list, a component test filter list, a functional test filter list, and/or a reset procedure filter list are described herein. Some of the example embodiments pertain to determining a diagnostic filter list, providing a diagnostic filter list for displaying on a display device, and/or displaying a diagnostic filter list.

Viewed from one aspect, an example embodiment takes the form of a method at a server for outputting a PID filter list, comprising: (i) receiving, at a server, repair order (RO) data, wherein the RO data comprises data from one or more ROs that indicate particular vehicle identifying information, at least one symptom identifier, and a particular vehicle component, (ii) determining, at the server, symptom-to-PID mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier, (iii) determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles, (iv) receiving, at the server, a request sent over a communication network from a display device, wherein the request comprises the particular vehicle identifying information and the at least one symptom identifier, and (v) transmitting, by the server over the communication network to the display device, a response to the request, the response comprising the PID filter list.

Viewed from another aspect, an example embodiment takes the form of a server comprising: a network communication interface for communicating with a display device over a communication network, and at least one processor coupled to network communication interface and programmed to: (i) receive, at the server, RO data, wherein the RO data comprises data from one or more ROs that indicate particular vehicle identifying information, at least one symptom identifier, and a particular vehicle component, (ii) determine, at the server, symptom-to-PID mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier, (iii) determine, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles, (iv) receive, at the server, a request sent over a communication network from a display device, wherein the request comprises the particular vehicle identifying information and the at least one symptom identifier; and (v) transmit, by the server over the communication network to the display device, a response to the request, the response comprising the PID filter list.

Viewed from yet another aspect, an example embodiment takes the form of a non-transitory computer-readable memory having stored therein instructions executable by one or more processors to cause a server to perform functions comprising: (i) receiving, at the server, RO data, wherein the RO data comprises data from one or more ROs that indicate particular vehicle identifying information, at least one symptom identifier, and a particular vehicle component, (ii) determining, at the server, symptom-to-PID mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier, (iii) determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles, (v) receiving, at the server, a request sent over a communication network from a display device, wherein the request comprises the particular vehicle identifying information and the at least one symptom identifier, and (v) transmitting, by the server over the communication network to the display device, a response to the request, the response comprising the PID filter list.

Viewed from yet another aspect, an example embodiment takes the form of a method for outputting a PID filter list, comprising: (i) receiving, at a server, a first set of PID values and a second set of PID values, wherein the first set of PID values are for a particular PID from a first set of vehicles with all diagnostic trouble codes (DTCs) for a particular electronic control unit (ECU) within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information, (ii) determining, by the server from among the first set of PID values, a range of PID values for the particular PID, (iii) determining, by the server from among the second set of PID values, one or more PID values for the particular PID is outside of the range of PID values for the particular PID by a threshold value, (iv) adding, by the server, the particular PID to a PID filter list in response to determining the one or more PID values for the particular PID is outside of the range of PID values for the particular PID by the threshold value, (v) receiving, at the server, a request sent over a communication network from a display device, wherein the request comprises the particular vehicle identifying information and the particular DTC, (vi) retrieving, by the server based on the particular vehicle identifying information and the particular DTC received in the request, the PID filter list, and (vii) transmitting, by the server over the communication network to the display device, a response to the request, the response comprising the PID filter list.

Viewed from yet another aspect, an example embodiment takes the form of a server comprising: a network communication interface for communicating with a display device over a communication network, and at least one processor coupled to network communication interface and programmed to: (i) receive, at the server, a first set of PID values and a second set of PID values, wherein the first set of PID values are for a particular PID from a first set of vehicles with all DTC for a particular ECU within each vehicle of the set of vehicles set to inactive, wherein the second set of PID values are for the particular PID from a second set of vehicles with one or more particular DTC for the particular ECU within each vehicle of the second set of vehicles set to active, and wherein the first set of vehicles and the second set of vehicles are identifiable by particular vehicle identifying information, (ii) determine, by the server from among the first set of PID values, a range of PID values for the particular PID, (iii) determine, by the server from among the second set of PID values, one or more PID values for the particular PID is outside of the range of PID values for the particular PID by a threshold value, (iv) add, by the server, the particular PID to a PID filter list in response to determining the one or more PID values for the particular PID is outside of the range of PID values for the particular PID by the threshold value, (v) receive, at the server, a request sent over the communication network from a display device, wherein the request comprises the particular vehicle identifying information and the particular DTC, (vi) retrieve, by the server based on the particular vehicle identifying information and the particular DTC received in the request, the PID filter list, and (vii) transmit, by the server over the communication network to the display device, a response to the request, the response comprising the PID filter list.

Viewed from yet another aspect, an example embodiment takes the form of a non-transitory computer-readable memory having stored therein instructions executable by one or more processors to cause a server to perform functions comprising: (i) receive, at the server, a first set of PID values and a second set of PID values, wherein the first set of PID values are for a particular PID from a first set of vehicles with all diagnostic trouble code (DTC) for a particular ECU within each vehicle of the set of vehicles set to inactive, wherein the second set of PID values are for the particular PID from a second set of vehicles with one or more particular DTC for the particular ECU within each vehicle of the second set of vehicles set to active, and wherein the first set of vehicles and the second set of vehicles are identifiable by particular vehicle identifying information, (ii) determine, by the server from among the first set of PID values, a range of PID values for the particular PID, (iii) determine, by the server from among the second set of PID values, one or more PID values for the particular PID is outside of the range of PID values for the particular PID by a threshold value, (iv) add, by the server, the particular PID to a PID filter list in response to determining the one or more PID values for the particular PID is outside of the range of PID values for the particular PID by the threshold value, (v) receive, at the server, a request sent over a communication network from a display device, wherein the request comprises the particular vehicle identifying information and the particular DTC, (vi) retrieve, by the server based on the particular vehicle identifying information and the particular DTC received in the request, the PID filter list, and (vii) transmit, by the server over the communication network to the display device, a response to the request, the response comprising the PID filter list.

Viewed from yet another aspect, an example embodiment takes the form of a method for providing a modified PID filter list to a display device, comprising: (i) receiving, at a server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit, (ii) transmitting, by the server over the communication network to the first display device, a response to the first request, the response to the first request comprising a PID filter list, (iii) determining, by the server, the first display device requested from the first vehicle for display by the first display device an additional PID not included within the PID filter list, (iv) generating, by the server, a modified PID filter list by adding the additional PID to the PID filter list, (v) receiving, at the server after generating the modified PID filter list, a next request sent over the communication network from a second display device, wherein the next request comprises the particular vehicle identifying information and the at least one symptom identifier, and (vi) transmitting, by the server over the communication network to the second display device, a response to the next request, the response to the next request comprising the modified PID filter list.

Viewed from yet another aspect, an example embodiment takes the form of a server comprising: a network communication interface for communicating with a display device over a communication network, and at least one processor coupled to network communication interface and programmed to: (i) receive, at a server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit, (ii) transmit, by the server over the communication network to the first display device, a response to the first request, the response to the first request comprising a PID filter list, (iii) determine, by the server, the first display device requested from the first vehicle for display by the first display device an additional PID not included within the PID filter list, (iv) generate, by the server, a modified PID filter list by adding the additional PID to the PID filter list, (v) receive, at the server after generating the modified PID filter list, a next request sent over the communication network from a second display device, wherein the next request comprises the particular vehicle identifying information and the at least one symptom identifier, and (vi) transmit, by the server over the communication network to the second display device, a response to the next request, the response to the next request comprising the modified PID filter list.

Viewed from yet another aspect, an example embodiment takes the form of a non-transitory computer readable memory having stored therein instructions executable by one or more processors to cause a server to perform functions comprising: (i) receive, at the server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit, (ii) transmit, by the server over the communication network to the first display device, a response to the first request, the response to the first request comprising a PID filter list, (iii) determine, by the server, the first display device requested from the first vehicle for display by the first display device an additional PID not included within the PID filter list, (iv) generate, by the server, a modified PID filter list by adding the additional PID to the PID filter list, (v) receive, at the server after generating the modified PID filter list, a next request sent over the communication network from a second display device, wherein the next request comprises the particular vehicle identifying information and the at least one symptom identifier, and (vi) transmit, by the server over the communication network to the second display device, a response to the next request, the response to the next request comprising the modified PID filter list.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 9 is a diagram showing example mapping data in accordance with the example embodiments.

FIG. 11 is a diagram showing example mapping data in accordance with the example embodiments.

FIG. 12 shows an example PID index.

FIG. 13 shows an example component test index.

FIG. 14 shows an example functional test index.

FIG. 15 shows an example reset procedure index.

FIG. 16 shows an example repair order.

FIG. 22 is a diagram showing example PIDs and PID values communicated by vehicles.

FIG. 35 shows an example of component hierarchy data.

DETAILED DESCRIPTION

This description describes several example embodiments, at least some which pertain to determining a diagnostic list and/or providing the diagnostic list to a display device configured to display the diagnostic list. The diagnostic list can comprise a diagnostic filter list. The diagnostic filter list can comprise a PID filter list, a component test filter list, a functional test filter list, and/or a reset procedure filter list. The display device is operable to display the diagnostic list. A diagnostic filter list can be applicable to a set of vehicles and a symptom exhibited by a vehicle within the set of vehicles. A diagnostic filter list can be based on other criteria as well. In the foregoing examples, the diagnostic filter list is contextually relevant to the set of vehicles, symptom, and/or other criteria. The display device can be connected to the vehicle exhibiting the symptom in order to display PID data values from the vehicle for PIDs that the server has determined to be most applicable to the set of vehicles and the symptom. The display device may also display component tests, functional tests, and/or reset procedures that the server has determined to be most applicable to the set of vehicles and the symptom. The display device may then cause selected component tests, functional tests, and/or reset procedures to be performed on the vehicle.

Figure 1:
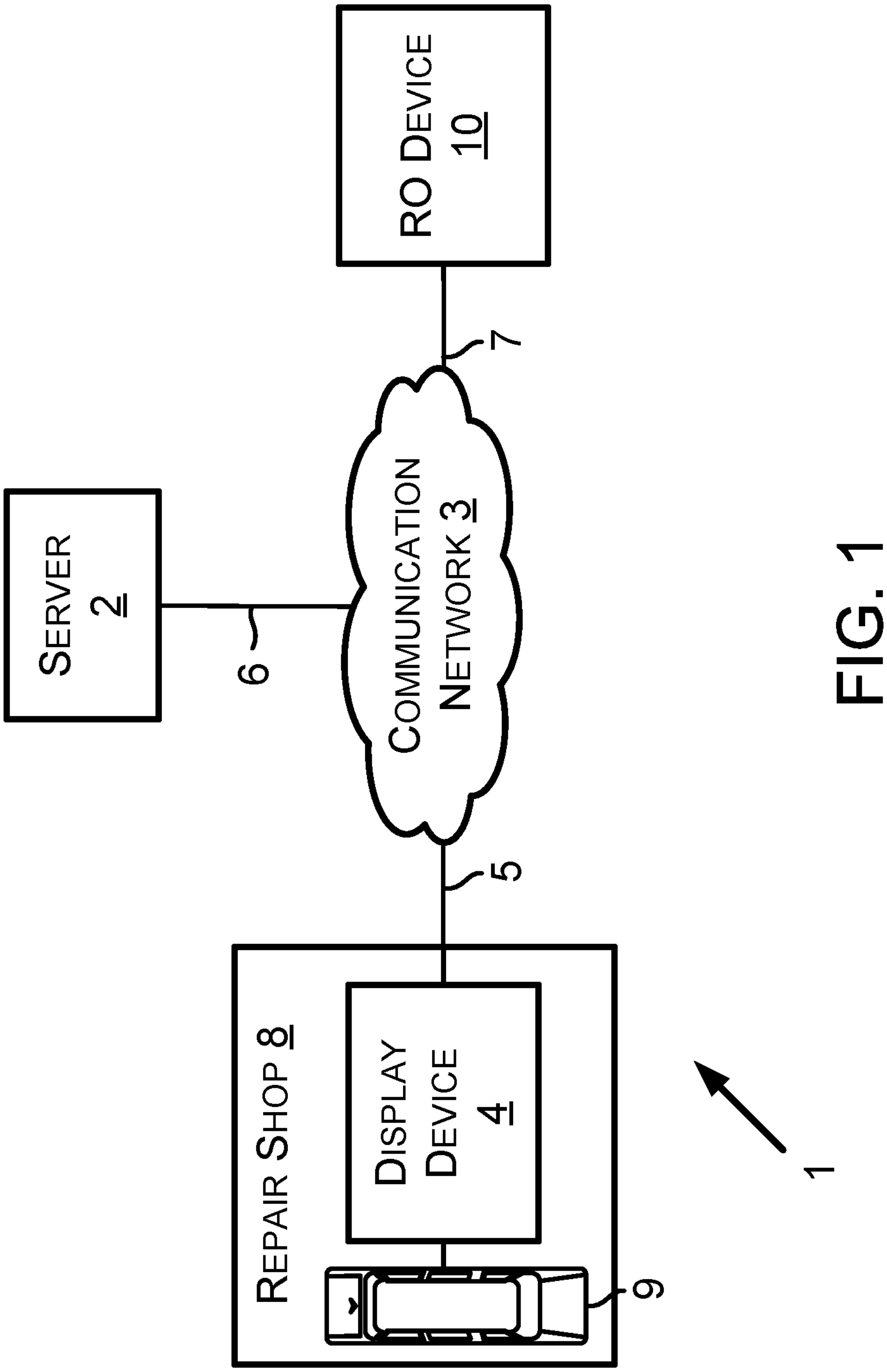
FIG. 1 is a diagram showing an example operating environment in which the example embodiments can operate.

FIG. 1 is a diagram showing an example operating environment 1 in which the example embodiments can operate. The operating environment 1 includes a server 2, a communication network 3, a display device 4, communication links 5, 6, and 7, a repair shop 8, a vehicle 9, and a repair order (RO) device 10. The RO device 10 is configured to generate and provide ROs to the server 2. The RO device 10 is operable within and/or outside of the repair shop 8.

The communication network 3 can comprise the communication links 5, 6, and 7 as well as other communication links (not shown). The communication network 3 and the communication links 5, 6, and 7 can include various network components such as switches, modems, gateways, antennas, cables, transmitters, and/or receivers. The communication network 3 can comprise a wide area network (WAN). The WAN can carry data using packet-switched and/or circuit-switched technologies. The WAN can include an air interface or wire to carry the data. The communication network 3 can comprise a network or at least a portion of a network that carries out communications using a Transmission Control Protocol (TCP) and the Internet Protocol (IP), such as the communication network commonly referred to as the Internet.

The repair shop 8 can comprise a variety of shop tools, such as brake lathes, wheel alignment machines, wheel balancers, and/or diagnostic devices for diagnosing vehicles. A shop tool can comprise the display device 4. As shown in FIG. 1, the display device 4 is located within the repair shop 8. The display device 4, however, can operate inside and/or outside of the repair shop 8. For example, the display device 4 can be used within the vehicle 9 as the vehicle 9 is driven on a road outside of the repair shop 8 for any of a variety of purposes. The server 2 can be scaled so as to be able to serve any number of display devices, such as one display device (as shown in FIG. 1), one hundred display devices, one thousand display devices, or some other number of display devices.

A vehicle, such as vehicle 9, is a mobile machine that can be used to transport a person, people, or cargo. As an example, any vehicle discussed herein can be driven and/or otherwise guided along a path (e.g., a paved road or otherwise) on land, in water, or in the air or outer space. As another example, any vehicle discussed herein can be wheeled, tracked, railed, or skied. As yet another example, any vehicle discussed herein can include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle discussed herein can include or use any appropriate voltage or current source, such as a battery, an alternator, a fuel cell, and the like, providing any appropriate current or voltage, such as about 12 volts, about 42 volts, and the like. As still yet another example, any vehicle discussed herein can include or use any desired system or engine. Those systems or engines can include items that use fossil fuels, such as gasoline, natural gas, propane, and the like, electricity, such as that generated by a battery, magneto, fuel cell, solar cell and the like, wind and hybrids or combinations thereof. As still yet another example, any vehicle discussed herein can include an ECU, a data link connector (DLC), and a vehicle communication link that connects the DLC to the ECU.

A vehicle manufacturer can build various quantities of vehicles each calendar year (i.e., January 1$^{st}$ to December 31$^{st}$). In some instances, a vehicle manufacturer defines a model year for a particular vehicle model to be built. The model year can start on a date other than January 1$^{st}$ and/or can end on a date other than December 31$^{st}$. The model year can span portions of two calendar years. A vehicle manufacturer can build one vehicle model or multiple different vehicle models. Two or more different vehicle models built by a vehicle manufacturer during a particular calendar year can have the same of different defined model years. The vehicle manufacturer can build vehicles of a particular vehicle model with different vehicle options. For example, the particular vehicle model can include vehicles with six-cylinder engines and vehicles with eight-cylinder engines. The vehicle manufacturer or another entity can define vehicle identifying information for each vehicle built by the vehicle manufacturer. Particular vehicle identifying information identifies particular sets of vehicles (e.g., all vehicles of a particular vehicle model for a particular vehicle model year or all vehicles of a particular vehicle model for a particular vehicle model year with a particular set of one or more vehicle options).

As an example, the particular vehicle identifying information can comprise indicators of characteristics of the vehicle such as when the vehicle was built (e.g., a vehicle model year), who built the vehicle (e.g., a vehicle make (i.e., vehicle manufacturer)), marketing names associated with vehicle (e.g., a vehicle model name, or more simply "model"), and features of the vehicle (e.g., an engine type). In accordance with that example, the particular vehicle identifying information can be referred to by an abbreviation YMME or Y/M/M/E, where each letter in the order shown represents a model year identifier, vehicle make identifier, vehicle model name identifier, and engine type identifier, respectively, or an abbreviation YMM or Y/M/M, where each letter in the order shown represents a model year identifier, vehicle make identifier, and vehicle model name identifier, respectively. An example Y/M/M/E is 2004/Toyota/Camry/4Cyl, in which "2004" represents the model year the vehicle was built, "Toyota" represents the name of the vehicle manufacturer Toyota Motor Corporation, Aichi Japan, "Camry" represents a vehicle model built by that manufacturer, and "4Cyl" represents a an engine type (i.e., a four cylinder internal combustion engine) within the vehicle. A person skilled in the art will understand that other features in addition to or as an alternative to "engine type" can be used to identify a vehicle using particular vehicle identifying information. These other features can be identified in various manners, such as a regular production option (RPO) code, such as the RPO codes defined by the General Motors Company LLC, Detroit Mich.

A vehicle communication link within a vehicle can include one or more conductors (e.g., copper wire conductors) or can be wireless. As an example, a vehicle communication link can include one or two conductors for carrying vehicle data messages in accordance with a vehicle data message (VDM) protocol. A VDM protocol can include a Society of Automotive Engineers (SAE) J1850 (PWM or VPW) VDM protocol, an International Organization of Standardization (ISO) 15764-4 controller area network (CAN) VDM protocol, an ISO 9141-2 K-Line VDM protocol, an ISO 14230-4 KWP2000 K-Line VDM protocol, or some other protocol presently defined for performing communications within a vehicle.

An ECU can control various aspects of vehicle operation or components within a vehicle. For example, the ECU can include a powertrain (PT) system ECU, an engine control module (ECM) ECU, a supplemental inflatable restraint (SIR) system (i.e., an air bag system) ECU, an entertainment system ECU, or some other ECU. The ECU can receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within a vehicle. Performance of a functional test can or a reset procedure with respect to an ECU can comprise the display device 4 transmitting a VDM to a vehicle. A VDM received an ECU can comprise a PID request. A VDM transmitted by an ECU can comprise a response comprising the PID and a PID data value for the PID.

Figure 2:
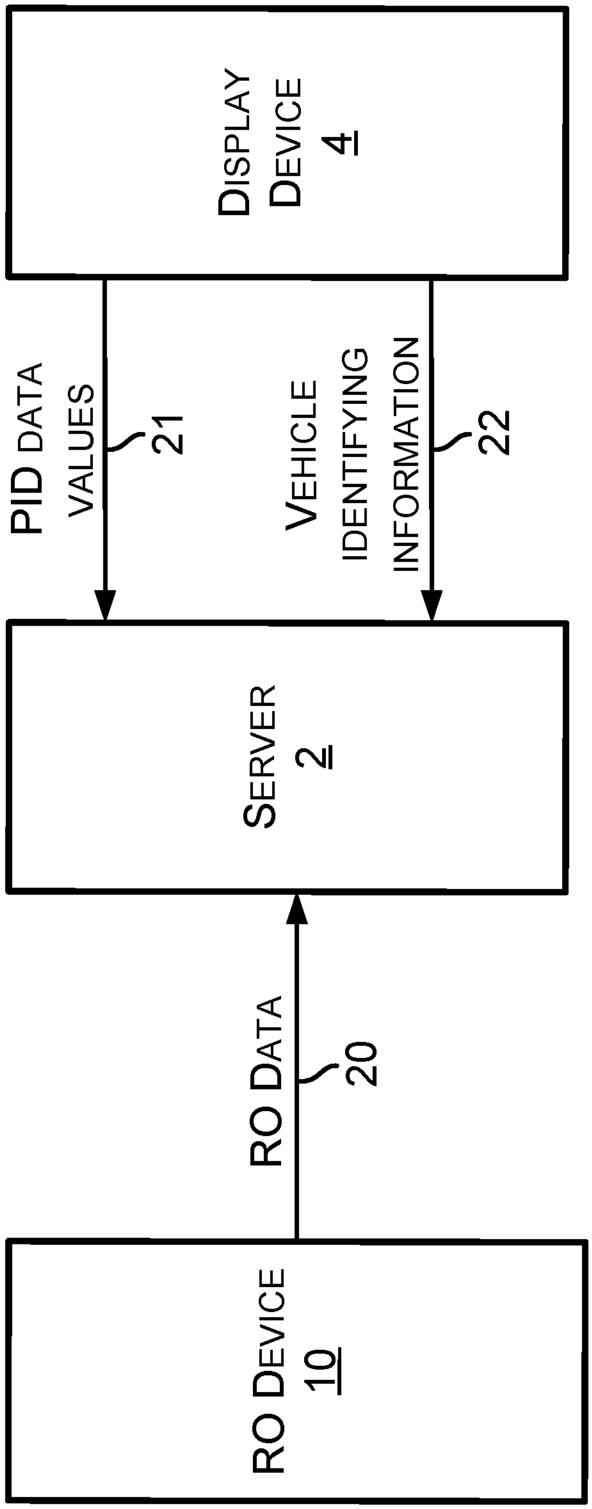
FIG. 2 is a communication flow diagram.

Next, FIG. 2 is a communication flow diagram showing an example communication 20 that occurs between the RO device 10 and the server 2. The communication 20 comprises RO data transmitted by the RO device 10 across the communication network 3. In one respect, the RO device 10 can generate some or all of the RO data transmitted to the server 2. In another respect, some or all of the RO data transmitted to the server 2 can be generated at a device remote from the RO device 10 and provided from the remote device to the RO device 10. The remote device can comprise the display device 4, the vehicle 9 or some other remote device that produces data for including on an RO. The communication 20 can occur in response to a request for RO transmitted by the server 2 to the RO device 10 over the communication network 3. The communication 20 can comprise RO data from one RO or multiple RO. The communication 20 can comprise a separate communication from multiple repair shops 8 with RO data. FIG. 16, which is described below, shows examples of RO data that can be transmitted to the server 2 via the communication 20.

FIG. 2 also shows example communications 21 and 22 that occur between the display device 4 and the server 2. The communication 21 comprises PID data values, PIDs that identify what the PID data values represent, and information regarding a state of the particular vehicle that is the source of the PID data values. The communication 22 comprises vehicle identifying information that identifies the particular vehicle that is the source of the PID data values within the communication 21. The information regarding the state of the particular vehicle can include information that indicates whether an ECU that is the source of the PID data values within the particular vehicle has any DTC active or inactive. The server 2 can determine baseline values for PIDs using the PID data values provided from the particular vehicle and from other vehicles that are identifiable by the same vehicle identifying information provided in the communication 22.

Figure 3:
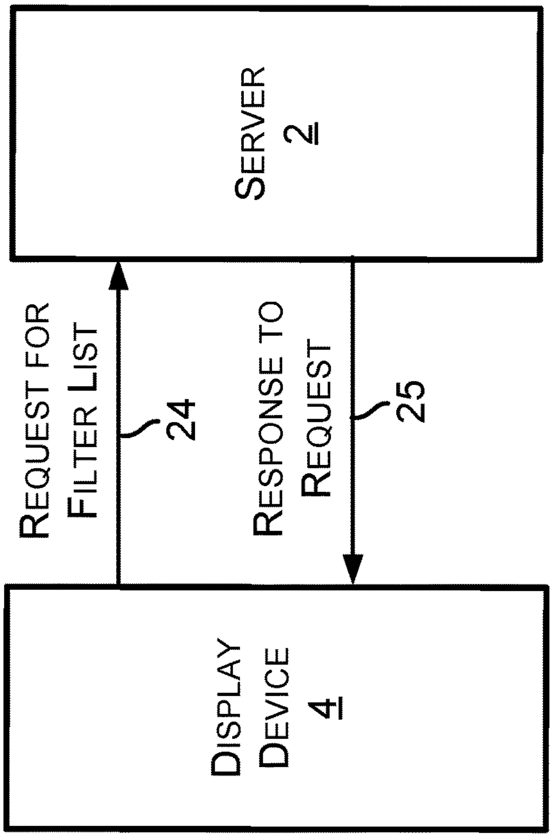
FIG. 3 is another workflow diagram.

Next, FIG. 3 illustrates an example workflow between a display device and a server. More specifically, display device 4 may communicate with server 2 to assist a technician with the servicing of vehicle 9. Display device 4 may send a request 24 for a diagnostic filter list over a communication network to server 2. The request 24 may include information describing one or more symptoms of vehicle 9. Server 2 may transmit a response 25 to the request 24 back to the display device 4. The response 25 to the request 24 may include the requested diagnostic filter list. In general, a diagnostic filter list may be generated by server 2 to filter data or information displayed on a display interface of display device 4. For example, server 2 may provide to display device 4 an indication of which pieces of data or information are most likely to be pertinent for a technician given the one or more symptoms of vehicle 9. As such, the response 25 to request 24 provided by server 2 may allow the display device 4 to display contextually relevant pieces of data or information about vehicle 9 to a technician, where the context is based on the one or more symptoms of vehicle 9.

Figure 4:
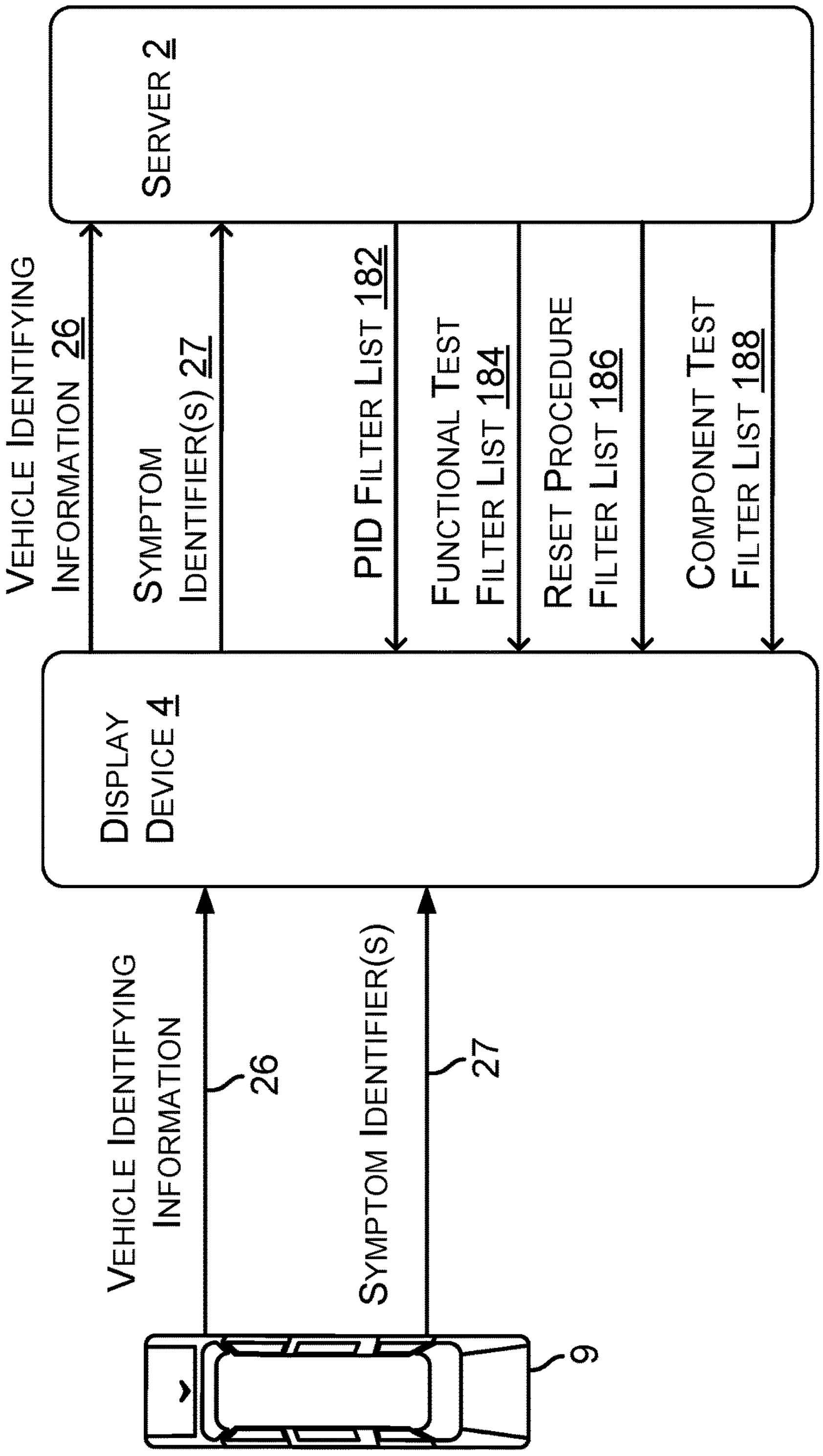
FIG. 4 is another workflow diagram.

Next, FIG. 4 illustrates an example workflow between a vehicle, a display device, and a server. In one example embodiment, display device 4 may initially collect information from vehicle 9 before communicating with server 2. In particular, display device 4 may receive vehicle identifying information 26 and one or more symptom identifiers 27 from vehicle 9. As previously described, vehicle identifying information 26 may include characteristics of vehicle 9, such as the year, make, model, and engine. In some examples, the one or more symptom identifiers 27 may be one or more diagnostic trouble codes (DTCs). In other examples, the one or more symptom identifiers 27 may be one or more non-DTC symptom identifiers (such as, "engine misfire," "misfire," or "engine no start," or "no start." A non-DTC symptom identifier identifies a symptom other than by a DTC. In still other examples, the one or more symptom identifiers 27 may be one or more DTCs and one or more non-DTC symptom identifiers. Moreover, any symptom identifier discussed within this application (including any one or more symptom identifiers and/or at least one symptom identifier) may be (i) one or more DTCs, (ii) one or more non-DTC symptom identifiers, or (iii) one or more DTCs and one or more non-DTC symptom identifiers. In further examples, vehicle identifying information 26 and/or the one or more symptom identifiers 27 may be received by display device 4 from a different source besides vehicle 9.

Display device 4 may transmit the vehicle identifying information 26 and the one or more symptom identifiers 27 to server 2. Server 2 may process the vehicle identifying information 26 and the one or more symptom identifiers 27 in order to determine one or more contextually relevant diagnostic filter lists to provide back to display device 4. In particular, server 2 may provide any combination of PID filter list 182, functional test filter list 184, reset procedure filter list 186, and component test filter list 188.

PID filter list 182 may indicate contextually relevant PIDs for the vehicle 9 with vehicle identifying information 26 and symptoms corresponding to the one or more symptom identifiers 27. Functional test filter list 184 may indicate contextually relevant functional tests for the vehicle 9 with vehicle identifying information 26 and symptoms corresponding to the one or more symptom identifiers 27. Reset procedure filter list 186 may indicate contextually relevant reset procedures for the vehicle 9 with vehicle identifying information 26 and symptoms corresponding to the one or more symptom identifiers 27. Component test filter list 188 may indicate contextually relevant component tests for the vehicle 9 with vehicle identifying information 26 and symptoms corresponding to the one or more symptom identifiers 27.

After receiving one or more diagnostic filter lists from server 2, display device 4 may use the one or more diagnostic filter lists to determine and display contextually relevant subsets of data or information to a technician. In particular, display device 4 may display a symptom-based subset of PIDs, a symptom-based subset of functional tests, a symptom-based subset of reset procedures, and/or a symptom-based subset of component tests.

Figure 5:
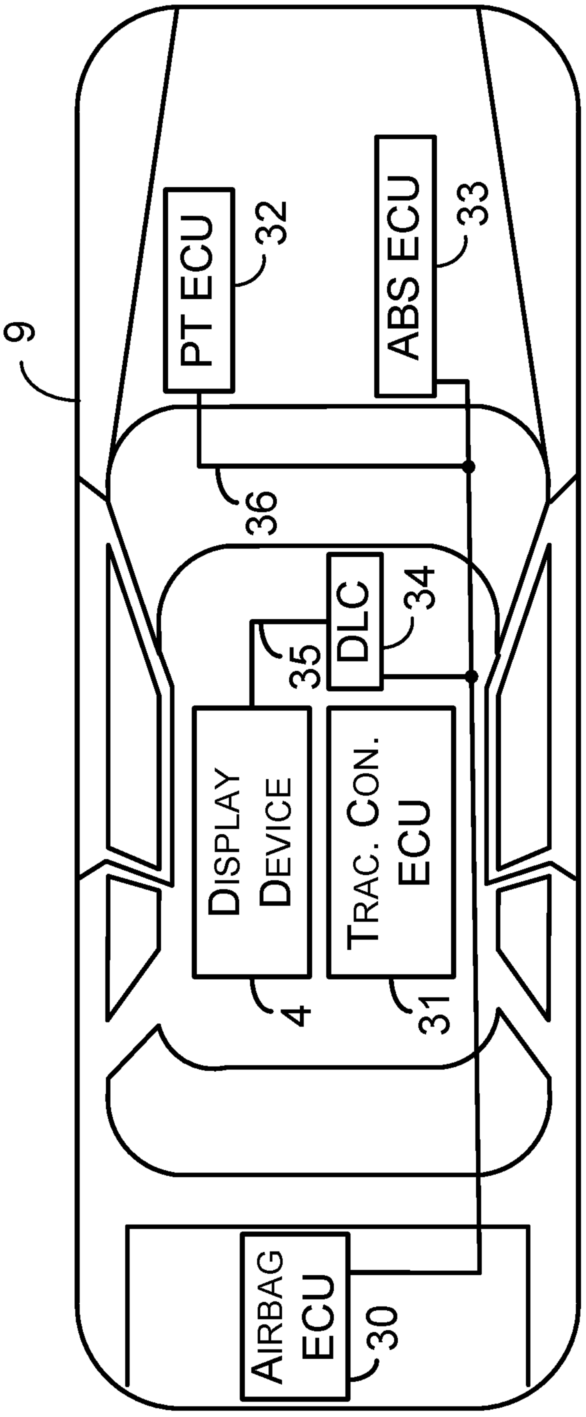
FIG. 5 is a diagram of a vehicle showing example placement of a display device.

Next, FIG. 5 shows example details of the vehicle 9 and example placement of the display device 4 within the vehicle 9. In particular, FIG. 5 shows the vehicle 9 includes an airbag system ECU 30, a traction control system ECU 31, a powertrain system ECU 32, an anti-lock brake system (ABS) ECU 33, and a DLC 34, each of which is connected to a vehicle communication link 36. Other examples of the ECU within the vehicle 9 are also possible. The DLC 34 can, for example, be located within a passenger compartment of the vehicle 9, within an engine compartment of the vehicle 9, or within a storage compartment within the vehicle 9. The display device 4 can include and/or connect to the DLC 34 via a DLC-to-display-device communication link 35. The display device 4 is typically removed after the vehicle 9 has been serviced at the repair shop 8. In that way, the display device 4 can be used to diagnose other vehicles after those vehicles arrive at the repair shop 8.

The DLC 34 can comprise a connector such as an OBD I connector, an OBD II connector, or some other connector. An OBD II connector can include slots for retaining up to sixteen connector terminals, but can include a different number of slots or no slots at all. As an example, a DLC connector can include an OBD II connector that meets the SAE J1962 specification such as a connector 16M, part number 12110252, available from Delphi Automotive LLP of Troy, Mich. The DLC 34 can include conductor terminals that connect to a conductor in a vehicle. For instance, the DLC 34 can include connector terminals that connect to conductors that respectively connect to positive and negative terminals of a vehicle battery. The DLC 34 can include one or more conductor terminals that connect to a conductor of the vehicle communication link such that the DLC 34 is communicatively connected to the ECU within the vehicle 9.

Figure 6:
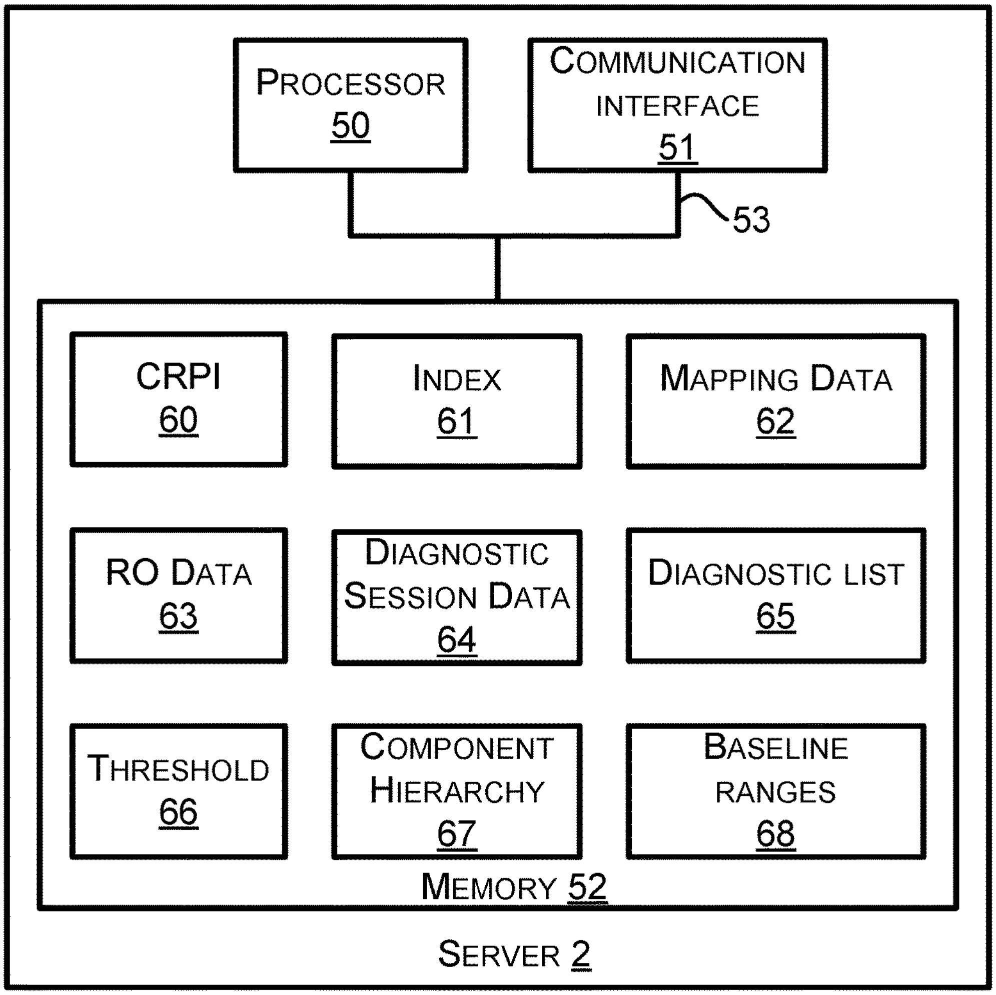
FIG. 6 is a block diagram of an example server.

Next, FIG. 6 is a block diagram of the server 2. As shown in FIG. 6, the server 2 comprises a processor 50, a communication interface 51, and a memory 52. Two or more of those components can be communicatively coupled or linked together via a system bus, network, or other connection mechanism 53.

A processor such as the processor 50 or any other processor discussed in this description can comprise one or more processors. A processor can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). A processor can be configured to execute computer-readable program instructions (CRPI). For example, the processor 50 can execute CRPI 60 stored in the memory 52. A processor can be configured to execute hard-coded functionality in addition to or as an alternative to software-coded functionality (e.g., via CRPI). The at least one processor of the processor 50 can be programmed to perform any function or combination of functions described herein as being performed by the server 2.

A memory such as the memory 52 or any other memory discussed in this description can include one or more memories. A memory can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

A non-transitory memory can include a volatile or non-volatile storage component, such as an optical, magnetic, organic or other memory or disc storage component. Additionally or alternatively, a non-transitory memory can include or be configured as a random-access memory (RAM), a read-only memory (ROM), a programmable read-only memory (PROM), an erasable programmable read-only memory (EPROM), an electrically erasable programmable read-only memory (EEPROM), or a compact disk read-only memory (CD-ROM). The RAM can include static RAM or dynamic RAM.

A transitory memory can include, for example, CRPI provided over a communication link, such as a communication link which is connected to or is part of the communication network 3. The communication link can include a digital or analog communication link. The communication link can include a wired communication link including one or more wires or conductors, or a wireless communication link including an air interface.

A "memory" can be referred to by other terms such as a "computer-readable memory," a "computer-readable medium," a "computer-readable storage medium," a "data storage device," a "memory device," "computer-readable media," a "computer-readable database," "at least one computer-readable medium," or "one or more computer-readable medium." Any of those alternative terms can be preceded by the prefix "transitory" if the memory is transitory or "non-transitory" if the memory is non-transitory.

The memory 52 stores computer-readable data, such as the CRPI 60, an index 61, mapping data 62, RO data 63, diagnostic session data (DSD) 64, a diagnostic list 65, a threshold 66, component hierarchy 67, and baseline ranges 68. The RO data 63 can comprise data from one or more RO. The data from each RO can be stored within the RO data 63 as a separate record pertaining to a vehicle of the set of vehicles being worked on at a repair shop. The RO data 63 can comprise RO data aggregated from multiple ROs. The threshold 66 can comprise any threshold value and/or threshold percentage discussed in this description.

The DSD 64 can comprise data the server 2 can use to determine an operating state of the display device 4. The data the server 2 uses to determine an operating state of the display device 4 can include vehicle identifying information 26, data indicating an elapsed time since the server 2 last received a communication from the display device 4, data indicating the most recent type of diagnostic list requested by and/or transmitted to the display device 4, and/or data indicating a repair has been made to the particular vehicle.

The DSD 64 can comprise data indicative of the determined operating state of the display device 4. Examples of the operating state include (i) the display device 4 is connected to the server 2, (ii) the display device is not connected to the server 2 (i.e., disconnected from the server 2), (iii) the display device 4 is connected to a particular vehicle (e.g., the vehicle 9), (iv) the display device 4 is no longer connected to the particular vehicle (i.e., disconnected from the particular vehicle), (v) the display device 4 is in a request and/or display diagnostic list mode for the particular vehicle, (vi) the display device 4 has exited the request and/or display diagnostic list mode for the particular vehicle, and (vii) the display device has returned to the request and/or display diagnostic list mode for the particular vehicle.

The DSD 64 can also comprise data indicating a diagnostic session at the display device 4 is active or inactive. The server 2 can determine a new diagnostic session is active upon receiving vehicle identifying information for a particular vehicle while the DSD 64 does not include data indicating a diagnostic session is active for the particular vehicle. The server 2 can determine an active diagnostic session for a particular vehicle has transitioned to inactive upon receiving vehicle identifying information for a different particular vehicle. The server 2 can determine an active diagnostic session for a particular vehicle has transitioned to an inactive session upon determining a threshold amount of time has elapsed since a particular activity of the active diagnostic session. As an example, the particular activity can comprise receiving a request from the display device 4, receiving a communication indicating the display device 4 is connected to the communication network 3 and/or transmitting a response with a diagnostic list to the display device 4. Other examples of the particular activity are also possible.

The baseline ranges 68 can comprise baseline ranges for PIDs. The baseline range for each PID can comprise a baseline maximum data value and a baseline minimum data value. The baseline ranges 68 can comprise baseline ranges for PIDs from each set of vehicles identifiable by some particular vehicle identifying information. In this way, the server 2 can provide the display device 4 with applicable baseline ranges with respect to a particular vehicle connected to the display device 4.

In one respect, the baseline ranges 68 can comprise baseline ranges defined by a vehicle manufacturer. For a particular PID associated with a DTC, the vehicle manufacturer may define the baseline maximum data value as the greatest data value for the particular PID an ECU would output while the associated DTC is set to inactive, and the vehicle manufacturer may define the baseline minimum data value as the lowest data value for the particular PID the ECU would output while the associated DTC is set to inactive.

In another respect, the baseline ranges 68 can comprise baseline ranges determined by the server 2 from PID data values received within communications that include PID data values, such as the communication 21. The server 2 can store the received PID data values within the baseline ranges 68 and determine the maximum and minimum data values for each PID for each set of vehicles identifiable by particular vehicle identifying information. The server 2 can maintain a PID count that indicates how many PID data values have been received and/or stored for a particular PID. The server 2 can compare the PID count to a first threshold PID count value stored in the threshold 66. If the server 2 determines that the PID count is less than the first threshold PID count value, the server 2 can produce a first baseline range for the particular PID. As an example, the server 2 can determine the first baseline range for the PID to be a mean maximum PID data value plus X standard deviations of the mean maximum PID data value and a mean minimum PID data value minus X standard deviations of the mean minimum PID data value. The mean maximum PID data value is the mean of maximum PID data values for the particular PID across vehicles identifiable by the particular vehicle identifying information with all DTC from the ECU that provides the particular PID set to inactive. The mean minimum PID data value is the mean of minimum PID data values for the particular PID across vehicles identifiable by the particular vehicle identifying information with all DTC from the ECU that provides the particular PID set to inactive.

As the server 2 continues to receive PID data values for the particular PID, the server 2 can determine the quantity of received PID data values for the particular PID exceeds the first threshold PID count value, but is less than a second threshold PID count value. In this situation, the server 2 can produce a second baseline range for the particular PID. As an example, the server 2 can determine the second baseline range for the PID to be a mean maximum PID data value plus X−1 standard deviations of the mean maximum PID data value and a mean minimum PID data value minus X−1 standard deviations of the mean minimum PID data value. The first baseline range can be referred to a loose baseline range with respect to the second baseline range. The second baseline range can be referred to as a tighter baseline range with respect to the first baseline range.

The server 2 can determine loose and tight baseline ranges in other manners. For example, before the server 2 has received a number of PID data values for the particular PID that exceeds the first threshold PID count value, the server 2 can add a first percentage of the mean maximum PID data value for the particular PID to that mean maximum PID data value or a first percentage of the maximum PID data value for the particular PID to that maximum PID data value. Furthermore, before the server 2 has received a number of PID data values for the particular PID that exceeds the first threshold PID count value, the server 2 can subtract a first percentage of the mean minimum PID data value for the particular PID from that mean minimum PID data value or a first percentage of the minimum PID data value for the particular PID from that minimum PID data value.

As the server 2 continues to receive PID data values for the particular PID, the server 2 can determine the quantity of received PID data values for the particular PID exceeds the first threshold PID count value, but is less than a second threshold PID count value. In this situation, the server 2 can add a second percentage of a mean maximum PID data value for the particular PID to that mean maximum PID data value or a second percentage of a maximum PID data value for the particular PID to that maximum PID data value, and the server 2 can subtract a second percentage of a mean minimum PID data value for the particular PID from that mean minimum PID data value or a second percentage of a minimum PID data value for the particular PID from that minimum PID data value. The second percentage can be smaller than the first percentage so that the baseline range determined using the second percentage is typically a tighter baseline range as compared to the baseline range determined using the first percentage.

The server 2 can provide the display device 4 with a baseline range for the particular PID without any tolerance values so that the display device 4 does not need to calculate a baseline range to be displayed on a display interface of the display device 4. Alternatively, the server 2 can provide the display device 4 with a baseline range for the particular PID with at least one tolerance value. The at least one tolerance value could, for example, be the first percentage or second percentage discussed above, or a value of the X standard deviations or the X−1 standard deviations. Other examples of the at least one tolerance value are also possible.

The CRPI 60 can comprise a plurality of program instructions. The CRPI 60 and any other CRPI described in this description can include data structures, objects, programs, routines, or other program modules that can be accessed by a processor and executed by the processor to perform a particular function or group of functions and are examples of program codes for implementing steps for methods described in this description.

In general, the CRPI 60 can include program instructions to cause the server 2 to perform any function described herein as being performed by the server 2 or to cause any component of the server 2 to perform any function herein as being performed by that component of the server 2. As an example, the CRPI 60 can include program instructions to perform the set of functions 200 shown in FIG. 17, the set of functions 210 shown in FIG. 18 and FIG. 19, the set of functions 220 shown in FIG. 20, and/or the set of functions 230 shown in FIG. 21. As another example, the CRPI 60 can include program instructions to receive the request for filter list 24, to transmit the response to the request 25, to receive the vehicle identifying information 26, to receive the symptom identifiers 27, to transmit the PID filter list 182, to transmit the functional test filter list 184, to transmit the reset procedure filter list 186, and the component test filter list 188.

As another example, the CRPI 60 can include program instructions to perform session management with respect to the display device 4. The processor 50 can use the DSD 64 to determine the operating state of the display device 4. Upon and/or in response to determining the display device 4 is in the request and/or display diagnostic list mode for the particular vehicle, the processor 50 can determine the requested diagnostic list and provide the display device 4 with a response including the requested diagnostic list.

Upon and/or in response to determining the display device 4 has exited the request and/or display diagnostic list mode for the particular vehicle and that a repair has been made to the particular vehicle, the processor 50 can provide a session-change response to the display device 4 to direct the display device 4 to display a previously-displayed diagnostic list or a different diagnostic list. The session-change response can include the previously-displayed diagnostic list or the different diagnostic list. As an example, the previously-displayed diagnostic list can comprise a PID filter list, and the different diagnostic list can comprise a component test filter list such that display device 4 displays a list of component tests that can be performed to verify the repair corrected the symptom exhibited by the particular vehicle. As another example, the previously-displayed diagnostic list can comprise a PID filter list, and the different diagnostic list can comprise a functional test filter list such that display device 4 displays a list of functional tests that can be performed to verify the repair corrected the symptom exhibited by the particular vehicle. As yet another example, the previously-displayed diagnostic list can comprise a PID filter list, and the different diagnostic list can comprise a reset procedure filter list such that display device 4 displays a list of reset procedures that can be performed with respect to a vehicle component repaired on the particular vehicle. The previously-displayed diagnostic list can comprise any of the diagnostic lists discussed in this description.

Upon and/or in response to determining the display device 4 has returned to the request and/or display diagnostic list mode for the particular vehicle, the processor 50 can provide a session-change response to the display device 4 to direct the display device 4 to display a previously-displayed diagnostic list or a different diagnostic list.

A communication interface such as the communication interface 51 or any other communication interface discussed in this description can include one or more communication interfaces. Each communication interface can include one or more transmitters configured to transmit data onto a network, such as the communication network 3. The data transmitted by the communication interface 51 can comprise any data described herein as being transmitted, output, and/or provided by the server 2. Moreover, each communication interface can include one or more receivers configured to receive data carried over a network, such as the communication network 3. The data received by the communication interface 51 can comprise any data described herein as being received by the server, such as repair order data and any request described herein.

A transmitter can transmit radio signals carrying data and a receiver can receive radio signals carrying data. A communication interface with that transmitter and receiver can include one or more antennas and can be referred to as a "radio communication interface," an "RF communication interface," or a "wireless communication interface." The radio signals transmitted or received by a radio communication interface can be arranged in accordance with one or more wireless communication standards or protocols such as an IEEE 802.15.1 standard for WPANs, a Bluetooth version 4.1 standard developed by the Bluetooth Special Interest Group (SIG) of Kirkland, Wash., or an IEEE 802.11 standard for wireless LANs (which is sometimes referred to as a WI-FI® standard), or a cellular wireless communication standard such as a long term evolution (LTE) standard, a code division multiple access (CDMA) standard, an integrated digital enhanced network (IDEN) standard, a global system for mobile communications (GSM) standard, a general packet radio service (GPRS) standard, a universal mobile telecommunications system (UMTS) standard, an enhanced data rates for GSM evolution (EDGE) standard, or a multichannel multipoint distribution service (MMDS) standard.

Additionally or alternatively, a transmitter can transmit a signal (i.e., one or more signals or one or more electrical waves) carrying or representing data onto a wire (e.g., one or more wires) and a receiver can receive via a wire a signal carrying or representing data over the wire. The wire can be part of a network, such as the communication network 3. The signal carried over a wire can be arranged in accordance with a wired communication standard such as a Transmission Control Protocol/Internet Protocol (TCP/IP), an IEEE 802.3 Ethernet communication standard for a LAN, a data over cable service interface specification (DOCSIS standard), such as DOCSIS 3.1, a USB specification (as previously described), or some other wired communication standard.

The data transmitted by a communication interface can include a destination identifier or address of a network device to which the data is to be transmitted. The data transmitted by a communication interface can include a source identifier or address of the system component including the communication interface. The source identifier or address can be used to send a response to the network device that includes the communication interface that sent the data.

A communication interface that is configured to carry out communications over the communication network 3, such as the communication interface 51, can include a modem, a network interface card, and/or a chip mountable on a circuit board. As an example the chip can comprise a CC3100 Wi-Fi® network processor available from Texas Instruments, Dallas, Tex., a CC256MODx Bluetooth® Host Controller Interface (HCI) module available from Texas instruments, and/or a different chip for communicating via Wi-Fi®, Bluetooth® or another communication protocol.

Figure 7:
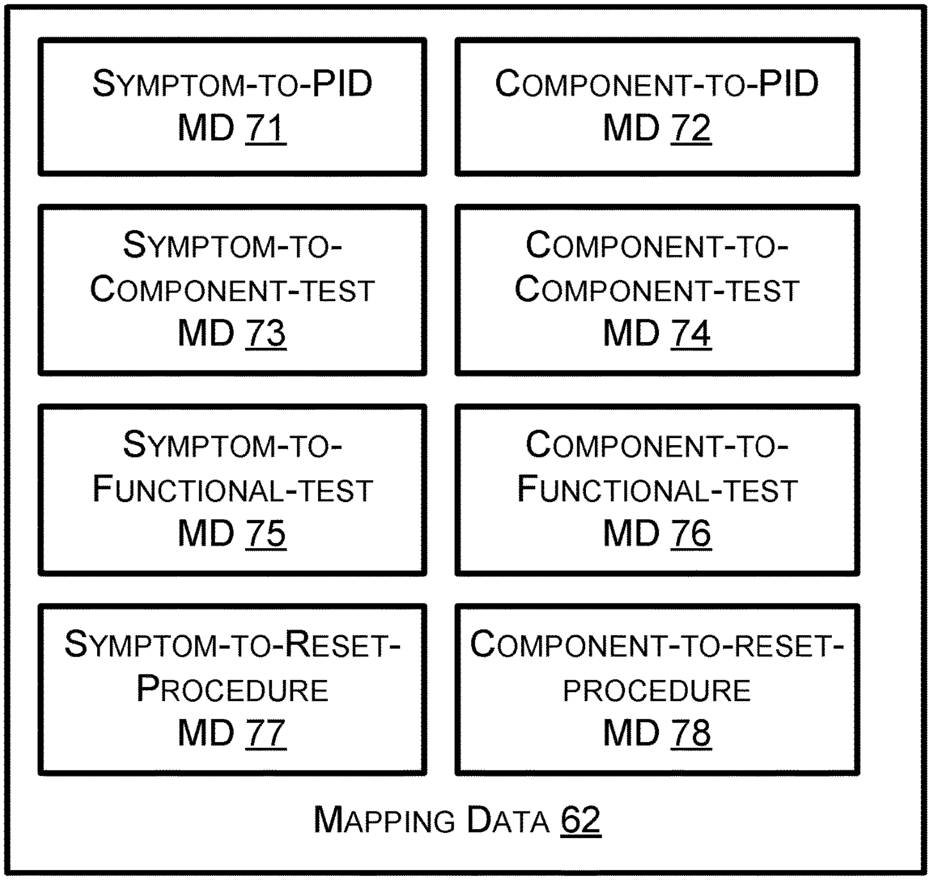
FIG. 7 is a diagram showing example mapping data in accordance with the example embodiments.

Next, FIG. 7 shows examples of the mapping data 62. As shown, the mapping data 62 can comprise symptom-to-PID mapping data (MD) 71, component-to-PID MD 72, symptom-to-component test MD 73, component-to-component-test MD 74, symptom-to-functional-test MD 75, component-to-functional-test MD 76, symptom-to-reset-procedure MD 77, and component-to-reset-procedure MD 78. More particular examples of the foregoing mapping data are discussed below.

Figure 8:
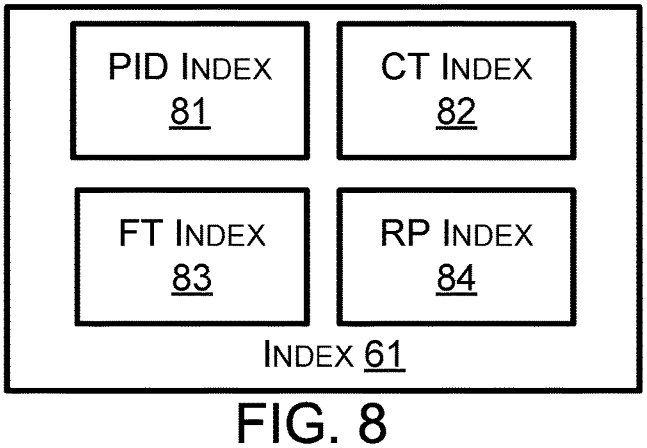
FIG. 8 is a diagram showing example indices in accordance with the example embodiments.

Next, FIG. 8 shows examples of different indices that can be stored within the index 61. As shown, the index 61 can comprise a PID index 81, a component test index (CTI) 82, a functional test index (FTI) 83, and a reset procedure index (RPI) 84. Two or more of those indices can be combined and stored as a single index. More particular examples of the foregoing indices are discussed below.

Next, FIG. 9 shows examples of the mapping data 62. In particular, FIG. 9 shows examples of the symptom-to-PID MD 71 for four symptoms: symptom 1 is mapped to one PID, symptom 2 is mapped to one PID, symptom 3 is mapped to one PID, and symptom 4 is mapped to two PIDs. FIG. 9 also shows examples of the symptom-to-component-test MD 73 for four symptoms: symptom 1 is mapped to two component tests, symptom 2 is mapped to two component tests, symptom 3 is mapped to zero component tests, and symptom 4 is mapped to two component tests. FIG. 9 also shows examples of the symptom-to-functional-test MD 75 for four symptoms: symptom 1 is mapped to four functional tests, symptom 2 is mapped to four functional tests, symptom 3 is mapped to four functional tests, and symptom 4 is mapped to four functional tests. FIG. 9 also shows examples of the symptom-to-reset-procedure MD 77 for five symptoms: symptom 1 is mapped to one reset procedure, symptom 2 is mapped to one reset procedure, symptom 3 is mapped to zero reset procedures, symptom 4 is mapped to one reset procedure, and symptom 5 is mapped to two reset procedures. In FIG. 9, the example symptoms are shown in parenthesis and the PIDs, component tests, functional tests, and reset procedures are listed after the colons.

Figure 10:
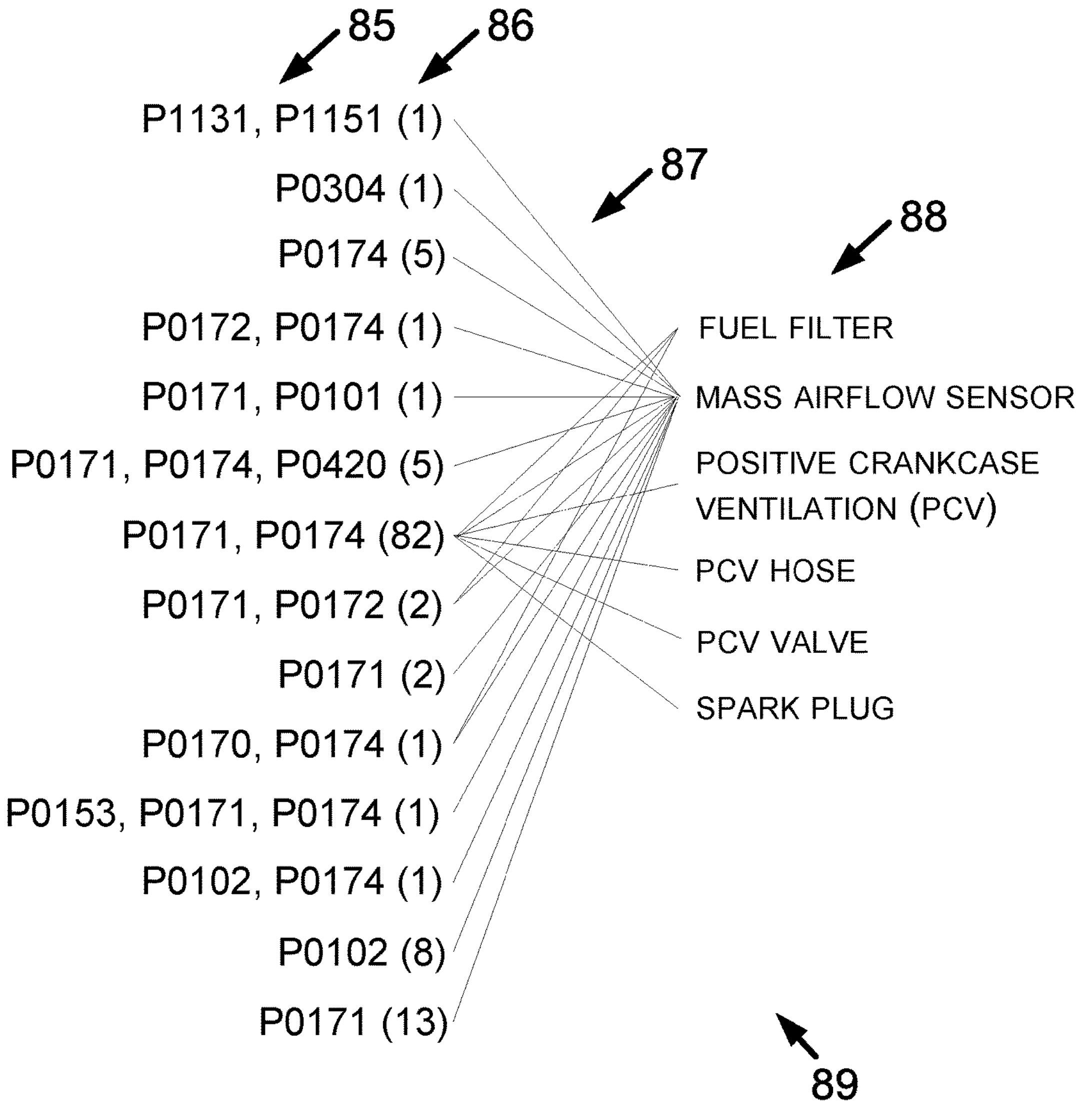
FIG. 10 is a diagram showing example symptom-to-component mapping data in accordance with the example embodiments.

Next, FIG. 10 is a diagram showing example symptom-to-component mapping data 89 that can be stored in the mapping data 62. The symptoms 85 in FIG. 10 are shown as DTCs, but as shown in FIG. 9, a mapped symptom can comprise a symptom other than a DTC. FIG. 10 shows a symptom count 86 within parenthesis for each symptom. The server 2 can determine the symptom counts 86 based on the RO data 63.

The DTCs shown in FIG. 10 can be referred to a "P-codes" from a powertrain controller ECU. As shown in FIG. 10, one symptom (such as the symptom P0171 and P0172) can be mapped to multiple components. The mapping between the symptom and component(s) is represented in FIG. 10 by the mapping lines 87.

Next, FIG. 11 shows additional examples of the mapping data 62. In particular, FIG. 11 shows examples of the component-to-PID MD 72 for four components: component 1 is mapped to three PIDs, component 2 is mapped to three PIDs, component 3 is mapped to two PIDs, and component 4 is mapped to one PID. FIG. 11 also shows examples of the component-to-component test MD 74 for five components: component 1 is mapped to two component tests, component 2 is mapped to three component tests, component 3 is mapped to three component tests, component 4 is mapped to two component tests, and component 5 is mapped to one component test. FIG. 11 also shows examples of the component-to-functional-test MD 76 for six components: component 1 is mapped to two functional tests, component 2 is mapped to zero functional tests, component 3 is mapped to two functional tests, component 4 is mapped to zero functional tests, component 5 is mapped to zero tests, and component 6 is mapped to one functional test. FIG. 11 also shows examples of the component-to-reset-procedure MD 78 for eight components: components 1, 2, 3, 4, 5, and 6 are each mapped to zero reset procedures, component 7 is mapped to two reset procedures, and component 8 is mapped to two reset procedures. In FIG. 11, the example symptoms are shown in parenthesis and the PIDs, component tests, functional tests, and reset procedures are listed after the colons.

Next, FIG. 12 shows an example PID index 90. The PID index 90 comprises an ordered list of PIDs. FIG. 12 shows three example representations of PIDs within the PID index 90. As shown in FIG. 12, the PID index 90 can represent the PIDs using PID numbers 91, index values 92, and PID names 93 (i.e., at least one word describing a PID). A different PID index (for use with the example embodiments) may represent PIDs using only one of those three example representations, a combination of any two of those three example representations, or with a different example PID representation. The index values 92 can, for example, comprise decimal, hexadecimal, or numbers of some other base to represent the PIDs within the PID index 90. The PID index 81 (shown in FIG. 8) can comprise multiple PID indices, such as a separate PID index for each of multiple different set of particular identifying information (e.g., a separate PID index for each Y/M/M or Y/M/M/E). Those separate PID index can be arranged like the PID index 90 or in another manner. The PID index 90 can comprise or be associated with particular vehicle identifying information.

Next, FIG. 13 shows an example component test index (CTI) 95. The CTI 95 comprises an ordered list of component tests. FIG. 13 shows three example representations of component tests within the CTI 95. As shown in FIG. 13, the CTI 95 can represent component tests using component test numbers 96, index values 97, and component test names 98 (i.e., at least one word describing a component test). A different CTI (for use with the example embodiments) may represent component tests using only one of those three example representations, a combination of any two of those three example representations, or with a different example component test representation. The index values 97 can, for example, comprise decimal, hexadecimal, or numbers of some other base to represent the component tests within the CTI 95. The CTI 82 (shown in FIG. 8) can comprise multiple component test indices, such as a separate CTI for each of multiple different set of particular identifying information (e.g., a separate CTI for each Y/M/M or Y/M/M/E). Those separate CTI can be arranged like the CTI 95 or in another manner. The CTI 95 can comprise or be associated with particular vehicle identifying information.

Next, FIG. 14 shows an example functional test index (FTI) 101. The FTI 101 comprises an ordered list of functional tests. FIG. 14 shows three example representations of functional tests within the FTI 101. As shown in FIG. 14, the FTI 101 can represent functional test using functional test numbers 103, index values 105, and functional test names 107 (i.e., at least one word describing a functional test). A different FTI (for use with the example embodiments) may represent functional tests using only one of those three example representations, a combination of any two of those three example representations, or with a different example functional test representation. The index values 105 can, for example, comprise decimal, hexadecimal, or numbers of some other base to represent the functional tests within the FTI 101. The FTI 83 (shown in FIG. 8) can comprise multiple functional test indices, such as a separate FTI for each of multiple different set of particular identifying information (e.g., a separate FTI for each Y/M/M or Y/M/M/E). Those separate FTI can be arranged like the FTI 101 or in another manner. The FTI 101 can comprise or be associated with particular vehicle identifying information.

Next, FIG. 15 shows an example reset procedure index (RPI) 111. The RPI 111 comprises an ordered list of reset procedures. FIG. 15 shows three example representations of reset procedures within the RPI 111. As shown in FIG. 15, the RPI 111 can represent reset procedures using reset procedures numbers 113, index values 115, and reset procedures names 117 (i.e., at least one word describing a reset procedure). A different RPI (for use with the example embodiments) may represent reset procedures using only one of those three example representations, a combination of any two of those three example representations, or with a different example reset procedure representation. The index values 115 can, for example, comprise decimal, hexadecimal, or numbers of some other base to represent the reset procedures within the RPI 111. The RPI 84 (shown in FIG. 8) can comprise multiple reset procedure indices, such as a separate RPI for each of multiple different set of particular identifying information (e.g., a separate RPI for each Y/M/M or Y/M/M/E). Those separate RPI can be arranged like the RPI 111 or in another manner. The RPI 111 can comprise or be associated with particular vehicle identifying information. The index values 115 can be different than the index values of other indices (such as the PID index 90, the CTI 95, and the FTI 101) so that a single index using the index numbers of multiple indices can be formed without any overlap of the index numbers.

Next, FIG. 16 shows an example repair order 100. The RO 100 can be generated by the RO device 10. In one respect, the RO 100 can be initially generated as a paper version of the RO and the paper version of the RO can be converted to a computer-readable version of the RO. In another respect, the RO 100 can be initially generated as the computer-readable RO. The RO device 10 can transmit the RO 100 transmitted over the communication network 3 to the server 2 by way of the communication 20. The server 2 can receive the RO 100 from the communication network 3 and then store the RO 100 and/or data contained on the RO 100 as part of the RO data 63.

The RO 100 includes a service provider identifier 102, a date of service identifier 104, a customer indicator 106 that indicates a customer seeking service of a given vehicle, vehicle information 108 that indicates the given vehicle, vehicle service requests 110, 112, and 114 indicating the complaint(s) or service(s) requested by the customer, parts information 116 indicating parts obtained for servicing the given vehicle, service procedure information 118, 120, and 122 carried out on the given vehicle, and a vehicle-usage indicator 130 (e.g., vehicle mileage data that indicates a number of miles the given vehicle has been driven). The vehicle-usage indicator 130 on the RO 100 can indicate a driven distance using kilometers or some other units as an alternative or in addition to vehicle mileage data. In addition to or as an alternative to indicating a distance, the vehicle-usage indicator 130 can include a time-used indicator such as an hours indicator indicating, for example, how long a vehicle or an engine has been used.

Service provider identifier 102 can include information that indicates a name and geographic location of the service provider (e.g., the repair shop 8). Vehicle information 108 can include a vehicle identification number (VIN) 132 associated with the given vehicle and a description of the given vehicle. The vehicle information 108 is an example of particular vehicle identifying information for a set of vehicles that includes the given vehicle. Service procedure information 118, 120, and 122 can include information within distinct RO sections 124, 126, and 128, respectively, of the RO 100. The service procedure information within any one distinct RO section 124, 126, and 128 can be unrelated to the service procedure information with any other distinct section. Alternatively, two or more distinct sections including service procedure information can pertain to related service operations performed on the given vehicle.

The RO 100 includes labor operation codes (LOCs). The LOCs can conform to those defined by a vehicle manufacturer, a service provider that generates an RO, a service information provider, such as Mitchell Repair Information, LLC, Poway, Calif., or some other entity. For simplicity of FIG. 16, the LOCs are shown within parenthesis, such as (C45) and (C117, C245). Distinct LOC within parenthesis are separate by a comma. Each labor operation code (LOC) can refer to a particular operation performed to the given vehicle. The processor 50 can use a LOC to determine what type of service or repair operation was performed to the given vehicle. Using the LOC in that manner is helpful if other information regarding that operation is incomplete or described using non-standard phrases or terms. The processor 50 can use LOC to determine context for the service procedure information on or within the RO 100.

Figure 17:
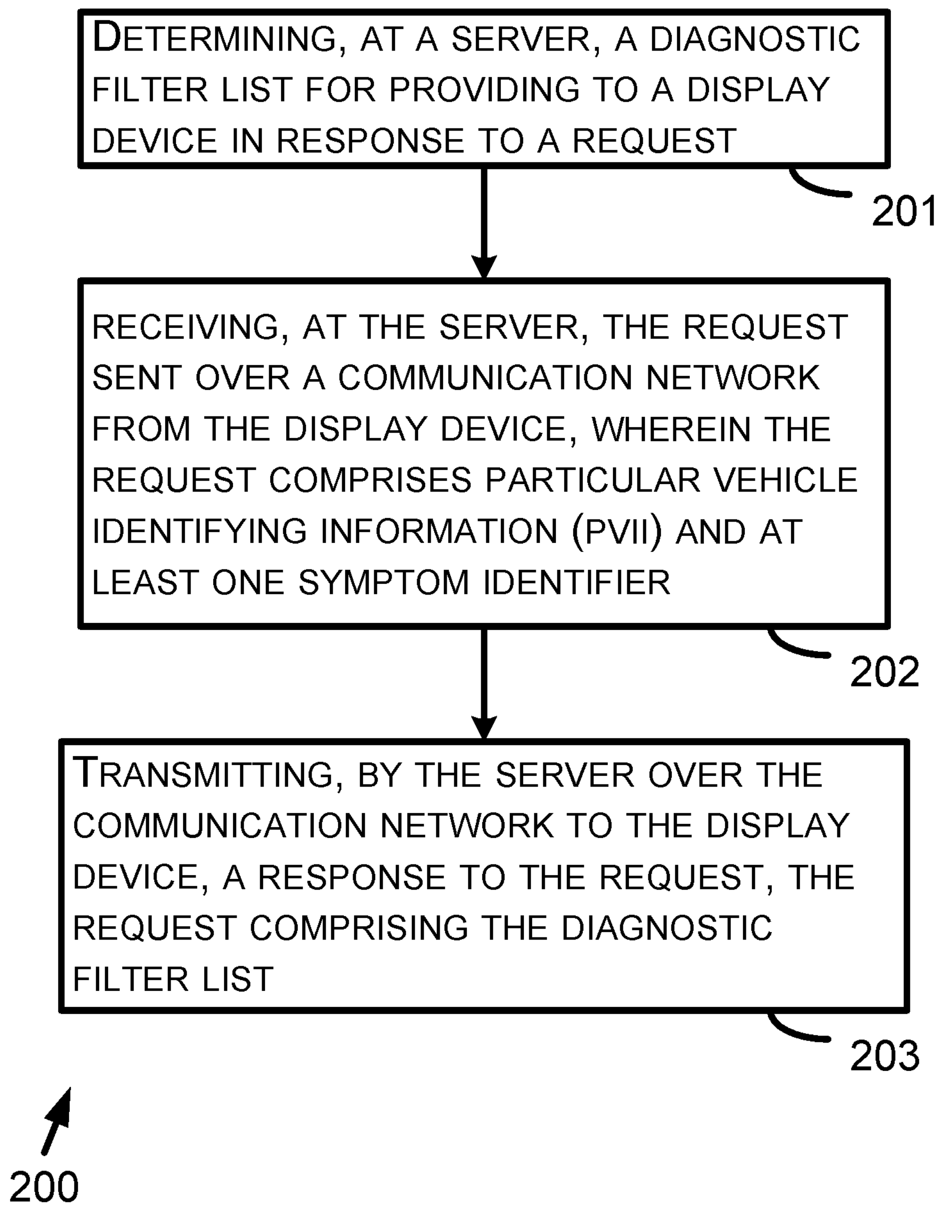
FIG. 17 is a flowchart depicting a set of functions that can be carried out in accordance with the example embodiments.

Next, FIG. 17 shows a flowchart depicting a set of functions 200 (or more simply "the set 200") that can be carried out in accordance with the example embodiments described in this description. The set 200 includes the functions shown in blocks labeled with whole numbers 201 through 203 inclusive. The following description of the set 200 includes references to elements shown in other figures described in this description, but the functions of the set 200 are not limited to being carried out only by the referenced elements. A variety of methods can be performed using all of the functions shown in the set 200 or any proper subset of the functions shown in the set 200. Any of those methods can be performed with other functions such as one or more of the other functions described in this description.

Block 201 includes determining, at the server 2, a diagnostic filter list for providing to the display device 4 in response to a request. The diagnostic filter list can comprise a PID filter list, a component test filter list, a functional test filter list, and/or a reset procedure filter list. Table 1 represents those diagnostic filter lists as diagnostic filter list 1, 2, 3, and 4. The diagnostic filter list can comprise two or more diagnostic filter lists as represented by diagnostic filter lists 5, 6, 7, 8, 9, 10, 11, 12, 13, 14, and 15 in Table 1.

TABLE 1

| Diagnostic Filter List | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| PID Filter List | X | | | | X | X | X | | | | X | X | X | | X |
| Component test Filter List | | X | | | X | | | X | X | | X | X | | X | X |

TABLE 1-continued

| Diagnostic Filter List | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Functional test Filter List | | | X | | | X | | X | | X | X | | X | X | X |
| Reset procedure Filter List | | | | X | | | X | | X | X | | X | X | X | X |

Next, block 202 includes receiving, at the server 2, the request sent over the communication network 3 from the display device 4, wherein the request comprises particular vehicle identifying information and at least one symptom identifier. The request can be configured and/or communicated like the request for filter list 24 shown in FIG. 3. The particular vehicle identifying information can be configured and/or communicated like the vehicle identifying information 26 shown in FIG. 4. The at least one symptom identifier can be configured and/or communicated like the system identifiers 27 shown in FIG. 4.

Next, block 203 includes transmitting, by the server 2 over the communication network 3 to the display device 4, a response to the request, the request comprising the diagnostic filter list. The response to the request can be configured and/or communicated like the response to the request 25 shown in FIG. 3. A response comprising a PID filter list can comprise the PID filter list 182 shown in FIG. 4. A response comprising a component test filter list can comprise the component test filter list 188 shown in FIG. 4. A response comprising a functional test filter list can comprise the functional test filter list 184 shown in FIG. 4. A response comprising a reset procedure filter list can comprise the reset procedure filter list 186 shown in FIG. 4.

Figure 18:
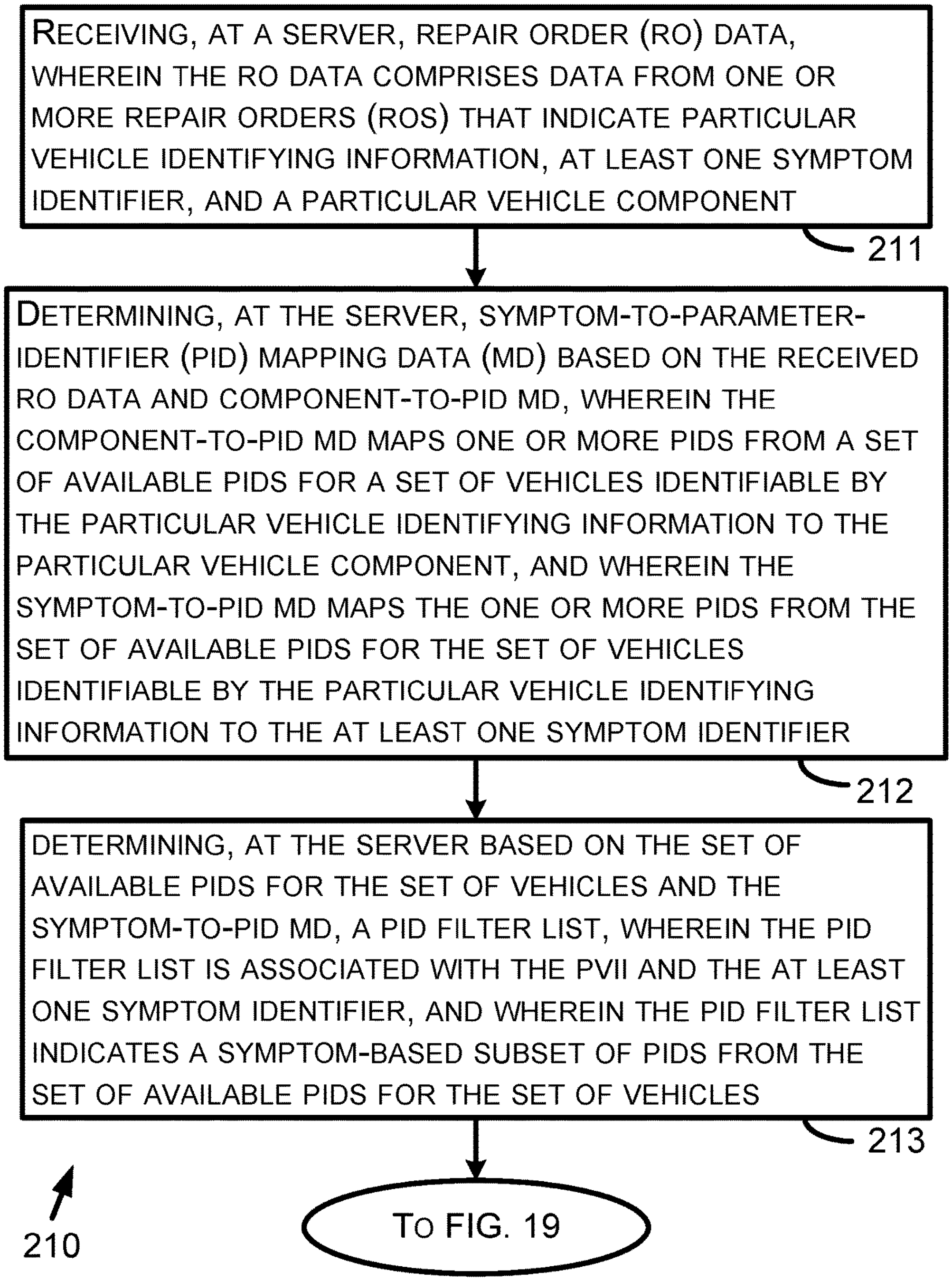
FIG. 18 and FIG. 19 is a flowchart depicting a set of functions that can be carried out in accordance with the example embodiments.
Figure 19:
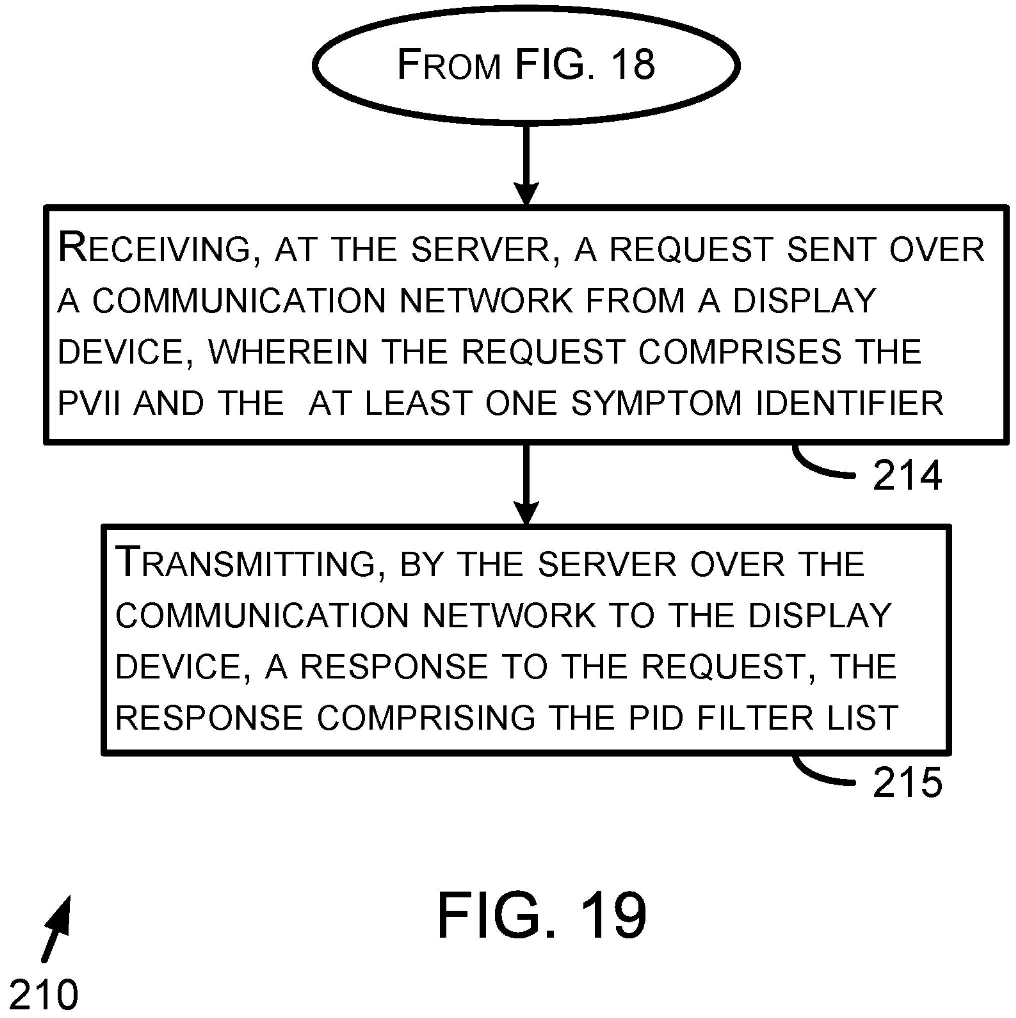

Next, FIG. 18 and FIG. 19 show a flowchart depicting a set of functions 210 (or more simply "the set 210") that can be carried out in accordance with the example embodiments described in this description. The set 210 includes the functions shown in blocks labeled with whole numbers 211 through 215 inclusive. The following description of the set 210 includes references to elements shown in other figures described in this description, but the functions of the set 210 are not limited to being carried out only by the referenced elements. A variety of methods can be performed using all of the functions shown in the set 210 or any proper subset of the functions shown in the set 210. Any of those methods can be performed with other functions such as one or more of the other functions described in this description.

Block 211 includes receiving, at the server 2, RO data, wherein the RO data comprises data from one or more ROs that indicate particular vehicle identifying information, at least one symptom identifier, and a particular vehicle component. The received RO data can be stored as the RO data 63. FIG. 16 shows example RO data that can be included within the received RO data. Accordingly, the server 2 can receive RO data that indicates components actually replaced on a vehicle to repair a symptom identified on an RO. The received RO data can comprise and/or be included within a computer-readable file, such as an extensible markup language (XML) file. The RO data received at the server 2 can comprise RO data transmitted by the RO device 10 and/or the display device 4.

The particular vehicle identifying information referred to throughout this description can comprise a vehicle manufacturer identifier, and (i) at least one vehicle model year identifier and at least one vehicle model identifier, or (ii) at least one vehicle model year identifier, at least one vehicle model identifier, and at least one engine identifier. The server 2 can determine the vehicle identifying information contained in the vehicle information 108 of an RO. For the RO 100, the vehicle identifying information can comprise the Y/M/M (1997/Ford/Crown Victoria) identified on the RO 100, the Y/M/M/E (1997/Ford/Crown Victoria/4.6L) identified on the RO 100, and/or at least a portion of the VIN 132. The server 2 can use taxonomies to determine which portions of the RO data contain the vehicle identifying information.

The server 2 can determine the at least one symptom identifier from various portions of an RO. For instance, the server 2 can determine the at least one symptom identifier from a vehicle service request (e.g., vehicle service requests 110, 112, or 114 shown on the RO 100 in FIG. 16), service procedure information (e.g., service procedure information 118, 120, or 122 shown on the RO 100 in FIG. 16), or from some other portion of an RO. As an example, the at least one symptom identifier comprises at least one DTC that each vehicle of the set of vehicles can set active (e.g., DTC P0171 and P0174 from service procedure information 118 or DTC 117 from the service procedure information 122). For an embodiment in which the at least one symptom identifier comprises at least one DTC, the symptom-based subset of PIDs from the set of available PIDs for the set of vehicles comprises a DTC-based subset of PIDs from the set of available PIDs for the set of vehicles.

The particular vehicle component can comprise a vehicle component identified in the parts information 116 of an RO. For the RO 100, the particular vehicle component can comprise a mass air flow (MAF) sensor, an oil filter, and an engine coolant temperature (ECT) sensor. The server 2 can use taxonomies to determine which vehicle component listed in the parts information 116 pertains to which symptom identifier and/or service procedure on the RO 100.

Next, block 212 includes determining, at the server 2, symptom-to-PID mapping data 71 based on the received RO data and component-to-PID mapping data 72, wherein the component-to-PID mapping data 72 maps one or more PIDs from a set of available PIDs for a set of vehicles identifiable by the particular vehicle identifying information to the particular vehicle component, and wherein the symptom-to-PID mapping data 71 maps the one or more PIDs from the set of available PIDs for the set of vehicles identifiable by the particular vehicle identifying information to the at least one symptom identifier.

Next, block 213 includes determining at the server 2 based on the set of available PIDs for the set of vehicles and the symptom-to-PID mapping data 71, a PID filter list (e.g., a PID filter list from the diagnostic list 65), wherein the PID filter list is associated with the particular vehicle identifying information and the at least one symptom identifier, and wherein the PID filter list indicates a symptom-based subset of PIDs from the set of available PIDs for the set of vehicles. Determining the PID list can include the server 2 retrieving a PID list stored in a memory before the server 2 received the request. Alternatively, determining the PID list can include generating the PID list after the server 2 receives the request (e.g., without retrieving a PID list stored in a memory before the server 2 received the request).

The PID filter list can comprise a list of one or more PIDs. The one or more PIDs can be represented in any of a variety of formats, such as a PID name consisting of one or more words, an index value into an ordered list of PIDs 350 (shown in FIG. 33), and/or alphanumeric PIDs (such as the alphanumeric PIDs 91 shown in FIG. 12 and in the PID list 350 shown in FIG. 33). The ordered list of PIDs 350 is for vehicles identifiable by the particular vehicle identifying information.

Next, block 214 (shown in FIG. 19) includes receiving, at the server 2, a request sent over a communication network 3 from the display device 4, wherein the request comprises the particular vehicle identifying information and the at least one symptom identifier.

Next, block 215 includes transmitting, by the server 2 over the communication network 3 to the display device 4, a response to the request (e.g., the response to the request 25), the response comprising the PID filter list. The display device 4 can subsequently display the PID filter list. The response to the request can comprise a computer-readable file including the PID filter list. The computer-readable file can comprise an extensible markup language (XML) file or another type of computer-readable file.

Additional methods including the functions of the set 210 can be performed to determine diagnostic lists shown in Table 1.

A first additional method including the functions of the set 210 includes: (i) determining, at the server 2, symptom-to-component-test mapping data based on the received RO data and component-to-component-test mapping data, wherein the symptom-to-component-test mapping data maps one or more component tests from a set of available component tests for the set of vehicles identifiable by the particular vehicle identifying information to the at least one symptom identifier, (ii) determining, at the server 2 based on the set of available component tests for the set of vehicles and the symptom-to-component-test mapping data, a component test filter list, wherein the component test filter list is associated with the particular vehicle identifying information and the at least one symptom identifier, and wherein the component test filter list indicates a symptom-based subset of component tests from the set of available component tests for the set of vehicles, and (iii) retrieving, by the server 2 based on the particular vehicle identifying information and the at least one symptom identifier received in the request, the component test filter list. For the first additional method including the set 210, the response to the request comprises the component test filter list. For the first additional method including the set 210, the PID filter list can comprise index values 92 into an ordered list of PIDs 90 for vehicles identifiable by the particular vehicle identifying information, and/or the component test filter list comprises index values 97 into an ordered list of component tests 95 for vehicles identifiable by the particular vehicle identifying information For the first additional method including the set 210, the at least one symptom identifier can comprise at least one DTC that each vehicle of the set of vehicles can set active. The symptom-based subset of PIDs from the set of available PIDs for the set of vehicles comprises a DTC-based subset of PIDs from the set of available PIDs for the set of vehicles. The symptom-based subset of component tests from the set of available component tests for the set of vehicles comprises a DTC-based subset of component tests from the set of available component tests for the set of vehicles. For the first additional function including the set 210, the component test filter list can comprise a component test performable by an oscilloscope of the display device 4 or a multimeter of the display device 4.

The first additional method including the functions of the set 210 can further include: (i) determining, at the server 2, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier, (ii) determining, at the server 2 based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles, and (iii) retrieving, by the server 2 based on the particular vehicle identifying information and the symptom received in the request, the functional test filter list. For the first additional method including the set 210, the response to the request can further comprises the functional test filter list. The functional test filter list can indicate a functional test that comprises transmission of a vehicle data message from the display device 4 to the vehicle 9. The PID filter list can comprise index values into an ordered list of PIDs, component tests, and functional tests for vehicles identifiable by the particular vehicle identifying information.

For the first additional method including the set 210, the at least one symptom identifier can comprise at least one DTC that each vehicle of the set of vehicles can set active, the symptom-based subset of PIDs from the set of available PIDs for the set of vehicles can comprise a DTC-based subset of PIDs from the set of available PIDs for the set of vehicles, the symptom-based subset of component tests from the set of available component tests for the set of vehicles can comprise a DTC-based subset of component tests from the set of available component tests for the set of vehicles, and the symptom-based subset of functional tests from the set of available functional tests for the set of vehicles can comprise a DTC-based subset of functional tests from the set of available functional tests for the set of vehicles.

A second additional method including the functions of the set 210 includes: (i) determining, at the server 2, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier, (ii) determining, at the server 2 based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles, and (iii) retrieving, by the server 2 based on the particular vehicle identifying information and the symptom received in the request, the functional test filter list. For the second additional function including the set 210, the response to the request comprises the functional test filter list.

For the second additional method including the set 210, the at least one symptom identifier can comprise at least one diagnostic trouble code (DTC) that each vehicle of the set of vehicles can set active, the symptom-based subset of PIDs from the set of available PIDs for the set of vehicles can comprise a DTC-based subset of PIDs from the set of available PIDs for the set of vehicles, and the symptom-based subset of functional tests from the set of available functional tests for the set of vehicles can comprise a DTC-based subset of functional tests from the set of available functional tests for the set of vehicles. For the second additional method including the set 210, the functional test filter list can indicate a functional test that comprises transmission of a vehicle data message from the display device to the vehicle. For the second additional method including the set 210, the PID filter list can comprise index values into an ordered list of PIDs and functional tests for vehicles identifiable by the particular vehicle identifying information.

A third additional method including the functions of the set 210 includes: (i) determining, at the server 2, symptom-to-reset-procedure mapping data based on the received RO data and component-to-reset-procedure mapping data, wherein the symptom-to-reset-procedure mapping data maps one or more reset procedures from a set of available reset procedures for the set of vehicles identifiable by the particular vehicle identifying information to the at least one symptom identifier, (ii) determining, at the server 2 based on the set of available reset procedures for the set of vehicles and the symptom-to-reset-procedure mapping data, a reset procedure filter list, wherein the reset procedure filter list is associated with the particular vehicle identifying information and the at least one symptom identifier, and wherein the reset procedure filter list indicates a symptom-based subset of reset procedures from the set of available reset procedures for the set of vehicles, and (iii) retrieving, by the server 2 based on the particular vehicle identifying information and the symptom received in the request, the reset procedure filter list. For the third additional method including the set 210, the response to the request comprises the reset procedure filter list. For the third additional method including the set 210, the reset procedure filter list can comprise index values into an ordered list of reset procedures for vehicles identifiable by the particular vehicle identifying information.

For the third additional method including the set 210, the at least one symptom identifier can comprise at least one diagnostic trouble code (DTC) that each vehicle of the set of vehicles can set active, the symptom-based subset of reset procedures from the set of available reset procedures for the set of vehicles can comprise a DTC-based subset of reset procedures from the set of available reset procedures for the set of vehicles, and the symptom-based subset of reset procedures from the set of available reset procedures for the set of vehicles can comprise a DTC-based subset of reset procedures from the set of available reset procedures for the set of vehicles.

The third additional method including the set 210 can include: (i) establishing, at the server 2, a diagnostic session for the display device 4 with respect to the first response and the second response, (ii) determining, at the server 4, a vehicle repair has occurred with respect to the diagnostic session, and (iii) transmitting, by the server 2 over the communication network 3 to the display device 4, the second response in response to determining the vehicle repair has occurred with respect to the diagnostic session. In this regard, the response comprises a first response and a second response, the first response comprises the PID filter list and the second response comprises the reset procedure filter list, and transmitting the response comprising the PID filter list comprises transmitting the first response. Determining the vehicle repair has occurred can comprise determining a threshold amount of time has elapsed since the first response was transmitted to the display device 4.

A fourth additional method including the functions of the set 210 includes: determining the PID filter list can comprise modifying an existing PID filter list. The existing PID filter list can comprise a different subset of PIDs from the set of available PIDs for the set of vehicles. The existing PID filter list is associated with the particular vehicle identifying information and the at least one symptom identifier. Modifying the existing PID filter list can include adding at least one PID from the set of available PIDs for the set of vehicles to the existing PID filter list and/or removing at least one PID from the existing PID filter list.

A fifth additional method including the functions of the set 210 includes: determining, at the processor 50 based on the set of RO data, the subset of RO data by determining the set of RO data indicates the particular vehicle component is a most-replaced component and the at least one symptom identifier is a most-reported symptom for vehicles of the set of vehicles identifiable by the particular vehicle identifying information. For such a method, the RO data comprises a subset of a set of RO data, and receiving the RO data comprises receiving the set of RO data. Also, the set of RO data comprises data from multiple ROs that indicate (i) the particular vehicle identifying information or different vehicle identifying information, (ii) the at least one symptom identifier or a different symptom, and (iii) the particular vehicle component or a different vehicle component.

A sixth additional method including the functions of the set 210 includes: (i) determining, at the server 2, a vehicle component related to the particular vehicle component, (ii) determining, at the server 2, at least one PID to add to the PID filter list based on component-to-PID mapping data that maps one or more PIDs from the set of available PIDs for the set of vehicles identifiable by the particular vehicle identifying information to the vehicle component related to the particular vehicle component, and (iii) adding, by the server, the at least one PID to the PID filter list. The server 2 can determine the vehicle component related to the particular vehicle component by searching data within the memory 52 that identifies vehicle components of the vehicles of the set of vehicles in a hierarchical format based on systems and/or subsystems of the vehicles of the set of vehicles. The searched data can comprise the component hierarchy 67.

Next, FIG. 35 shows a particular example of the component hierarchy 67. The component hierarchy 67 can comprise a separate component hierarchy for each set of vehicles identifiable by particular vehicle identifying information. In an alternative arrange, a separate component hierarchy can pertain to multiple sets of vehicles identifiable by different particular vehicle identifying information. In FIG. 35, the component hierarchy 67 pertains to a vehicle with a gasoline-powered engine having an electrical system, an exhaust system, a fuel system, and an intake system. FIG. 35 shows that a vehicle system can be subdivided into subsystems, as the electrical system is shown to include an ignition subsystem and charging subsystem.

Each indented line including a rectangular bullet point "□" lists a vehicle component that is part of an identified system or subsystem within a vehicle. Each vehicle component in the component hierarchy 67 can be associated with a PID, a component test, a functional test, and/or a reset procedure. Examples of the PID, component test, functional test, and/or reset procedure associated with the vehicle component are shown in FIG. 11. For instance, FIG. 35 shows an EGR valve is part of an exhaust system, and FIG.

11 shows the EGR valve is associated with PID13, PID 14, PID24, CT1, CT4, FT13, and FT14. The component hierarchy 67 can include data (e.g., metadata) that indicates which PID, component test, functional test, and/or reset procedure associated with the vehicle component. The system and subsystem identifiers in the component hierarchy can also be associated with a PID, a component test, a functional test, and/or a reset procedure. That association to the system and subsystem can apply to all vehicle components within the system and subsystem, respectively.

As an example, if the particular vehicle component for the set 210 comprises an oxygen sensor, the processor 50 can determine another PID, component test, functional test, and/or reset procedure to include in a diagnostic list by reference to the component hierarchy 67. The other PID, component test, functional test, and/or reset procedure can be related to a vehicle component within the same system or subsystem as the particular vehicle component or a vehicle component within a different system or subsystem. The vehicle components within each system and subsystem within the component hierarchy can be ordered so that the processor 50 can determine which vehicle component within the other system or subsystem are to be considered to determine whether the vehicle component is associated with a PID, component test, functional test, and/or reset procedure.

Figure 20:
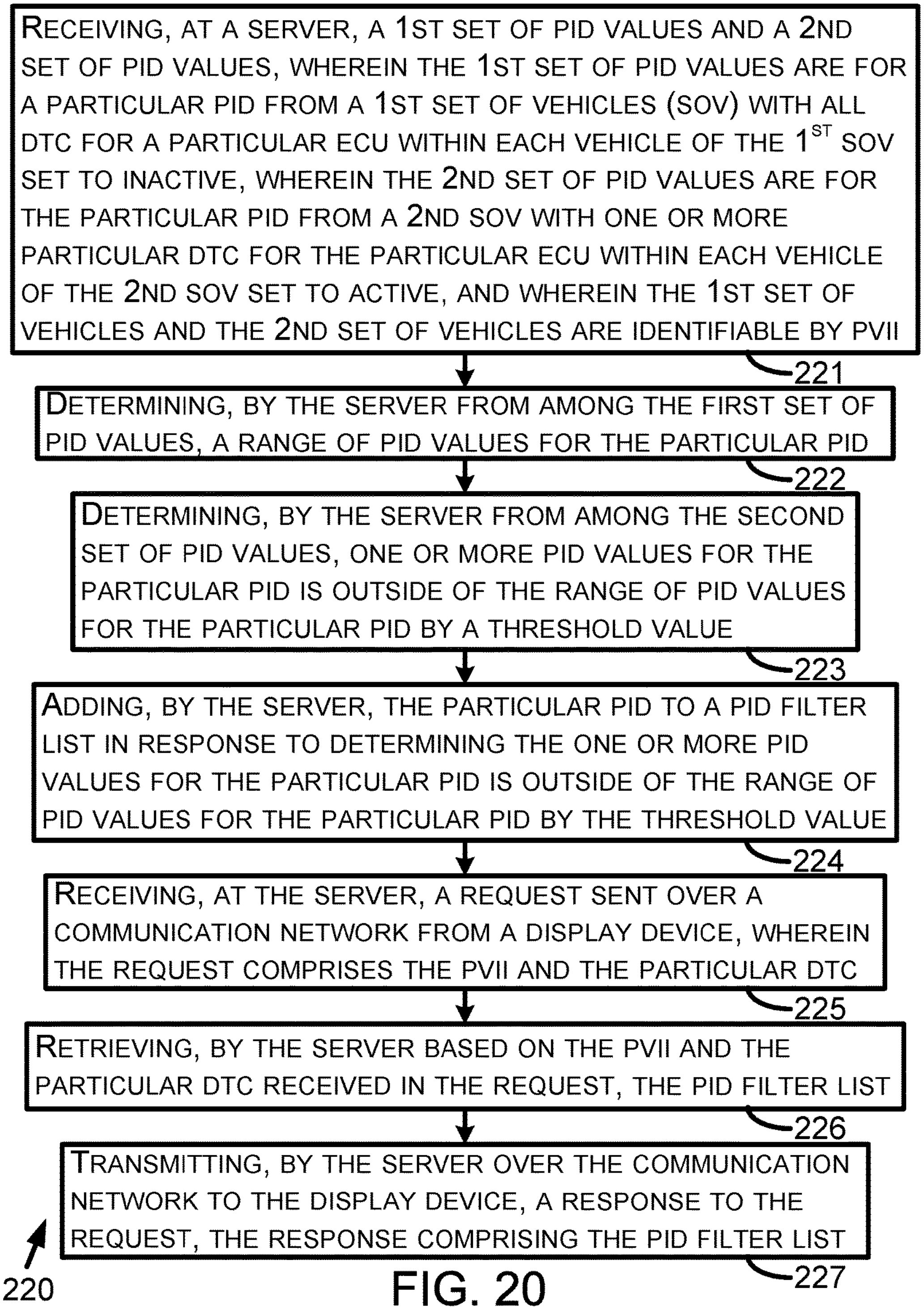
FIG. 20 is a flowchart depicting a set of functions that can be carried out in accordance with the example embodiments.

Next, FIG. 20 shows a flowchart depicting a set of functions 220 (or more simply "the set 220") that can be carried out in accordance with the example embodiments described in this description. The set 220 includes the functions shown in blocks labeled with whole numbers 221 through 227 inclusive. The following description of the set 220 includes references to elements shown in other figures described in this description, but the functions of the set 220 are not limited to being carried out only by the referenced elements. A variety of methods can be performed using all of the functions shown in the set 220 or any proper subset of the functions shown in the set 220. Any of those methods can be performed with other functions such as one or more of the other functions described in this description.

Block 221 includes receiving, at the server 2, a first set of PID values and a second set of PID values, wherein the first set of PID values are for a particular PID from a first set of vehicles with all DTCs for a particular ECU within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information.

The first set of PID values can include and/or be associated with data that that indicates the first set of vehicles, the status of DTC within the first set of vehicles for the particular ECU, and the PID. FIG. 22 shows an example first set of PID values 255 for a particular PID 253 (e.g., PID 6 representing fuel pressure), from a first set of vehicles 251 with all DTCs 257 for a particular ECU (e.g., a powertrain control system ECU) set to inactive. The second set of PID values can include and/or be associated with data that that indicates the second set of vehicles, the status of DTC within the second set of vehicles for the particular ECU, and the PID. FIG. 17 shows an example second set of PID values 261 for the particular PID 253 (e.g., PID 6 representing fuel pressure), from a second set of vehicles 259 with one or more particular DTCs (e.g., DTC 5 and DTC 9) for the particular ECU (e.g., a powertrain control system ECU) set to active. The units associated with the PID values 255 and 261 can be pounds per square inch (PSI).

Returning to FIG. 20, block 222 includes determining, by the server from among the first set of PID values, a range of PID values for the particular PID. Assuming the PID values for the vehicle(s) between vehicle 3 and vehicle X in the set of vehicles 251 are within the range of PID values within the PID values 255 for vehicles 1, 2, 3, and X, then the range of PID values for the set of PID values 255 is 35 to 41. The range of PID values can be stored within the baseline ranges 68.

Next, block 223 includes determining, by the server from among the second set of PID values, one or more PID values for the particular PID is outside of the range of PID values for the particular PID by a threshold value. As an example, the threshold value with respect to the example PID 6 for fuel pressure can be seven, such as plus seven from the greatest value in the determined range and/or minus seven from the smallest value in the determined range. In accordance with that example, the PID values 27, 26, 25, and 23 for vehicle 1 are PID values outside of the range of PID values for PID 6 by the threshold value, PID values 26, 26, 24, 22, and 24 for vehicle 2 are PID values outside of the range of PID values for PID 6 by the threshold value, PID values 25, 24, 26, and 26 for vehicle 3 are PID values outside of the range of PID values for PID 6 by the threshold value, and PID values 27, 24, 24, 25, and 26 for vehicle X are PID values outside of the range of PID values for PID 6 by the threshold value.

Determining the one or more PID values for the particular PID is outside of the range of PID values can comprise (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

Determining the range of PID values for the particular PID can comprise determining a range of values for the particular PID at some number of standard deviations (e.g., one, two, three, or four standard deviations) of a mean value of PID values for the particular PID within the first set of PID values. The server 2 can determine the mean value of the PID values.

The range of PID values for the particular PID can comprise a first range of PID values. The server 2 can determine that each PID value of the first range of PID values was generated in a vehicle of the first set of vehicles while the vehicle is operating in a first operating state. The response can further comprise data indicating the first range of PID values is associated with the first operating state. That data can be used for placing a vehicle connected to the display device 4 in the first operating state and/or for guiding a user in placing the vehicle connected to the display device 4 in the first operating state. The range of PID values can be stored within the baseline ranges 68.

Next, block 224 includes adding, by the server, the particular PID to a PID filter list in response to determining the one or more PID values for the particular PID is outside of the range of PID values for the particular PID by the threshold value. The PID filter list can be stored as and/or within the diagnostic list 65. The PID filter list can be associated with and/or include the particular vehicle identifying information and the particular DTC to enable the server 2 to retrieve the PID filter list in response to a request.

The PID filter list can include one or more default PIDs before the particular PID is added to the PID filter list and after the particular PID is added to the PID filter list. As an example, PIDs 1, 3, 5, 8-12, 14, 15, 18, 20, 22, 24, 25 and 30 from the PID list 350 can be default PIDs and PID 6 can be the particular PID added to the PID filter list. The PID filter list can comprise index values 351 into an ordered list of PIDs (e.g., the PID list 350) for vehicles identifiable by the particular vehicle identifying information. Adding the particular PID to the PID filter list can be conditioned on the server 2 determining the one or more PID values for the particular PID comprise at least a threshold number of PID values.

Next, block 225 includes receiving, at the server 2, a request sent over the communication network 3 from the display device 4, wherein the request comprises the particular vehicle identifying information and the particular DTC. FIG. 3 shows an example request 26 being sent from the display device 4 to the server 2. The communication interface 51 can receive the request sent over the communication network 3 and provide the request to the processor 50 and/or to the memory 52.

Next, block 226 includes retrieving, by the server 2 based on the particular vehicle identifying information and the particular DTC received in the request, the PID filter list. The server 2 can retrieve the PID filter list from the diagnostic list 65.

Next, block 227 includes transmitting, by the server 2 over the communication network 3 to the display device 4, a response to the request, the response comprising the PID filter list. FIG. 3 shows an example request 26 being sent from the server 2 to the display device 4. The response can comprise data indicating the range of PID values for the particular PID (e.g., the lowest and greatest values of the range of PID values). The communication interface 51 can receive the response from the processor 50 and/or from the memory 52 and thereafter transmit the response onto the communication network 3.

In addition to determining the first range of PID values, the method 220 can include determining, by the server 2 from among the first set of PID values, a second range of PID values for the particular PID. The server can determine each PID value of the second range of PID values was generated in a vehicle of the first set of vehicles while the vehicle is operating in a second operating state different than the first operating state. The response can further comprise the second range of PID values and data indicating the second range of PID values is associated with the second operating state. That data can be used for placing a vehicle connected to the display device 4 in the second operating state and/or for guiding a user in placing the vehicle connected to the display device 4 in the second operating state.

The operating states associated with a range of PID values can be defined by one or more vehicle operating parameters. Each vehicle operating parameter can comprise a single parameter value or a range of parameter values. The single parameter value can comprise a mean value of multiple parameter values. As an example, the first operating state can comprise a first engine revolutions per minute (RPM) value, a first engine load value, and/or a first engine temperature value. In accordance with that example, the second operating state can comprise a second engine RPM value if the first operating state comprises the first RPM value, a second engine load value if the first operating state comprises the first engine load value, and a second engine temperature value if the first operating state comprises the first engine temperature value. The vehicle operating parameters can be determined from PID values. For example, the first and second engine load values can be determined from PID values that indicate a calculated engine load.

Figure 21:
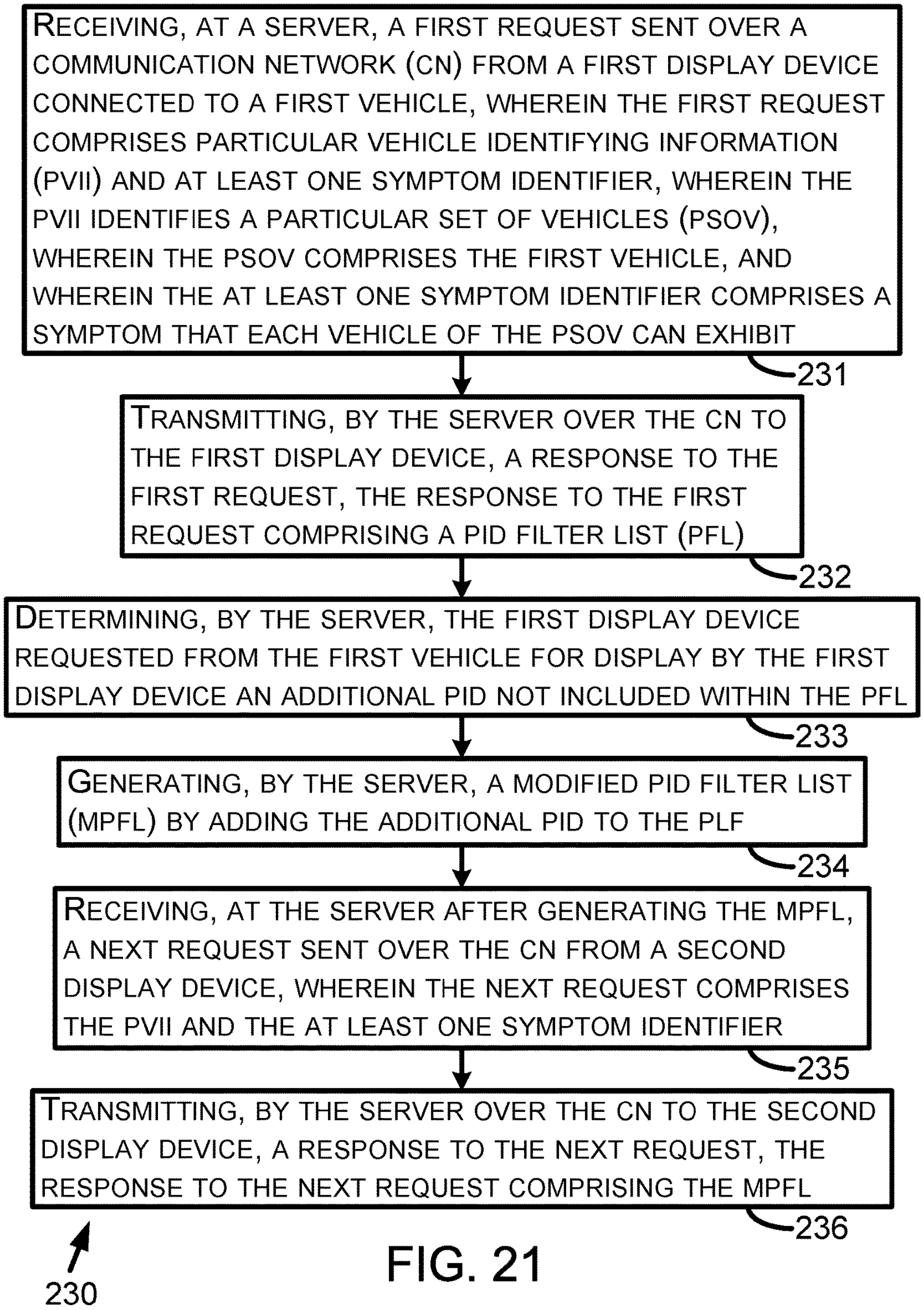
FIG. 21 is a flowchart depicting a set of functions that can be carried out in accordance with the example embodiments.

Next, FIG. 21 shows a flowchart depicting a set of functions 230 (or more simply "the set 230") that can be carried out in accordance with the example embodiments described in this description. The set 230 includes the functions shown in blocks labeled with whole numbers 231 through 236 inclusive. The following description of the set 230 includes references to elements shown in other figures described in this description, but the functions of the set 230 are not limited to being carried out only by the referenced elements. A variety of methods can be performed using all of the functions shown in the set 230 or any proper subset of the functions shown in the set 230. Any of those methods can be performed with other functions such as one or more of the other functions described in this description.

Block 231 includes receiving, at the server 2, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit. The first request can be configured and/or communicated like the request for filter list 24 shown in FIG. 3.

The at least one symptom identifier can comprise at least one diagnostic trouble code that each vehicle of the particular set of vehicles can set to active. The particular vehicle identifying information can comprise a vehicle manufacturer identifier, and (i) at least one vehicle model year identifier and at least one vehicle model identifier, or (ii) at least one vehicle model year identifier, at least one vehicle model identifier, and at least one engine identifier.

Next, block 232 transmitting, by the server over the communication network to the first display device, a response to the first request, the response to the first request comprising a PID filter list. The response to the first request can be configured and/or communicated like the response to the request 25 shown in FIG. 3. The PID filter list can comprise index values into the ordered list of PIDs 350 for vehicles identifiable by the particular vehicle identifying information. As an example, the PID filter list can comprise the index values shown in the index values 351 except for the index value 6 for PID6. The PID filter list can be stored in the diagnostic list 65.

Next, block 233 determining, by the server, the first display device requested from the first vehicle for display by the first display device an additional PID not included within the PID filter list. Determining the first display device requested from the first vehicle for display by the first display device an additional PID not included within the PID filter list can comprise determining the additional PID was requested within a threshold amount of time after the server receives the first request or after the server transmits the response.

Next, block 234 generating, by the server, a modified PID filter list by adding the additional PID to the PID filter list. The modified PID filter list can comprise index values into an ordered list of PIDs 350 for vehicles identifiable by the particular vehicle identifying information. The modified PID filter list can be stored in the diagnostic list 65. In accordance with the example in which the additional PID is PID6 for fuel pressure, the modified PID filter list can comprise the index values 351.

Next, block 235 receiving, at the server after generating the modified PID filter list, a next request sent over the communication network from a second display device, wherein the next request comprises the particular vehicle identifying information and the at least one symptom identifier. The next request can be configured and/or communicated like the request for filter list 24 shown in FIG. 3.

Next, block 236 transmitting, by the server over the communication network to the second display device, a response to the next request, the response to the next request comprising the modified PID filter list. In one respect, the second display device is the first display device. In a second respect, the second display device is not the first display device. In other words, the first display device and the second display device are individual display devices. The response to the next request can be configured and/or communicated like the response to the request 25 shown in FIG. 3.

As an example, a first additional function that can be performed with the set 230 includes: (i) receiving, at the server 2, PID data provided to the first display device from the first vehicle, and (ii) determining, by the server 2, the PID data provided to the first display device from the first vehicle and subsequently received by the server includes PID data for the additional PID to be displayed by the first display device.

As another example, a second additional function that can be performed with the set 230 includes receiving, at the server 2, data indicating the first display device received an input requesting display of the additional PID, wherein the server 2 determines the first display device requested from the first vehicle for display by the first display device the additional PID not included within the PID filter list based at least in part on the data indicating the first display device received an input requesting display of the additional PID.

As yet another example, a third additional function that can be performed with the set 230 includes: (i) retrieving, by the server 2 based on the particular vehicle identifying information and the at least one symptom identifier received in the first request, the PID filter list from a computer-readable memory 52, and/or (ii) retrieving, by the server 2 based on the particular vehicle identifying information and the at least one symptom identifier received in the next request, the modified PID filter list from a computer-readable memory 52.

In accordance with the example embodiment including the set 230, the first display device can be one of multiple display devices registered with the server 2. Accordingly, generating the modified PID filter list can be conditioned on the server 2 determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server 2 has transmitted the PID filter list to the any of the multiple display devices. For this example embodiment, "n" of the $n^{th}$ time comprises a predetermined threshold number greater than one.

In further examples, a functional test filter list, a component test filter list, or a reset procedure filter list may be modified according to information received by the server 2 that indicates which specific tests or reset procedures were performed on vehicles having the particular vehicle identifying information and the at least one symptom identifier. The server 2 may receive messages from display devices indicating when tests or reset procedures are performed. The server 2 may then determine to adjust one of the diagnostic filter lists based on the received messages. For instance, if the server 2 determines that a particular functional test not in the functional test filter list has been performed above a threshold frequency on vehicles having the particular vehicle identifying information and the at least one symptom identifier, the server 2 may add the particular functional test to the functional test filter list. Additionally, if the server 2 determines that an existing functional test in the functional test filter list has been performed less than a threshold frequency on vehicles having the particular vehicle identifying information and the at least one symptom identifier, the server 2 may remove the existing functional test from the functional test filter list.

In additional examples, the server 2 may monitor the frequency of performance of functional tests, component tests, and/or reset procedures in order to determine a ranking. The server 2 may then provide an indication of the ranking as part of the functional test filter list, component test filter list, and/or reset procedure list. For example, the component test filter list for vehicles having the particular vehicle identifying information and the at least one symptom identifier may include five component tests. The server 2 may receive messages from multiple display devices indicating when one of the five component tests has been performed on a vehicle having the particular vehicle identifying information and the at least one symptom identifier. The server 2 may determine a ranking of the five component tests based on the frequency of performance of each of the five component tests indicated by the received messages. The server 2 may then indicate the ranking when providing the component test filter list so that display devices may display the five component tests in order based on frequency of performance.

In further examples, the server 2 may provide a ranking of functional tests, component tests, and/or reset procedures based on the probability of component failure of different associated components. For example, a functional test filter list may include two functional tests related to a first vehicle component and two functional tests related to a second vehicle component. The server 2 may determine a respective probability that each of the first vehicle component and the second vehicle component has failed for vehicles having the particular vehicle identifying information and the at least one symptom identifier. If the server 2 determines that the first vehicle component has a higher probability of failure, then the two functional tests related to the first vehicle component may be ranked higher than the two functional tests related to the second vehicle component. The server 2 may provide the ranking and an indication of an associated vehicle component for each functional test when providing the functional test filter list to a display device.

In further examples, the server 2 may provide a ranking of functional tests and/or component tests based on an amount of time determined to be required to perform the tests. The time required to perform a particular test can be determined from data indicating when the particular test was previously selected and when performance of the particular test was completed. As an example, a functional test filter list may include a first functional test and a second functional test related to a first vehicle component. The server 2 can determine that the time required to perform the first functional test is greater than the time required to perform the second test. The server 2 can then rank the second test first and the first test second within the functional test filter list.

Figure 23:
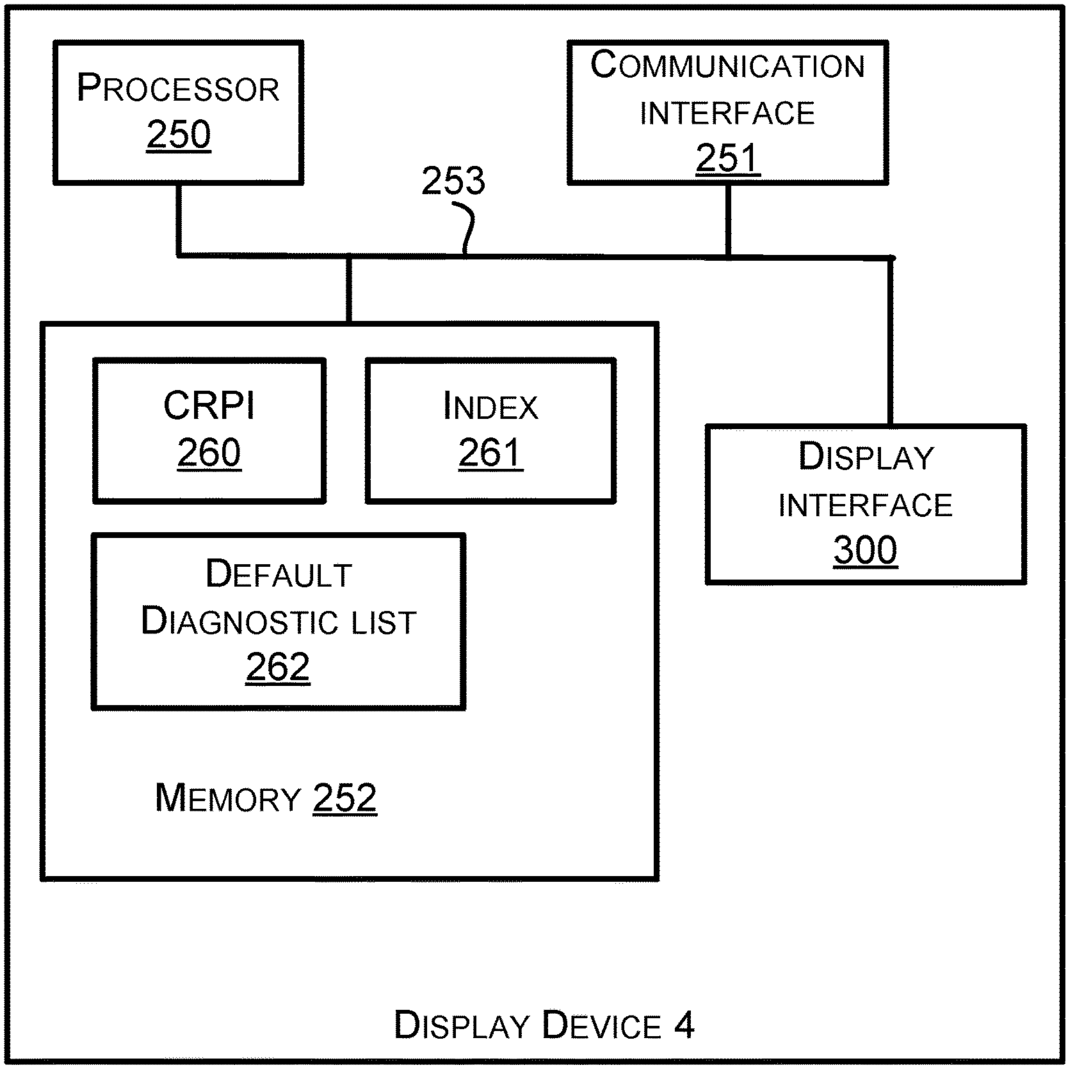
FIG. 23 is a block diagram of an example display device.

Next, FIG. 23 is a block diagram of the display device 4. In some examples, display device 4 may be a vehicle diagnostic tool or scanner. In other examples, display device 4 may be a tablet device, a cellular phone, a laptop or desktop computer, a head-mountable device (HMD), or a different type of fixed or mobile computing device. As shown in FIG. 23, the display device 4 comprises a processor 250, a communication interface 251, a memory 252, and a display interface 300. Two or more of those components can be communicatively coupled or linked together via a system bus, network, or other connection mechanism 253.

The processor 250 can comprise one or more processors. The processor 250 can include a general purpose processor (e.g., an INTEL® single core microprocessor or an INTEL® multicore microprocessor), or a special purpose processor (e.g., a digital signal processor, a graphics processor, or an application specific integrated circuit (ASIC) processor). The processor 250 can be configured to execute computer-readable program instructions (CRPI). For example, the processor 250 can execute CRPI 260 stored in the memory 252. The processor 250 can be configured to execute hard-coded functionality in addition to or as an alternative to software-coded functionality (e.g., via CRPI). The processor 250 can be programmed to perform any function or combination of functions described herein as being performed by the display device 4.

The memory 252 can include one or more memories. The memory 252 can comprise a non-transitory memory, a transitory memory, or both a non-transitory memory and a transitory memory. A non-transitory memory, or a portion thereof, can be located within or as part of a processor (e.g., within a single integrated circuit chip). A non-transitory memory, or a portion thereof, can be separate and distinct from a processor.

The memory 252 stores computer-readable data, such as the CRPI 260, an index 261, and a default diagnostic list 262.

The CRPI 260 can comprise a plurality of program instructions. The CRPI 260 can include data structures, objects, programs, routines, or other program modules that can be accessed by a processor and executed by the processor to perform a particular function or group of functions and are examples of program codes for implementing steps for methods described in this description.

In general, the CRPI 260 can include program instructions to cause the display device 4 to perform any function described herein as being performed by the display device 4 or to cause any item of the display device 4 to perform any function herein as being performed by that item of the display device 4. As an example, the CRPI 260 can include program instructions to perform the set of functions 360 shown in FIG. 34.

The index 261 may be the same as the index 61 described in reference to FIG. 6 and FIG. 8. In particular, the index 261 may include a listing of PIDs, component tests, functional tests, and/or reset procedures. In some examples, the index 261 may also include additional associated information. For example, as part of a PID index, PID descriptors may also be stored for display by the display device 4. As a further example, information indicating how to communicate a request for each PID value to the vehicle 9 may also be stored as part of a PID index.

The default diagnostic list 262 may be the same as the diagnostic list 65 described in reference to FIG. 6. In particular, the default diagnostic list 262 may be a cached version of the diagnostic list 65, in which case the default diagnostic list 262 may indicate particular PIDs, functional tests, component tests, and/or reset procedures to display for a given symptom or set of symptoms. In other examples, the default diagnostic list 262 may indicate which PIDs, functional tests, component tests, and/or reset procedures to display for any symptom when a symptom-based filter list is unavailable from server 2.

The communication interface 251 can include one or more communication interfaces. Each communication interface can include one or more transmitters configured to transmit data onto a network, such as the communication network 3. The data transmitted by the communication interface 251 can comprise any data described herein as being transmitted, output, and/or provided by the display device 4. Moreover, each communication interface can include one or more receivers configured to receive data carried over a network, such as the communication network 3. The data received by the communication interface 251 can comprise any data described herein as being received by the display device 4, such as vehicle identifying information or a DTC.

Figure 24:
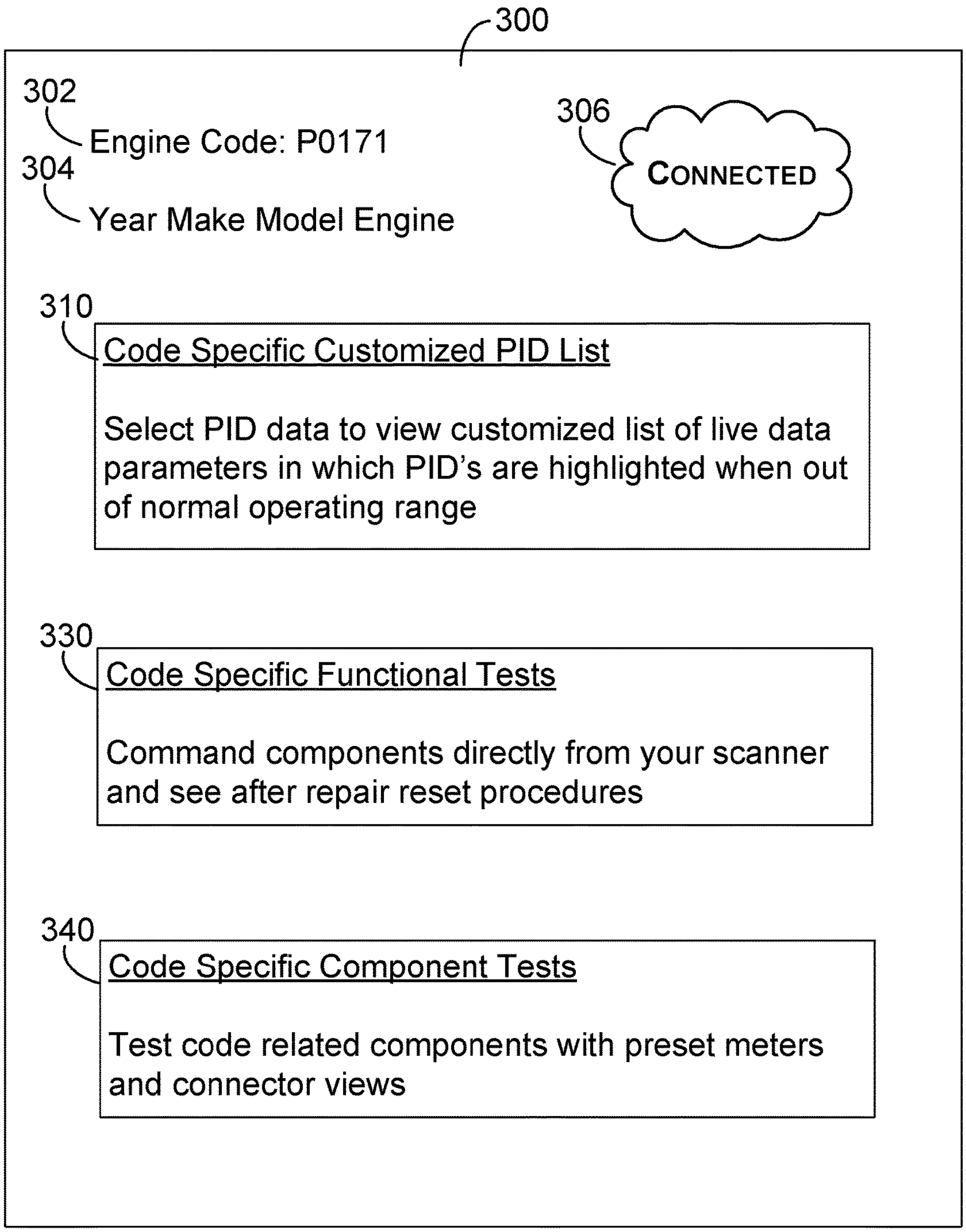
FIG. 24 shows an example display interface of a display device.

Next, FIG. 24 shows an example display interface. In particular, display interface 300 may be part of display device 4. In other examples, display interface 300 may be communicatively coupled to display device 4. In some examples, input data may be entered via display interface 300 with one or more input devices, such as a mouse, keyboard, or microphone. In another example, display interface 300 may be a touch-based interface.

Display interface 300 may display identifying information 304 about a vehicle to be serviced. The identifying information 304 may include a year, make, model, and engine as displayed in FIG. 24. In additional examples, the identifying information 304 may include different types of vehicle information as well or instead. The identifying information 304 may be received by display device 4 directly from vehicle 9. In other examples, the identifying information 304 may be received in another manner, such as through user input via display interface 300.

Display interface 300 may additionally include an indication of at least one symptom identifier 302. The at least one symptom identifier 302 may include a single DTC, such as engine code P0171. In other examples, the at least one symptom identifier 302 may include two or more DTCs. In further examples, the at least one symptom identifier 302 may include a different type of symptom identifier as well or instead. For instance, the at least one symptom identifier 302 may be entered via display interface 300 or a different user interface. In another example, the at least one symptom identifier 302 may be captured from a repair order.

Display interface 300 may further include an indicator of network connectivity 306 of display device 4. For instance, the indicator of network connectivity 306 may indicate that the display device 4 has an active wireless or wired network connection. In some examples, whether or not the display device 4 has network connectivity may be used to determine a state of the display interface 300. Different information may be displayed on display interface 300 depending on the current state of display interface 300.

Display interface 300 may additionally include one or more information cards 310, 330, and 340. Each of the information cards 310, 330, and 340 may be selectable via display interface 300. In some examples, selection of an information card may cause the card to switch to a dynamic mode in which live data is displayed. In further examples, a display interface may include different or additional information cards than those displayed in FIG. 24.

Display interface 300 includes PID card 310, which may be used to show a code-specific customized PID list. In particular, card 310 may display a subset of PIDs that are selected from a set of available PID's based on the at least one symptom identifier 302. As shown in FIG. 24, PID card 310 may be selected in order to view a customized list of PIDs with live PID data. Additionally, individual PIDs may be highlighted within PID card 310 when the individual PIDs are out of normal operating range.

Display interface 300 additionally includes functional test card 330, which may be used to show a code-specific list of functional tests. In particular, functional test card 330 may display a subset of functional tests that are selected from a set of available functional tests based on the at least one symptom identifier 302. As shown in FIG. 24, functional test card 330 may provide functional tests which allow vehicle components from vehicle 9 to be commanded directly from display device 4. In some examples, functional test card 330 may additionally display one or more code-specific reset procedures, which may be performed after one or more repair operations are completed. In additional examples, a separate reset procedure card may be provided within a display interface in order to display code-specific reset procedures.

Display interface 300 additionally includes component test card 340, which may be used to show a code-specific list of component tests. In particular, component test card 340 may display a subset of component tests that are selected from a set of available component tests based on the at least one symptom identifier 302. As shown in FIG. 24, component test card 340 may provide component tests which allow for the testing of code-related components with preset meters and connector views. More specifically, selection of a component test within display interface 300 may cause display device 4 to provide instructions to an oscilloscope or a multimeter which is connected to vehicle 9 in order to perform the selected component test on a component of vehicle 9.

Figure 25:
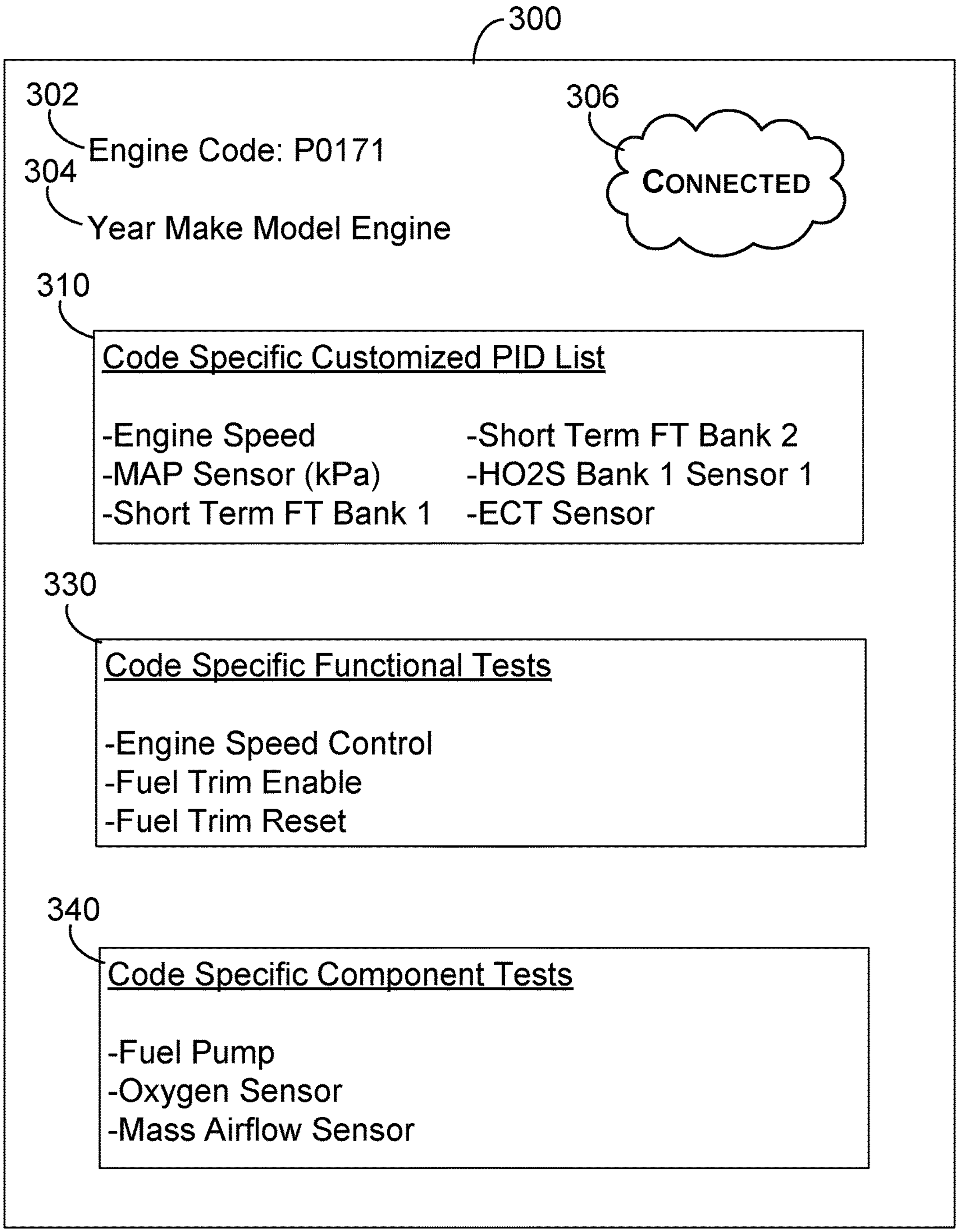
FIG. 25 shows an example display interface with code-specific diagnostic lists.

Next, FIG. 25 shows an example display interface which displays symptom-based subsets after application of diagnostic filter lists. In particular, PID card 310 displays a symptom-based subset of PIDs, functional test card 330 displays a symptom-based subset of functional tests and reset procedures, and component test card 340 displays a symptom-based subset of component tests.

PID card 310 displays a code-specific customized PID list which includes six different PIDs. The six PIDs have six corresponding descriptors: Engine Speed, Short Term FT Bank 2, MAP Sensor (kPa), HO2S Bank 1 Sensor 1, Short Term FT Bank 1, and ECT Sensor. This symptom-based subset of PIDs may be determined by display device 4 based on a PID filter list provided from server 2 for the at least one symptom identifier 302. In one example, PID descriptors may be displayed when PID card 310 is in a static mode, but live PID data may not be displayed. When PID card 310 is selected via display interface 300, PID card 310 may be switched to a dynamic mode in which live PID data is displayed. In some examples, live PID data may be requested by display device 4 and received from vehicle 9 in response to selection of PID card 310 via display interface 300.

Functional test card 330 displays a code-specific functional test list which includes three different functional tests and reset procedures. The three functional tests and reset procedures have three corresponding descriptors: Engine Speed Control, Fuel Trim Enable, and Fuel Trim Reset. This symptom-based subset of functional tests and reset procedures may be determined by display device 4 based on a functional test filter list from server 2 for the at least one symptom identifier 302. In one example, when a particular functional test is selected from functional test card 330, a functional test may be initiated by a communication from display device 4 to vehicle 9.

Component test card 340 displays a code-specific component test list which includes three different component tests. The three component tests relate to three different vehicle components: Fuel Pump, Oxygen Sensor, and Mass Airflow Sensor. This symptom-based subset of component tests may be determined by display device 4 based on a component test filter list from server 2 for the at least one symptom identifier 302. In one example, when a particular component test is selected from component test card 340, a component test may be initiated by a communication from display device 4 to a multimeter or an oscilloscope that is connected to vehicle 9.

Figure 26:
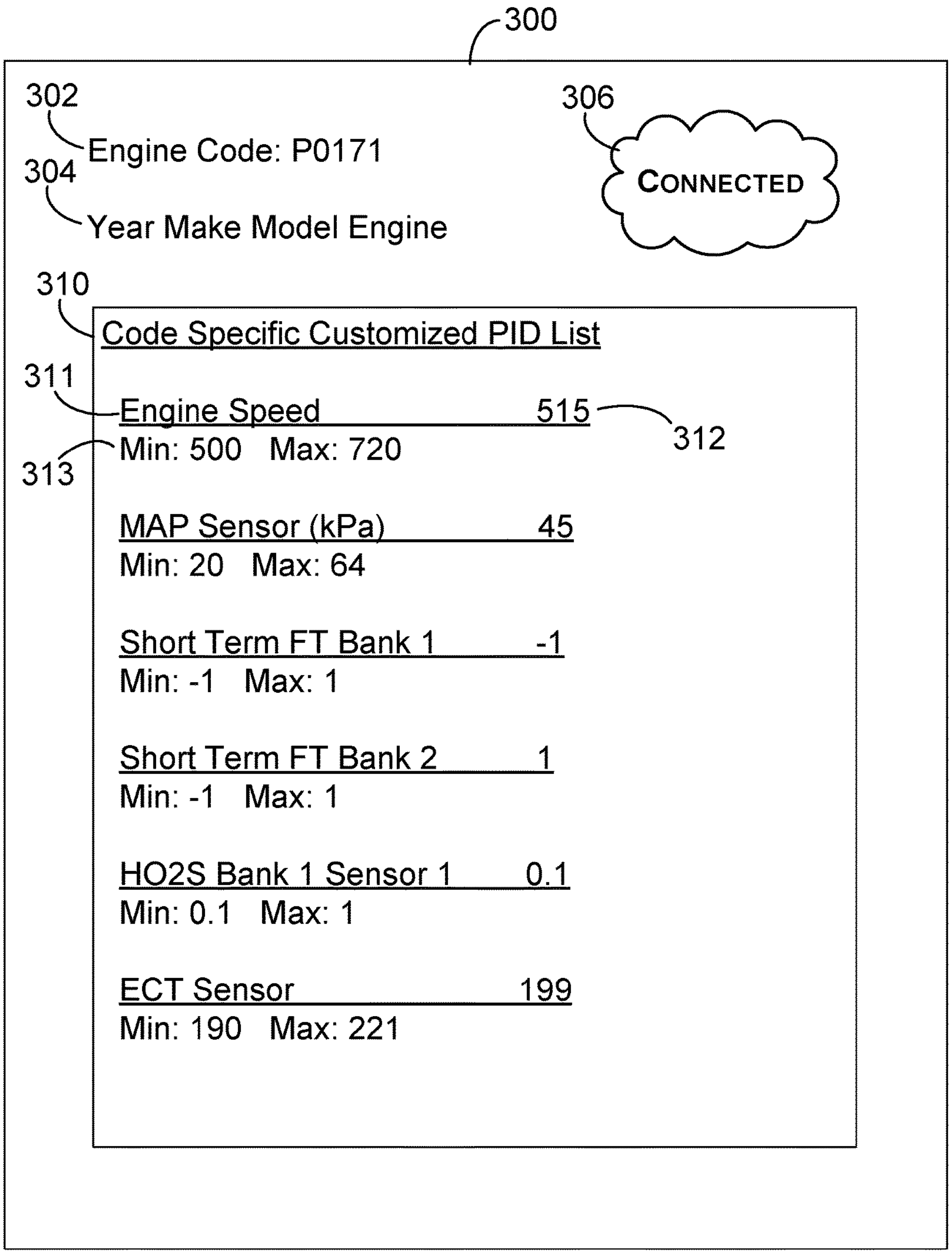
FIG. 26 shows an example display interface with a code-specific PID list and baseline ranges.

Next, FIG. 26 shows a display interface that displays live PID data. In particular, after selection of PID card 310 via display interface 300, PID card 310 may be switched to a dynamic mode in which live PID values are displayed. PID values may be received by display device 4 from vehicle 9 for each PID within the symptom-based subset of PIDs. For instance, the Engine Speed PID 311 has a corresponding value 312 of 515. This value 312 may be updated dynamically on display interface 300 when there is a change in the value 312 for the Engine Speed PID 311 received from vehicle 9. Similarly, the MAP Sensor PID may have a corresponding displayed value of 45, the Short Term FT Bank 1 PID may have a corresponding displayed value of −1, the Short Term FT Bank 2 PID may have a corresponding displayed value of 1, the HO2S Bank 1 Sensor 1 PID may have a corresponding value of 0.1, and the ECT Sensor PID may have a corresponding value of 199.

A baseline range may additionally be displayed within display interface 300 for each PID in the symptom-based subset of PIDs. For instance, baseline range 313 may be displayed the Engine Speed PID 311. The baseline range 313 may indicate a typical operating range between 500 and 720 for the Engine Speed PID 311. Baseline ranges are similarly displayed for each additional PID with the symptom-based subset of PIDs. In particular, the MAP Sensor PID has a baseline range between 20 and 64, the Short Term FT Bank 1 PID has a baseline range between −1 and 1, the Short Term FT Bank 2 PID has a baseline range between −1 and 1, the HO2S Bank 1 Sensor 1 PID has a baseline range between 0.1 and 1, and the ECT Sensor PID has a baseline range between 190 and 221.

In some examples, the displayed baseline ranges may be received by display device 4 from server 2. In other examples, baseline ranges for one or more displayed PIDs in the symptom-based subset of PIDs may be unavailable from server 2. For such PIDs, prompts may be provided via display interface 300 to allow a technician to input a minimum and maximum value for the PID. In further examples, default baseline ranges may be stored on display device 4 for certain PIDs. In such examples, when a baseline range for a given PID is unavailable from server 2, a default baseline range stored on display device 4 for the given PID may instead be displayed. A technician may only be queried for minimum and maximum values if a baseline range is unavailable from server 2 and display device 4 also lacks a default baseline range for the given PID.

Display interface 300 may additionally provide a listing of other available PIDs not in the symptom-based subset of PIDs for selection by a technician. For instance, the other available PIDs may be viewable within a drop-down menu. Upon selection of a particular PID from the other available PIDs, the particular PID may be added to PID card 310 so that a technician may view live values for the particular PID.

Additionally, display device 4 may send a message to server 2 indicating that the particular PID was selected for a vehicle having identifying information 304 and the at least one symptom identifier 302. The server 2 may process such messages in order to determine associations between particular PIDs and vehicle symptoms.

In further examples, display interface 300 may additionally provide an option to remove one or more PIDs from PID card 310. For instance, when a particular PID from the other available PIDs is added to PID card 310 by a technician, the technician may be required to select an existing PID from PID card 310 for removal. Display device 4 may send a message to server 2 indicating that the existing PID was selected for removal for a vehicle having identifying information 304 and the at least one symptom identifier 302. The server 2 may process such messages in order to disassociate particular PIDs and vehicle symptoms.

Figure 27:
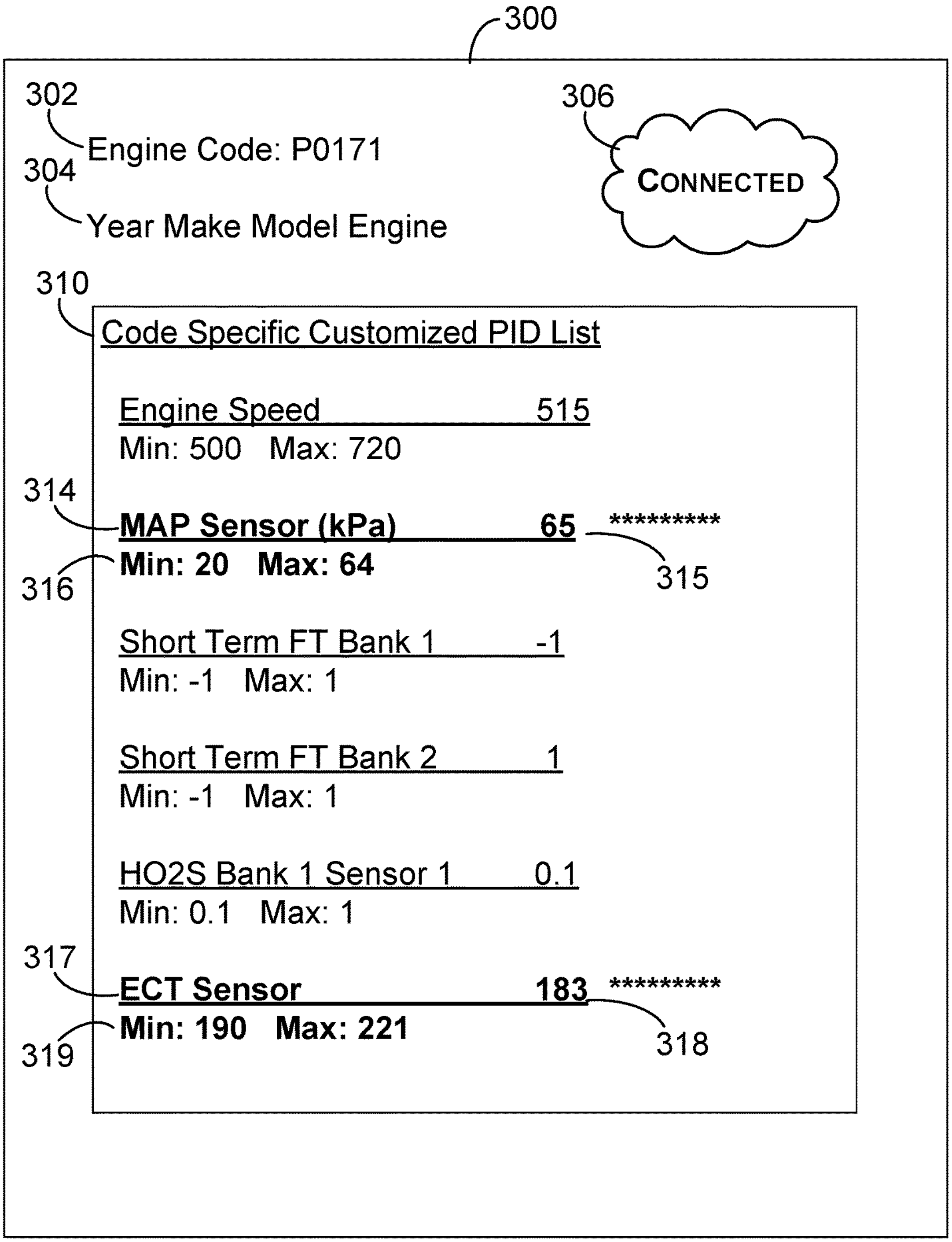
FIG. 27 shows an example display interface with a code-specific PID list and PIDs with out-of-range values.

Next FIG. 27 shows a display interface in which PIDs with corresponding values outside of baseline ranges have been highlighted. In particular, the MAP Sensor PID 314 may have a value 315 of 65, which is outside of the baseline range 316 between 20 and 64. Accordingly, the MAP Sensor PID 314 may be highlighted in display interface 300 by changing its color (e.g., to red), providing a separate out-of-range indicator, or otherwise distinguishing it. Additionally, the ECT Sensor PID 317 may have a value 318 of 183, which is outside of the baseline range 319 between 190 and 221. Accordingly, the ECT Sensor PID 317 may also be highlighted in display interface 300.

The display interface 300 may therefore first provide a DTC-based or symptom-based subset of PIDs to provide a technician with PIDs of interest to focus on for a particular DTC or symptom. If machine learned baseline ranges are available for those PIDs of interest, the display interface 300 may also display the baseline ranges and highlight out-of-range PIDs to further facilitate a technician's ability to diagnose a vehicle being serviced.

In some examples, baseline ranges received by display device 4 from server 2 may not be displayed on display interface 300, but may still be used to highlight out-of-range PIDs. The derived baseline ranges provided by server 2 may therefore be concealed by display device 4. By contrast, user-entered baseline ranges may always be displayed within display interface 300.

Figure 28:
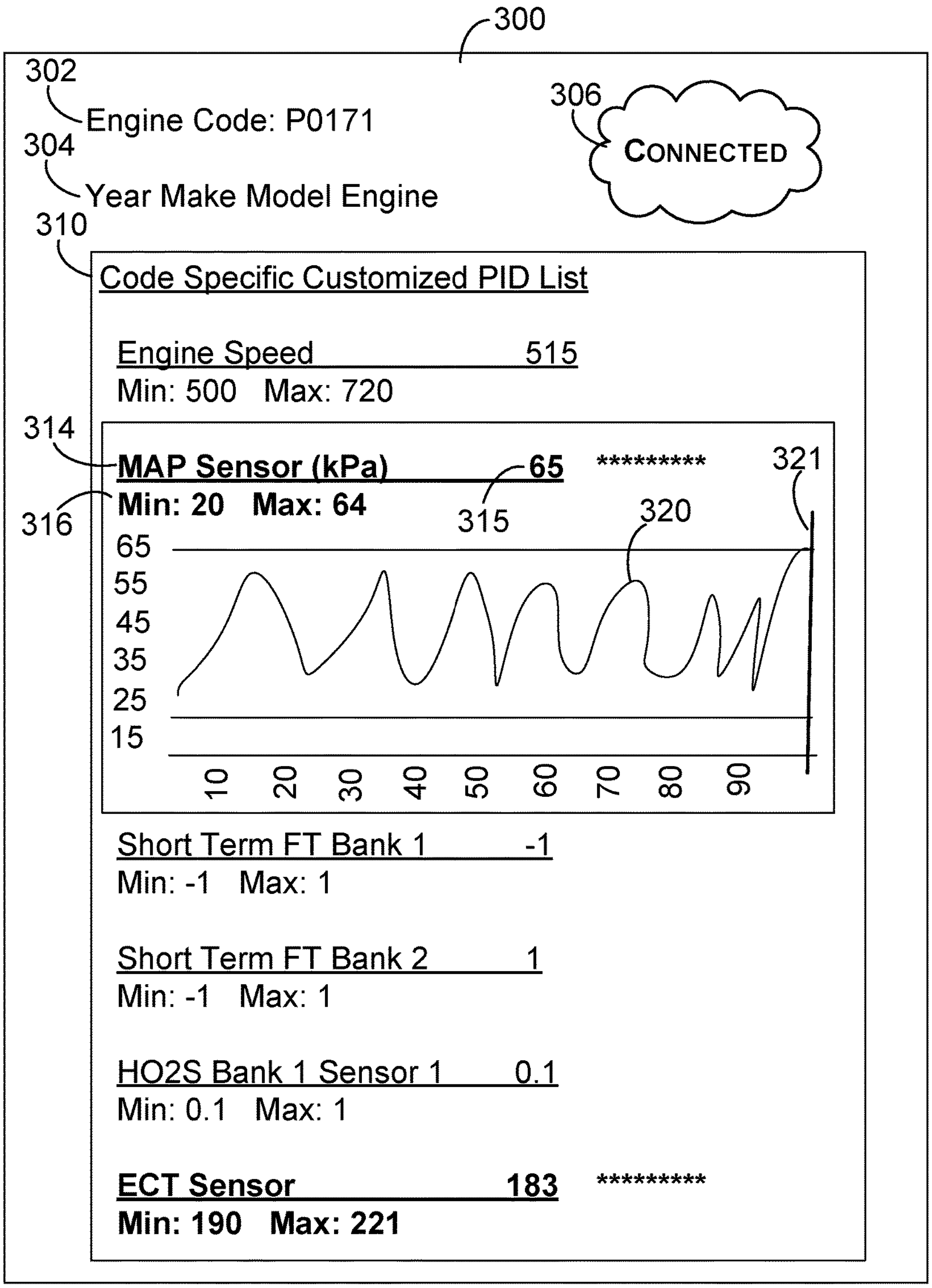
FIG. 28 shows an example display interface with a code-specific PID list and a plot of PID values.

Next, FIG. 28 shows a display interface in which a plot of PID values is displayed. In particular, the value 315 of the MAP Sensor PID 314 may be graphed over time as plot 320. Additionally, the baseline range 316 may be shown on the plot as two horizontal lines corresponding to the minimum and maximum values of the baseline range 316. As soon as the value 315 crosses outside of the baseline range 316 (e.g., by rising to a value of 65, which is outside of the range between 20 and 64), the MAP Sensor PID 314 may be highlighted. Additionally, a cursor 321 may be provided to allow a technician to quickly scroll back through past values of the PID.

In an additional example embodiment, a history of PID data may be recorded as soon as a PID value crosses outside of its baseline range (e.g., the previous 10 seconds). The history of PID data may be recorded only for the particular PID that is out-of-range, or it may be recorded for all displayed PIDs. The recording may be used to allow a technician to replay PID values to help diagnose why a particular PID went out of its baseline range at a particular point in time.

Figure 29:
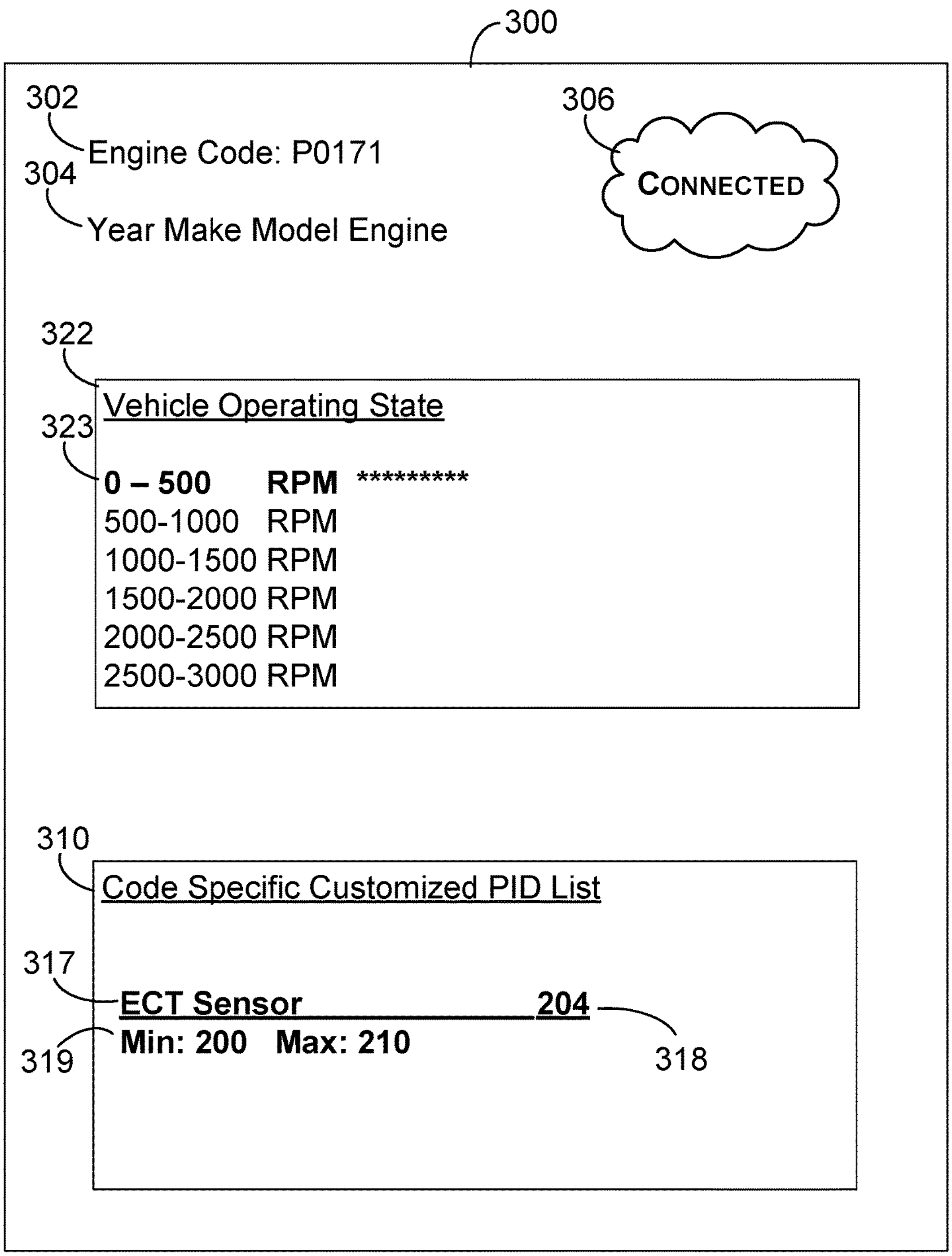
FIG. 29 shows an example display interface with multiple vehicle operating states.

Next, FIG. 29 shows a display interface in which displayed baseline ranges are varied based on vehicle operating state. In particular, vehicle operating state 322 may be indicative of the current RPM of the engine of vehicle 9. In one example, a plurality of different possible states may be displayed within display interface 300. In particular, a plurality of different ranges of RPM may be displayed. A range that corresponds to the current operating state of vehicle 9 may be selected or highlighted. In this case, range 323 corresponding to an RPM value between 0 and 500 may be highlighted. The baseline ranges for PIDs displayed within the PID card 310 may then be selected based on the current vehicle operating state. In particular, baseline range 319 for the ECT Sensor PID 317 may be adjusted to correspond to the current vehicle operating state. For instance, a narrower baseline range may be used when the vehicle operating state represents a lower RPM value.

Multiple baseline ranges for a particular PID may be provided by server 2 to display device 4. Each baseline range may correspond to a different operating state of vehicle 9. In this manner, more precise baseline ranges may be displayed to a technician in situations where the typical value range for a PID is different depending on vehicle operating state. When the vehicle operating state changes, the baseline ranges displayed on display interface 300 may responsively be changed to correspond to the new vehicle operating state.

In some examples, display device 4 may detect the current vehicle operating state. For instance, display device 4 may determine the current vehicle operating state based on data received from vehicle 9 or from another device in communication with vehicle 9. Display device 4 may then automatically determine the vehicle operating state and provide an indication of the current vehicle operating state to a technician.

In other examples, an input mechanism may be provided for a technician to select the current vehicle operating state. For instance, a dropdown menu may be provided with several different possible vehicle operating states for which server-provided baseline ranges are available. When a technician selects the current vehicle operating state via the input mechanism, the corresponding baseline ranges for displayed PID's may automatically displayed. In other examples, the corresponding baseline ranges may not be displayed, but may still be used to identify when a PID value goes out of range as previously described.

In further examples, baseline ranges may only be available for a particular vehicle operating state. For instance, a particular vehicle operating state may have been used to generate the baseline ranges (e.g., only PID data collected when the vehicle was in the particular vehicle operating state may have been used by server 2 to generate the baseline ranges). In such a scenario, an indication of the particular vehicle operating state may be displayed on display interface 300 to help a technician put the vehicle into an operating state for which the displayed baseline ranges are accurate.

In additional examples, one or more cues may be provided to assist a technician in putting a vehicle into an operating state for which baseline ranges are available. The cues may be visual cues, audio cues, tactile cues, or a different type of feedback. For instance, audio cues may instruct a technician to raise the RPM of a vehicle until an RPM is reached for which baseline ranges for the displayed PIDs are available.

In another example, the vehicle operating state may correspond to a geographical location of the vehicle. For instance, different baseline ranges may be generated by server 2 for vehicles located in a first area than for vehicles located in a second area. External factors such as weather conditions may cause the typical operating baseline ranges to be different for the same type of vehicle when the vehicle is located in a different geographical location.

In a further example, the vehicle operating state may correspond to different ranges of engine temperature for the engine of the vehicle. In some examples, a vehicle operating state may include a combination of two or more different states, such as a combination of RPM and engine temperature. Other vehicle operating states may also be used as well or instead.

In an additional example, server 2 may provide multiple different PID filter lists that correspond to different vehicle operating states for a given at least one symptom identifier. In that case, display device 4 may determine which PID filter list to apply and which symptom-based subset of PIDs to display based on a current operating state of the vehicle 9. Similarly, server 2 may also provide multiple different functional test filter lists or component test filter lists that correspond to different vehicle operating state for a given at least one symptom identifier. In that case, display device 4 may determine which tests to display as part of a symptom-based subset based on the current vehicle operating state.

In a further example, display device 4 may deactivate the flagging of PIDs with out-of-range values based on the current vehicle operating state. In particular, server 2 may provide an indication of a vehicle operating state for which PID baseline ranges are to be applied. If display device 4 determines that the current vehicle operating state does not correspond to the vehicle operating state indicated by server 2, display device 4 may stop flagging PIDs with out-of-range values so as not to distract a technician with inapplicable warnings. As an example, a baseline range for a particular PID may have been generated by server 2 based on PID data from vehicles at idle (e.g., between 600 RPM and 900 RPM). If display device 4 determines that a current vehicle being serviced is operating at 2200 RPM, display device 4 may refrain from flagging the particular PID even if the particular PID has a value outside of the baseline range indicated by server 2. As previously discussed, display device 4 may additionally provide one or more cues in order to indicate to a technician how to switch the vehicle to an operating state at which the baseline range may be applied.

Figure 30:
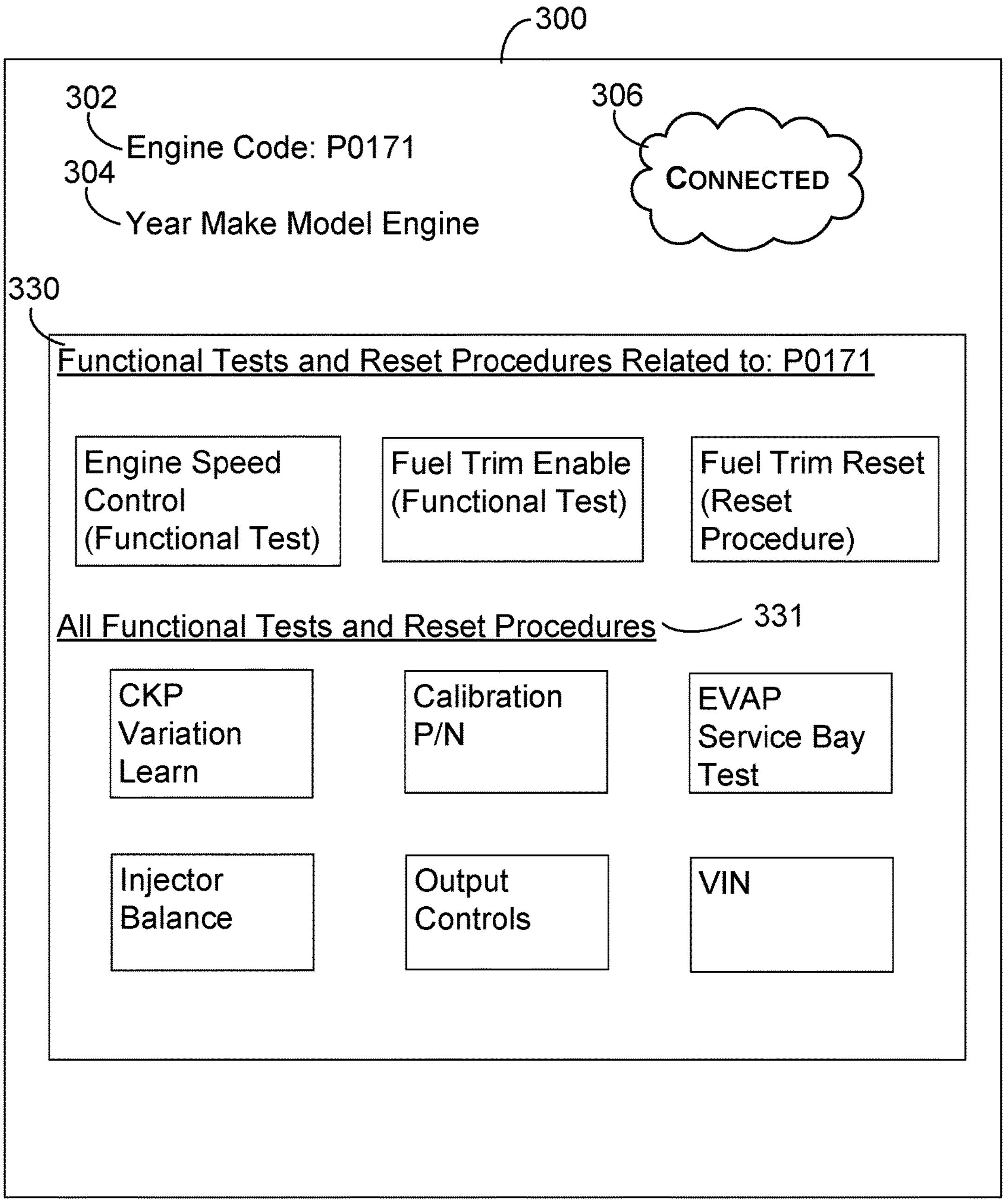
FIG. 30 shows an example display interface with code-specific functional tests and reset procedures.

Next, FIG. 30 shows a display interface that displays symptom-based functional tests and reset procedures as well as other available functional tests and reset procedures. In particular, functional test card 330 may display functional tests and reset procedures related to engine code P0171. These symptom-based functional tests and reset procedures may be identified by server 2 for display device 4, and provided as a functional test filter list. In this example, the identified functional tests and reset procedures include engine speed control (functional test), fuel trim enable (functional test), and fuel trim reset (reset procedure).

Additionally, the display interface 300 may also show all available functional tests and reset procedures 331, which may include any available functional tests and reset procedures that were not identified for the symptom-based subset. The other available functional tests and reset procedures 331 may be displayed within functional test card 330, or as part of a separate window. In this case, the other available functional tests and reset procedures 331 include CKP variation learn, calibration P/N, EVAP service bay test, injector balance, output controls, and VIN.

In some cases, when a particular functional test or reset procedure from the other available functional tests and reset procedures 331 is selected to be performed on the vehicle 9, display device 4 may send a message to server 2 indicating the selected test or reset procedure as well as the at least one symptom identifier 302. Such a message may help server 2 learn to associate the selected functional test or reset procedure with the at least one symptom identifier 302 for future requests.

As previously noted, reset procedures may be included within functional tests or provided in a separate section. In some cases, reset procedures may only be displayed as part of the symptom-based subset of reset procedures or the other available reset procedures after a particular service operation has been completed on vehicle 9. In some cases, server 2 may identify the particular service operation (e.g., installation of a vehicle component) for which a particular reset procedure should be displayed. Display device 4 may then monitor the vehicle 9 for completion of the particular service operation in order to determine when to display the particular reset procedure within the display interface.

Figure 31:
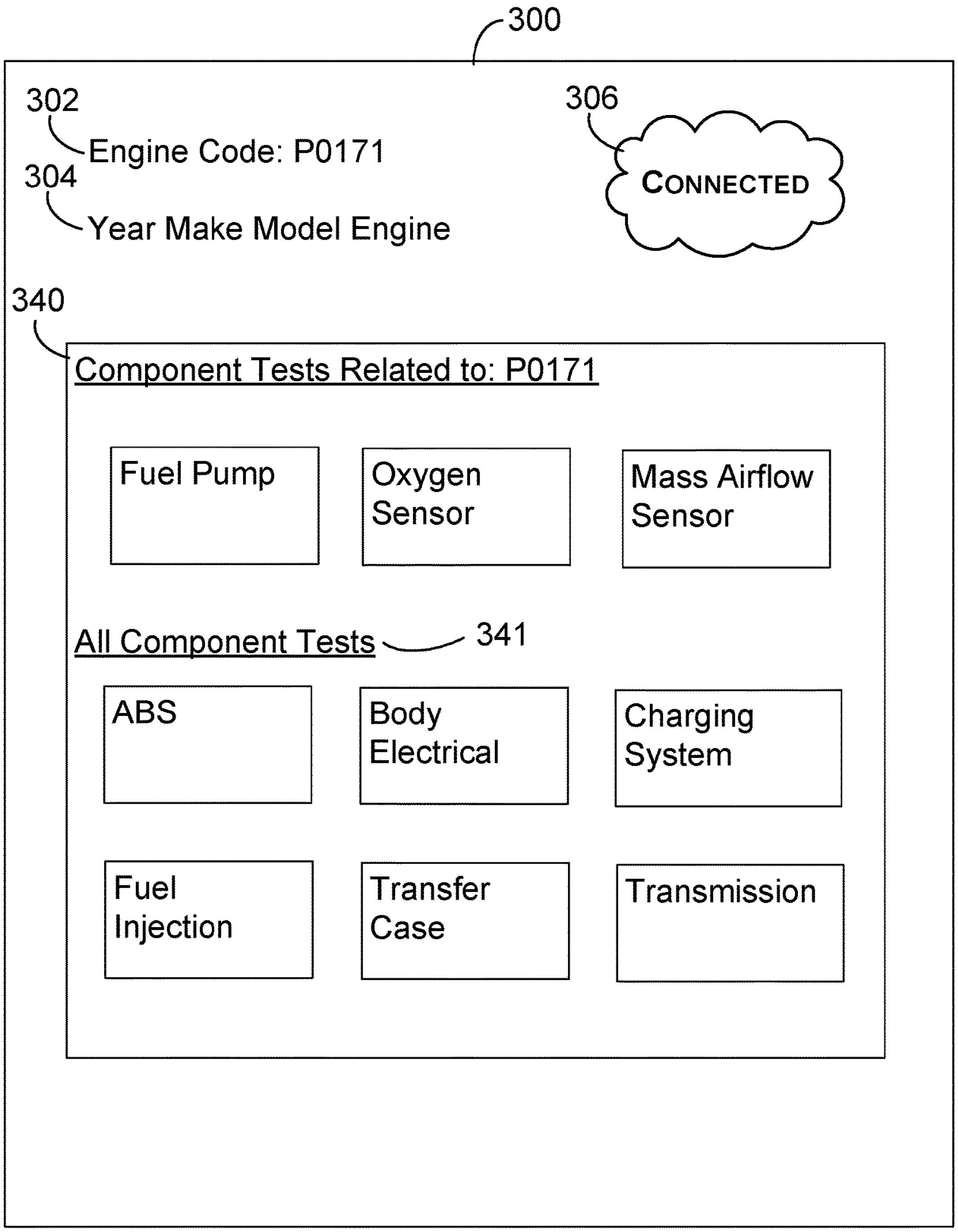
FIG. 31 shows an example display interface with code-specific component tests.

Next, FIG. 31 shows a display interface that displays symptom-based component tests as well as other available component tests. In particular, component test card 340 may display component tests related to engine code P0171. These symptom-based component tests may be identified by server 2 for display device 4, and provided as a component test filter list. In this example, the identified components include component tests for the fuel pump, the oxygen sensor, and the mass airflow sensor.

Additionally, the display interface 300 may also show all available component tests 341, which may include any available component that were not identified for the symptom-based subset. The other available component tests 341 may be displayed within component test card 340, or as part of a separate window. In this case, the other available component tests 341 include component tests for the anti-lock brakes (ABS), body electrical, charging system, fuel injection, transfer case, and transmission.

When a particular component test is selected from either the symptom-based subset or the other available component tests, display device 4 may send a message to another device such as a multimeter or oscilloscope to perform the selected component test. In some cases, when a particular component test from the other available component tests 331 is selected to be performed on the vehicle 9, display device 4 may send a message to server 2 indicating the selected component test as well as the at least one symptom identifier 302. Such a message may help server 2 learn to associate the selected component tests with the at least one symptom identifier 302 for future requests.

In additional examples, functional tests, reset procedures, and/or component tests displayed within a symptom-based subset may be arranged within display interface 300 based on information received by display device 4 from server 2. In one example, tests may be arranged based on associated vehicle component. For instance, two symptom-based functional tests may relate to a first vehicle component while a different two symptom-based functional tests may relate to a second vehicle component. In that case, the display interface 300 may indicate to which component each functional test relates. Additionally, the functional tests may be ordered on the display interface 300 according to which component they relate. For instance, server 2 may indicate that the first vehicle component has a higher probability of failure based on the at least one symptom identifier 304 than the second vehicle component. In that case, the two symptom-based functional tests related to the first vehicle component may be displayed before the two symptom-based functional tests related to the second vehicle component.

In a further example, functional tests, reset procedures, and/or component tests may be ordered according to a ranking based on performance frequency. For instance, a symptom-based subset of component tests may include three component tests. Server 2 may provide a ranking of the three component tests based on how often each of the component tests has been applied in the past for vehicles having identifying information 304 and the at least one symptom identifier 302. The component tests may then be ordered on display interface 300 according to the provided ranking. The display interface 300 may additionally display a numerical ranking of each of the three component tests.

Figure 32:
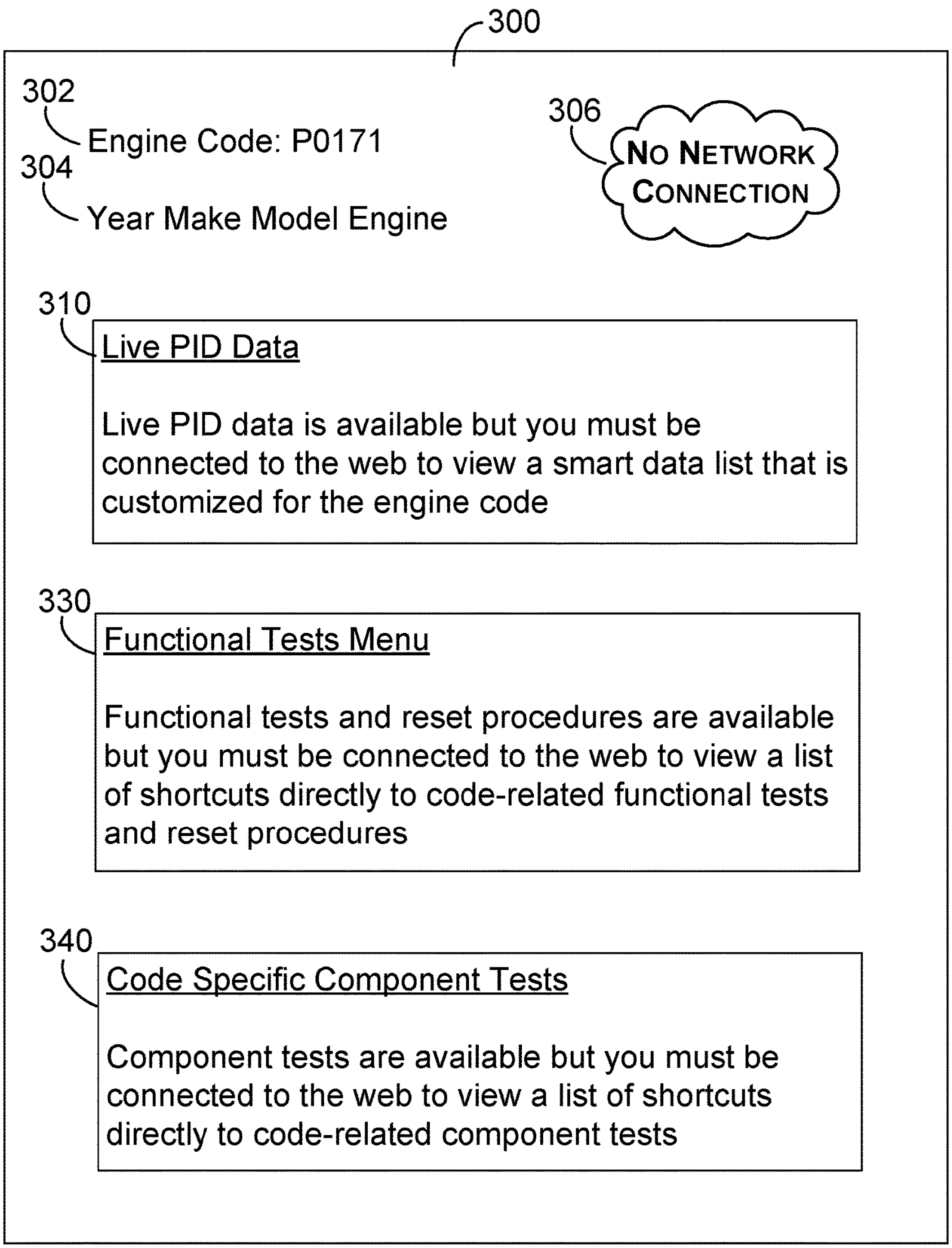
FIG. 32 shows an example display interface in a disconnected state.

Next, FIG. 32 shows a display interface in a degraded state. More specifically, the network connectivity indicator 306 within display interface 300 may indicate that display device 4 lacks a network connection to server 2. In this state, display device 4 may still have a connection to vehicle 9 in order to receive PID data from vehicle 9 and/or perform one or more tests on vehicle 9. However, display device 4 may not be able to receive filter lists associated with PIDs, functional tests, or components tests. PID card 310, functional test card 330, and component test card 340 may display messages in order to indicate that symptom-based subsets of PIDs and tests are available and may be displayed when a network connection is active.

In some examples, when PIDs and/or tests are unavailable for display device 4 from server 2, display device 4 may have access to one or more default filter lists stored within memory on display device 4. The default filter lists may include default PID filter lists, default functional test filter lists, and/or default component test filter lists. In some examples, the default filter lists may indicate PIDs and/or tests to display regardless of the at least one symptom identifier 302. In other examples, different default filter lists may be associated with different symptom identifiers. For instance, the default filter lists may be cached versions of symptom-based filter lists previously provided to the display device 4 by server 2. When one or more default filter lists are available within local memory of display device 4, the display interface 300 may be considered to be in a partially degraded state.

In further examples, display device 4 may not be able to receive filter lists from server 2 and may also lack default filter lists within local memory. In this case, the display interface 300 may be considered to be in a fully degraded state. In this state, any available PIDs, functional tests, and/or component tests may be displayed within display interface 300. A technician may then be provided with a prompt to select PIDs to display and/or tests to perform. An additional prompt may be provided to allow for the entry of baseline ranges corresponding to different PIDs.

In additional examples, display interface 300 may be in a hybrid state in which certain types of symptom-based information are available, but not other types. For instance, a symptom-based subset of PIDs for a particular symptom identifier may be displayed. However, symptom-based functional tests and component tests may be unavailable. In that case, all available functional tests and component tests may be displayed via display interface 300.

In further examples, the state of display interface 300 may be based on other factors besides network connectivity. For instance, different levels of subscriptions to different types of filter lists may be available. In that case, a current subscription of a user may be used to determine what information is displayed via display interface 300.

Figure 33:
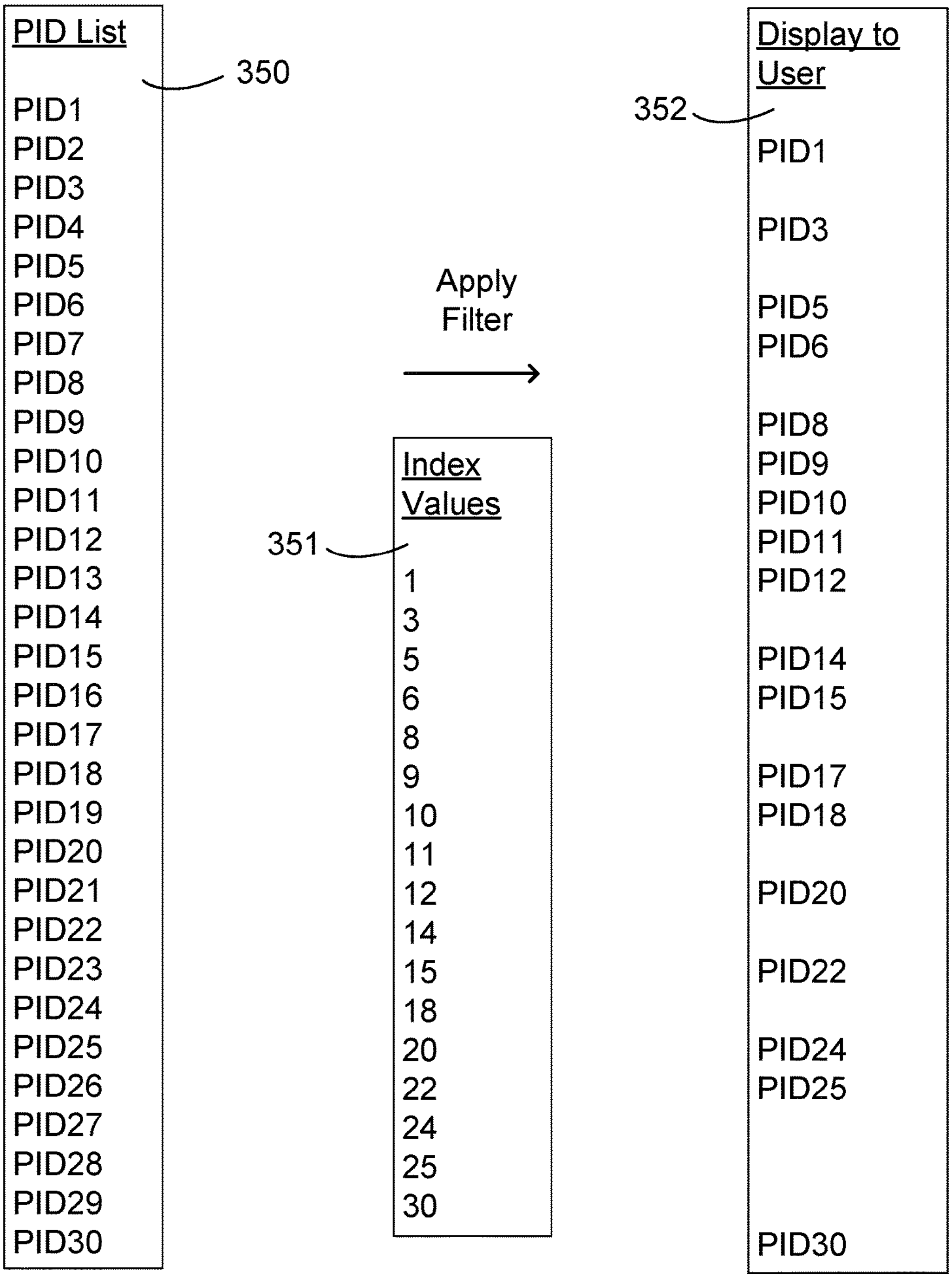
FIG. 33 shows an example PID filter list.

Next, FIG. 33 shows application of a PID filter list to display a symptom-based subset of PIDs. More specifically, an ordered list 350 of PIDs may be stored within memory of display device 4. In some examples, the ordered list 350 may be a single ordered list of PIDs for all vehicle types. In other examples, the ordered list 350 may be determined and/or stored specifically for vehicles sharing certain identifying information. The ordered list 350 may be the same as a corresponding ordered list stored at server 2 in order to facilitate the application of a PID filter list by display device 4 that has been received from server 2.

Display device 4 may receive index values 351 from server 2 that make up a PID filter list. The index values 351 may represent entries from the ordered list 350 of PIDs stored within memory of display device 4. Display device 4 may select PIDs from the ordered list 350 that correspond to index values 351 in order to determine a symptom-based subset 352 of PIDs to display within display interface 300. In this manner, a minimal amount of information may be transmitted over a network connection between server 2 and display device 4. Display device 4 may locally store information about individual PIDs as part of ordered list 350. For example, this stored information may include full PID descriptors to display within display interface 300. The stored information may also include instructions for requesting corresponding PID values from vehicle 9.

In further examples, an ordered list of functional tests stored on display device 4 may be the same as a corresponding ordered list of functional tests stored at server 2. A functional test filter list received by display device 4 from server 2 may include index values that represent entries from the ordered list of functional tests. The functional test filter list may be applied by display device 4 to determine a symptom-based subset of functional tests for display to a technician.

In additional examples, an ordered list of reset procedures stored on display device 4 may be the same as a corresponding ordered list of reset procedures stored at server 2. A reset procedure filter list received by display device 4 from server 2 may include index values that represent entries from the ordered list of reset procedures. The reset procedure filter list may be applied by display device 4 to determine a symptom-based subset of reset procedures for display to a technician.

In further examples, an ordered list of component tests stored on display device 4 may be the same as a corresponding ordered list of component tests stored at server 2. A component test filter list received by display device 4 from server 2 may include index values that represent entries from the ordered list of component tests. The component test filter list may be applied by display device 4 to determine a symptom-based subset of component tests for display to a technician.

In yet further examples, a single ordered list may include multiple types of entries, including any combination of PIDs, functional tests, reset procedures, and component tests. A diagnostic filter list sent by server 2 to display device 4 may then include index values for multiple types of entries. For instance, the diagnostic filter list may include index values corresponding to both PIDs and component tests. In that case, the diagnostic filter list may be applied by display device 4 to determine both a symptom-based subset of PIDs and a symptom-based subset of component tests for display.

Figure 34:
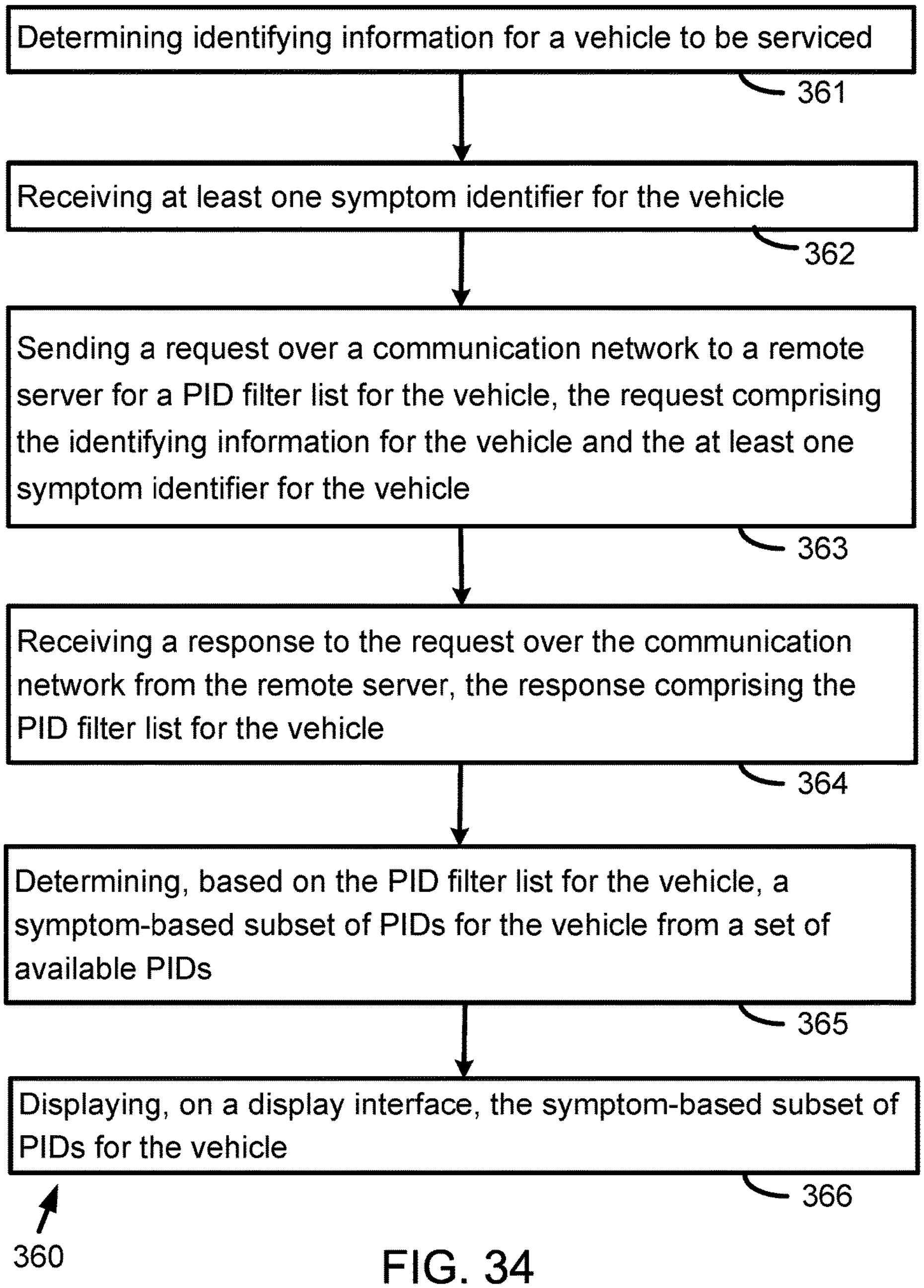
FIG. 34 is a flowchart depicting a set of functions that can be carried out in accordance with the example embodiments.

Next, FIG. 34 shows a flowchart depicting a set of functions 360 (or more simply "the set 360") that can be carried out in accordance with the example embodiments described in this description. The set 360 includes the functions shown in blocks labeled with whole numbers 361 through 366 inclusive. The following description of the set 360 includes references to elements shown in other figures described in this description, but the functions of the set 360 are not limited to being carried out only by the referenced elements. A variety of methods can be performed using all of the functions shown in the set 360 or any proper subset of the functions shown in the set 360. Any of those methods can be performed with other functions such as one or more of the other functions described in this description.

Block 361 includes determining identifying information for a vehicle to be serviced. The identifying information may define a particular set of vehicles in any of the manners described herein, including but not limited to a year, make, model, and/or engine. In some examples, the identifying information may be received from vehicle 9. In other examples, the identifying information may be received in a different manner. For instance, the identifying information may be entered via display interface 300 or captured from a repair order. The vehicle may be serviced as part of a repair procedure, a maintenance procedure, or a different type of service procedure.

Next, block 362 includes receiving at least one symptom identifier for the vehicle. In some examples, the at least one symptom identifier may be a single DTC. In further examples, the at least one symptom identifier may include two or more DTCs. One or more DTCs may be received by display device 4 from vehicle 9. In other examples, the at least one symptom identifier may be a different type of identifier. For example, the at least one symptom identifier may be entered via display interface 300 (e.g., by selecting one or more vehicle symptoms from a predetermined drop-down list). In another example, the at least one symptom identifier may be captured from a repair order.

Next, block 363 includes sending a request over a communication network to a remote server for a PID filter list for the vehicle. The request may include the identifying information for the vehicle and the at least one symptom identifier for the vehicle. The request may be transmitted over a wireless or wired connection. In some examples, the request may be for a functional test filter list, a reset procedure filter list, and/or a component test filter list in addition to or instead of a request for a PID filter list.

Next, block 364 includes receiving a response to the request over the communication network from the remote server. The response may include the PID filter list for the vehicle. In some examples, the PID filter list may include index values into an ordered list of PIDs stored in a memory of display device 4. In other examples, the PID filter list may include another type of PID identifier and/or descriptor.

In further examples, the response may include a functional test filter list, a reset procedure filter list, and/or a component test filter list in addition to or instead of a PID filter list. In some examples, a single filter list may identify multiple types of diagnostic information. For instance, a single filter list may identify both PIDs and tests. In one example, an ordered list of diagnostic information may be stored in memory of display device 4 that includes both PIDs and tests. The filter list may then include index values into the ordered list that identify at least one PID and at least one test.

Next, block 365 includes determining, based on the PID filter list for the vehicle, a symptom-based subset of PIDs for the vehicle from a set of available PIDs. The set of available PIDs may be all PIDs available for a vehicle having particular identifying information. In other examples, the set of available PIDs may include PIDs for multiple sets of vehicles each having different identifying information. In one example, the symptom-based subset of PIDs may be determined by selecting PIDs from an ordered list of PIDs stored on display device 4.

In further examples, a symptom-based subset of functional tests may be determined from a set of available functional tests as well or instead. In additional examples, a symptom-based subset of reset procedures may be determined from a set of available reset procedures as well or instead. In further examples, a symptom-based subset of component tests may be determined from a set of available component tests as well or instead.

Next, block 366 includes displaying, on a display interface, the symptom-based subset of PIDs for the vehicle. In particular, corresponding descriptors for PIDs within the subset may be displayed within a PID card. When the PID card is selected, the PID card may switch to a dynamic mode in which live PID values are displayed for the PIDs within the subset. In further examples, an indication of a component to which PIDs within the subset pertain may also be displayed within the display interface. In additional examples, certain PIDs within the subset may pertain to a particular vehicle component and other PIDs within the subset may pertain to one or more related components. In that case, PIDs may be categorized within the display interface based on which component or system they relate to.

In further examples, a symptom-based subset of functional tests, a symptom-based subset of reset procedures, and/or a symptom-based subset of component tests may be displayed as well or instead. When a functional test or reset procedure is selected, instructions may be provided by display device 4 to vehicle 9 to perform the selected functional test or reset procedure. When a component test is selected, instructions may be sent to a multimeter or oscilloscope to perform the selected component test on vehicle 9.

Figure 36:
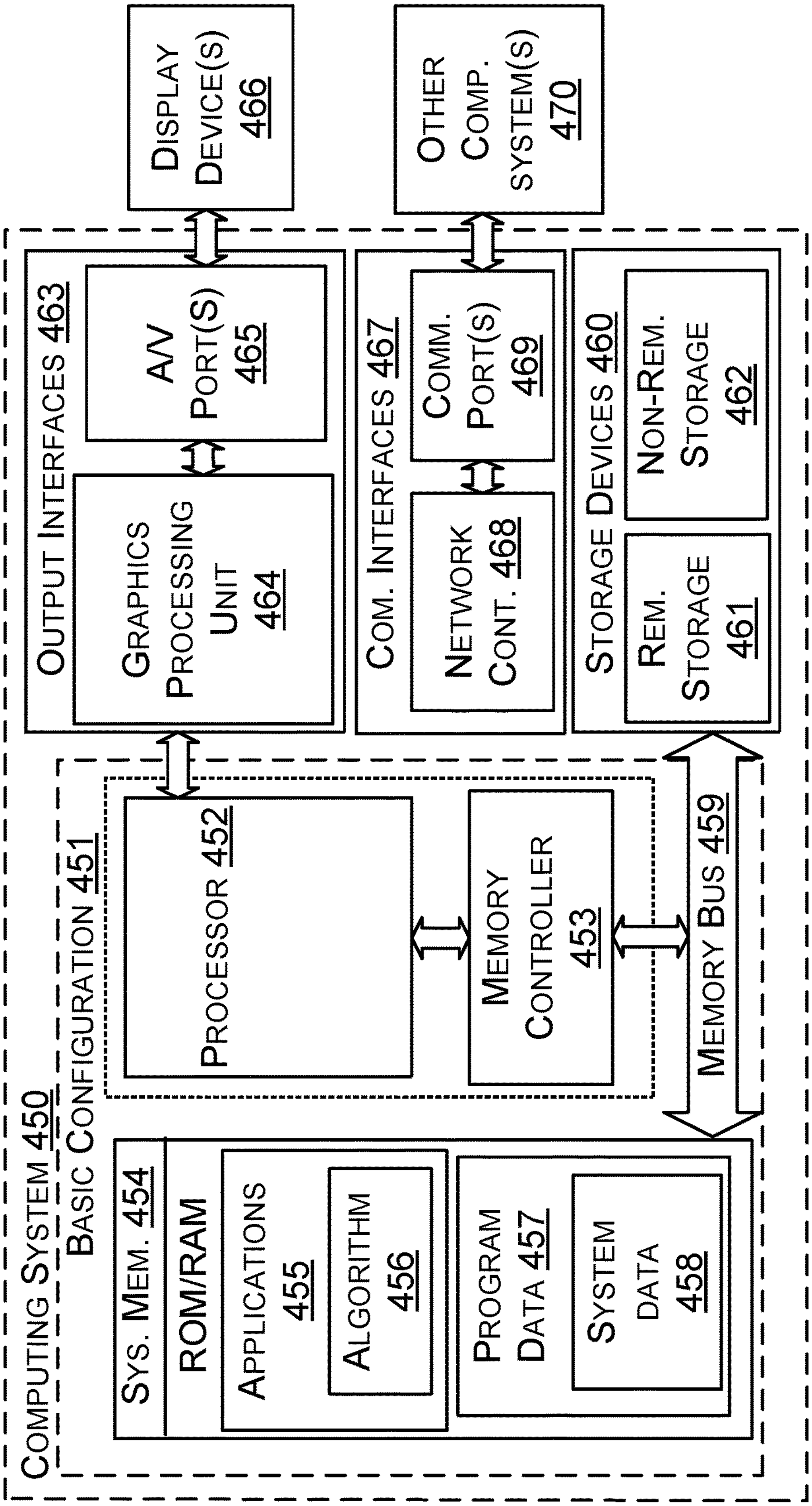
FIG. 36 is a functional block diagram illustrating a computing system that is arranged in accordance with at least some example embodiments.

The server 2, the display device 4, and the RO device 10 comprise a computing system. The server 2, the display device 4, and/or the RO device 10 can comprise any of the components of an example computing system 450 shown in FIG. 36, which is a functional block diagram illustrating an example computing system.

In a basic configuration 451, the computing system 450 can include one or more processors 452 and a system memory 454. A memory bus 459 can be used for communicating between the processor 452 and the system memory 454. Depending on the desired configuration, the processor 452 can be of any type including but not limited to a microprocessor (μP), a microcontroller (μC), a digital signal processor (DSP), or any combination thereof. A memory controller 453 can also be used with the processor 452, or in some implementations, the memory controller 453 can be an internal part of the processor 452.

Depending on the desired configuration, the system memory 454 can be of any type including but not limited to volatile memory (such as RAM), non-volatile memory (such as ROM, flash memory, etc.) or any combination thereof. The system memory 454 can include one or more applications 455, and program data 457. The application 455 can include an algorithm 456 that is arranged to perform the functions described as being performed by the server 2, the display device 4, or the RO device 10. The program data 457 can include system data 458 that could be directed to any number of types of data, such as one more of the following types of data: the index 61, the mapping data 62, the RO data 63, the diagnostic session data 64, the diagnostic list 65, the threshold 66, and/or the component hierarchy 67. In some example embodiments, the applications 455 can be arranged to operate with the program data 457 on an operating system executable by the processor 452.

The computing system 450 can have additional features or functionality, and additional interfaces to facilitate communications between the basic configuration 451 and any devices and interfaces. For example, data storage devices 460 can be provided including removable storage devices 461, non-removable storage devices 462, or a combination thereof. Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer-readable program instructions, data structures, program modules, or other data such as the data stored in a computer-readable memory, such at the memory 52.

The system memory 454 and the storage devices 460 are examples of computer-readable medium, such as the memory 52. The system memory 454 and the storage devices 460 can include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing system 450.

For the display device 4 and the RO device 10, the computing system 450 can include or be implemented as a portion of a small-form factor portable (i.e., mobile) electronic device such as a smartphone (e.g., an IPHONE® smartphone from Apple Inc. of Cupertino, Calif., or a GALAXY S® smartphone from Samsung Electronics Co., Ltd. Of Maetan-Dong, Yeongtong-Gu Suwon-Si, Gyeonggi-Do, Republic of Korea), a tablet device (e.g., an IPAD® tablet device from Apple Inc., or a SAMSUNG GALAXY TAB tablet device from Samsung Electronics Co., Ltd.), or a wearable computing device (e.g., a wireless web-watch device or a personal headset device). The application 455, or the program data 457 can include an application downloaded to the communication interfaces 467 from the APP STORE® online retail store, from the GOOGLE PLAY® online retail store, or another source of the applications or the CRPI described herein for use on the display device and the RO device 10.

Figure 37:
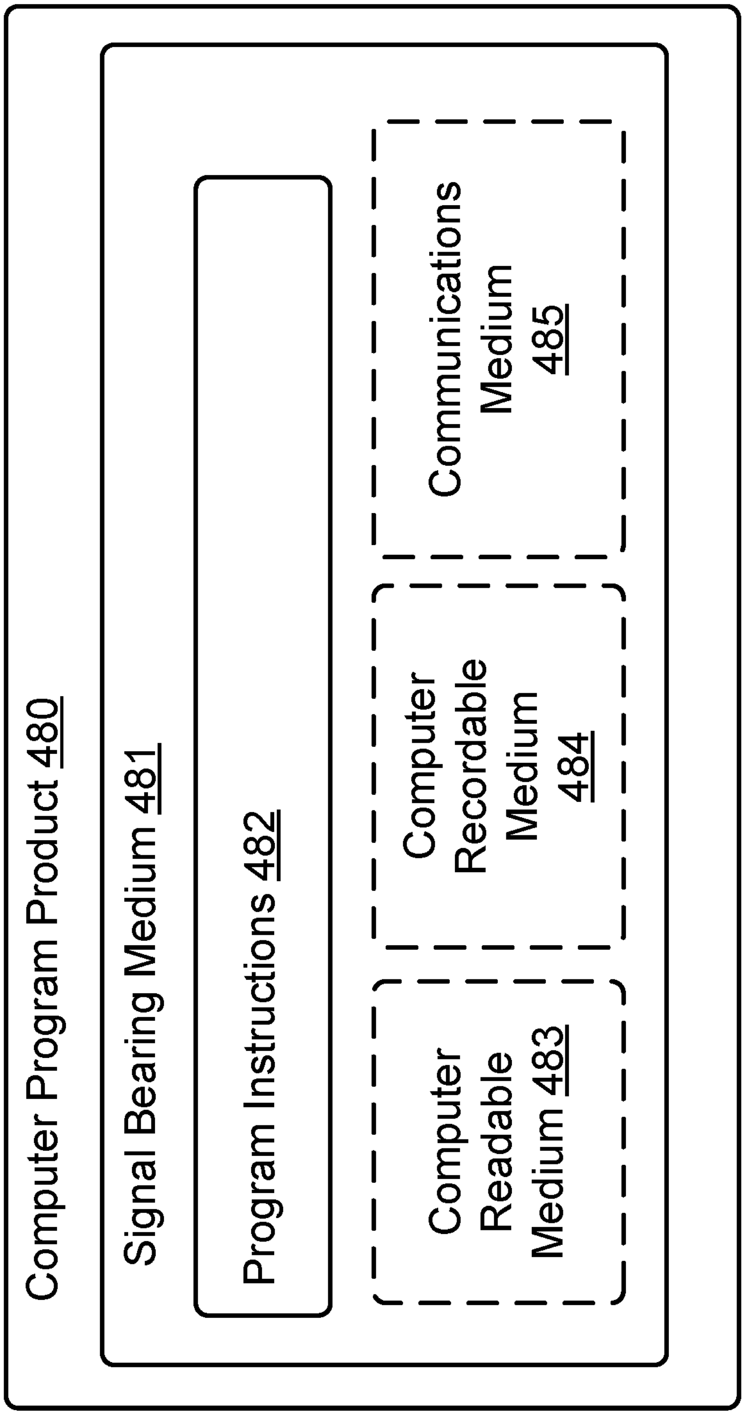
FIG. 37 is a schematic illustrating a conceptual partial view of a computer program product for executing a computer process on a computing system, according to an example embodiment.

Additionally or alternatively, the computing system 450 can include or be implemented as part of a personal computing system (including both laptop computer and non-laptop computer configurations), or a server. In some embodiments, the disclosed methods can be implemented as CRPI encoded on a non-transitory computer-readable storage media in a machine-readable format, or on other non-transitory media or articles of manufacture. FIG. 37 is a schematic illustrating a conceptual partial view of an example computer program product 480 that includes a computer program for executing a computer process on a computing system, arranged according to at least some embodiments presented herein.

The computing system 450 can also include output interfaces 463 that can include a graphics processing unit 464, which can be configured to communicate to various external devices such as display devices 466 or speakers via one or more A/V ports 465 or a communication interface 467. The communication interface 467 can include a network controller 468, which can be arranged to facilitate communications with one or more other computing systems 470 over a network communication via one or more communication ports 469. The communication connection is one example of a communication media. Communication media can be embodied by computer-readable program instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

In one embodiment, the example computer program product 480 is provided using a signal bearing medium 481. The signal bearing medium 481 can include one or more programming instructions 482 that, when executed by one or more processors can provide functionality or portions of the functionality described above with respect to FIG. 1 to FIG. 35. In some examples, the signal bearing medium 481 can encompass a computer-readable medium 483, such as, but not limited to, a hard disk drive, a Compact Disc (CD), a Digital Video Disk (DVD), a digital tape, or any other memory described herein. In some implementations, the signal bearing medium 481 can encompass a computer recordable medium 484, such as, but not limited to, memory, read/write (R/W) CDs, R/W DVDs, etc. In some implementations, the signal bearing medium 481 can encompass a communications medium 485, such as, but not limited to, a digital and/or an analog communication medium (e.g., a fiber optic cable, a waveguide, a wired communications link, a wireless communication link, etc.). Thus, for example, the signal bearing medium 481 can be conveyed by a wireless form of the communications medium 485 (e.g., a wireless communications medium conforming to the IEEE 802.11 standard or another transmission protocol).

The one or more programming instructions 482 can be, for example, computer executable and/or logic implemented instructions. In some examples, a computing system such as the computing system 450 of FIG. 36 can be configured to provide various operations, functions, or actions in response to the programming instructions 482 conveyed to the computing system 450 by one or more of the computer-readable medium 483, the computer recordable medium 484, and/or the communications medium 485.

The processor 50 can be configured like the processor 452. The memory 52 can be configured as part of or all of the system memory 454 or the storage devices 460. The communication interface 51 can be configured as part of or all of the communication interfaces 467.

Each of the server 2, the display device 4, and the computing system 450 can comprise a power source. In accordance with the example embodiments, a power source can include a connection to an external power source and circuitry to allow current to flow to other elements connected to the power source. As an example, the external power source can include a wall outlet at which a connection to an alternating current can be made. As another example, the external power source can include an energy storage device (e.g., a battery) or an electric generator.

Additionally or alternatively, a power source can include a connection to an internal power source and power transfer circuitry to allow current to flow to other elements connected to the power source. As an example, the internal power source can include an energy storage device, such as a battery. Furthermore, any power source described herein can include various circuit protectors and signal conditioners. The power sources described herein can provide a way to transfer electrical currents to other elements that operate electrically.

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

The term "data" within this description can be used interchangeably with the term "information" or similar terms, such as "content." The data described herein can be transmitted and received. As an example, any transmission of the data described herein can occur directly from a transmitting device (e.g., a transmitter) to a receiving device (e.g., a receiver). As another example, any transmission of the data described herein can occur indirectly from the transmitter to a receiver via one of one or more intermediary network devices, such as an access point, an antenna, a base station, a hub, a modem, a relay, a router, a switch, or some other network device. The transmission of any of the data described herein can include transmitting the data over an air interface (e.g., using radio signals (i.e., wirelessly)). The transmission of any of the data described herein can include transmitting the data over a wire (e.g., a single wire, a twisted pair of wires, a fiber optic cable, a coaxial cable, a wiring harness, a power line, a printed circuit, a CAT5 cable, or CAT6 cable). The wire can be referred to as a "conductor" or by another term. As an example, transmission of the data over the conductor can occur electrically or optically.

The data can represent various things such as objects and conditions. The objects and conditions can be mapped to a data structure (e.g., a table). A processor can refer to the data structure to determine what object or condition is represented by the data. As an example, the data received by a processor can represent a calendar date. The processor can determine the calendar date by comparing the data to a data structure that defines calendar dates. As another example, data received by a processor can represent a vehicle component. The processor can determine what type of vehicle component is represented by the data by comparing the data to a structure that defines a variety of vehicle components.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

Embodiments of the present disclosure may thus relate to one of the enumerated example embodiment (EEEs) listed below.

EEE 1 is a method at a server for outputting a parameter identifier (PID) filter list, comprising: (i) receiving, at a server, repair order (RO) data, wherein the RO data comprises data from one or more ROs that indicate particular vehicle identifying information, at least one symptom identifier, and a particular vehicle component; (ii) determining, at the server, symptom-to-parameter-identifier (PID) mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier; (iii) determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles; (iv) receiving, at the server, a request sent over a communication network from a display device, wherein the request comprises the particular vehicle identifying information and the at least one symptom identifier; and (v) transmitting, by the server over the communication network to the display device, a response to the request, the response comprising the PID filter list.

EEE 2 is the method of EEE 1, wherein the at least one symptom identifier comprises at least one diagnostic trouble code (DTC) that each vehicle of the set of vehicles can set active, and wherein the symptom-based subset of PIDs from the set of available PIDs for the set of vehicles comprises a DTC-based subset of PIDs from the set of available PIDs for the set of vehicles.

EEE 3 is the method of any one of EEE 1 to 2, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 4 is the method of any one of EEE 1 to 3, further comprising: (i) determining, at the server, symptom-to-component-test mapping data based on the received RO data and component-to-component-test mapping data, wherein the symptom-to-component-test mapping data maps one or more component tests from a set of available component tests for the set of vehicles identifiable by the particular vehicle identifying information to the at least one symptom identifier; (ii) determining, at the server based on the set of available component tests for the set of vehicles and the symptom-to-component-test mapping data, a component test filter list, wherein the component test filter list is associated with the particular vehicle identifying information and the at least one symptom identifier, and wherein the component test filter list indicates a symptom-based subset of component tests from the set of available component tests for the set of vehicles; and (iii) retrieving, by the server based on the particular vehicle identifying information and the at least one symptom identifier received in the request, the component test filter list; wherein the response to the request comprises the component test filter list.

EEE 5 is the method of EEE 4, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of component tests from the set of available component tests for the set of vehicles comprises a DTC-based subset of component tests from the set of available component tests for the set of vehicles.

EEE 6 is the method of any one of EEE 4 and 5, wherein the component test filter list comprises a component test performable by an oscilloscope of the display device or a multimeter of the display device.

EEE 7 is the method of any one of EEE 4 to 6, wherein the PID filter list comprises index values into an ordered list of PIDs for vehicles identifiable by the particular vehicle identifying information, and/or the component test filter list comprises index values into an ordered list of component tests for vehicles identifiable by the particular vehicle identifying information.

EEE 8 is the method of any one of EEE 4 to 7, further comprising: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 9 is the method of EEE 8, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, wherein the symptom-based subset of component tests from the set of available component tests for the set of vehicles comprises a DTC-based subset of component tests from the set of available component tests for the set of vehicles, and wherein the symptom-based subset of functional tests from the set of available functional tests for the set of vehicles comprises a DTC-based subset of functional tests from the set of available functional tests for the set of vehicles.

EEE 10 is the method of any one of EEE 8 and 9, wherein the functional test filter list indicates a functional test that comprises transmission of a vehicle data message from the display device to the vehicle.

EEE 11 is the method of any one of EEE 8 to 10, wherein the PID filter list comprises index values into an ordered list of PIDs, component tests, and functional tests for vehicles identifiable by the particular vehicle identifying information.

EEE 12 is the method of EEE 1, further comprising: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 13 is the method of EEE 12, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of functional tests from the set of available functional tests for the set of vehicles comprises a DTC-based subset of functional tests from the set of available functional tests for the set of vehicles.

EEE 14 is the method of any one of EEE 12 and 13, wherein the functional test filter list indicates a functional test that comprises transmission of a vehicle data message from the display device to the vehicle.

EEE 15 is the method of any one of EEE 12 to 14, wherein the PID filter list comprises index values into an ordered list of PIDs and functional tests for vehicles identifiable by the particular vehicle identifying information.

EEE 16 is the method of EEE 1, further comprising: (i) determining, at the server, symptom-to-reset-procedure mapping data based on the received RO data and component-to-reset-procedure mapping data, wherein the symptom-to-reset-procedure mapping data maps one or more reset procedures from a set of available reset procedures for the set of vehicles identifiable by the particular vehicle identifying information to the at least one symptom identifier; (ii) determining, at the server based on the set of available reset procedures for the set of vehicles and the symptom-to-reset-procedure mapping data, a reset procedure filter list, wherein the reset procedure filter list is associated with the particular vehicle identifying information and the at least one symptom identifier, and wherein the reset procedure filter list indicates a symptom-based subset of reset procedures from the set of available reset procedures for the set of vehicles; and (iii) retrieving, by the server based on the particular vehicle identifying information and the symptom received in the request, the reset procedure filter list, wherein the response to the request comprises the reset procedure filter list.

EEE 17 is the method of EEE 16, wherein the at least one symptom identifier comprises at least one diagnostic trouble code (DTC) that each vehicle of the set of vehicles can set active, wherein the symptom-based subset of reset procedures from the set of available reset procedures for the set of vehicles comprises a DTC-based subset of reset procedures from the set of available reset procedures for the set of vehicles, and wherein the symptom-based subset of reset procedures from the set of available reset procedures for the set of vehicles comprises a DTC-based subset of reset procedures from the set of available reset procedures for the set of vehicles.

EEE 18 is the method of any one of EEE 16 and 17, wherein the reset procedure filter list comprises index values into an ordered list of reset procedures for vehicles identifiable by the particular vehicle identifying information.

EEE 19 is the method of any one of EEE 16 to 18, wherein the response comprises a first response and a second response, wherein the first response comprises the PID filter list and the second response comprises the reset procedure filter list, and wherein transmitting the response comprising the PID filter list comprises transmitting the first response, the method further comprising: (i) establishing, at the server, a diagnostic session for the display device with respect to the first response and the second response; (ii) determining, at the server, a vehicle repair has occurred with respect to the diagnostic session; and (iii) transmitting, by the server over the communication network to the display device, the second response in response to determining the vehicle repair has occurred with respect to the diagnostic session.

EEE 20 is the method of EEE 19, wherein determining the vehicle repair has occurred comprises determining a threshold amount of time has elapsed since the first response was transmitted to the display device.

EEE 21 is the method of any one of EEE 1 to 20, wherein determining the PID filter list comprises modifying an existing PID filter list, wherein the existing PID filter list comprises a different subset of PIDs from the set of available PIDs for the set of vehicles, wherein the existing PID filter list is associated with the particular vehicle identifying information and the at least one symptom identifier, and wherein modifying the existing PID filter list includes adding at least one PID from the set of available PIDs for the set of vehicles to the existing PID filter list and/or removing at least one PID from the existing PID filter list.

EEE 22 is the method of any one of EEE 1 to 21, wherein the RO data comprises a subset of a set of RO data, wherein the set of RO data comprises data from multiple ROs that indicate (i) the particular vehicle identifying information or different vehicle identifying information, (ii) the at least one symptom identifier or a different symptom, and (iii) the particular vehicle component or a different vehicle component, and wherein receiving the RO data comprises receiving the set of RO data, the method further comprising: determining, at the processor based on the set of RO data, the subset of RO data by determining the set of RO data indicates the particular vehicle component is a most-replaced component and the at least one symptom identifier is a most-reported symptom for vehicles of the set of vehicles identifiable by the particular vehicle identifying information.

EEE 23 is the method of any one of EEE 1 to 22, wherein the PID filter list comprises index values into an ordered list of PIDs for vehicles identifiable by the particular vehicle identifying information.

EEE 24 is the method of any one of EEE 1 to 23, further comprising: (i) determining, at the server, a vehicle component related to the particular vehicle component; (ii) determining, at the server, at least one PID to add to the PID filter list based on component-to-PID mapping data that maps one or more PIDs from the set of available PIDs for the set of vehicles identifiable by the particular vehicle identifying information to the vehicle component related to the particular vehicle component; and (iii) adding, by the server, the at least one PID to the PID filter list.

EEE 25 is the method of EEE 24, wherein the server determines the vehicle component related to the particular vehicle component by searching data within a memory that identifies vehicle components of the vehicles of the set of vehicles in a hierarchical format based on systems and/or subsystems of the vehicles of the set of vehicles.

EEE 26 is the method of any one of EEE 1 to 25 further comprising: (i) receiving, at the server, a first set of PID values and a second set of PID values, wherein the first set of PID values are for a particular PID from a first set of vehicles with all diagnostic trouble codes (DTCs) for a particular ECU within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information; (ii) determining, by the server from among the first set of PID values, a range of PID values for the particular PID; (iii) determining, by the server from among the second set of PID values, one or more PID values for the particular PID is outside of the range of PID values for the particular PID by a threshold value; and (iv) adding, by the server, the particular PID to the PID filter list in response to determining the one or more PID values for the particular PID is outside of the range of PID values for the particular PID by the threshold value.

EEE 27 is the method of EEE 26, wherein PID filter list comprises one or more default PIDs before the particular PID is added to the PID filter list and after the particular PID is added to the PID filter list.

EEE 28 is the method of any one of EEE 26 to 27, wherein the response further comprises data indicating the range of PID values for the particular PID.

EEE 29 is the method of any one of EEE 26 to 28, wherein determining the one or more PID values for the particular PID is outside of the range of PID values comprises (i)

determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 30 is the method of any one of EEE 26 to 29, wherein adding the particular PID to the PID filter list is conditioned on the server determining the one or more PID values for the particular PID comprise at least a threshold number of PID values.

EEE 31 is the method of any one of EEE 26 to 30, wherein the range of PID values for the particular PID comprises a first range of PID values; wherein the server determines each PID value of the first range of PID values was generated in a vehicle of the first set of vehicles while the vehicle is operating in a first operating state, and wherein the response further comprises data indicating the first range of PID values is associated with the first operating state.

EEE 32 is the method of EEE 31, further comprising: determining, by the server from among the first set of PID values, a second range of PID values for the particular PID, wherein the server determines each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 33 is the method of any one of EEE 31 and 32, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 34 is the method of any one of EEE 26 to 33, wherein determining the range of PID values for the particular PID comprises determining a range of values for the particular PID at one, two, three, or four standard deviations of a mean value of PID values for the particular PID within the first set of PID values.

EEE 35 is the method of any one of EEE 1 to 34, further comprising: (i) receiving, at the server, a second request sent over a communication network from a first display device connected to a first vehicle, wherein the second request comprises the particular vehicle identifying information and the at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmitting, by the server over the communication network to the first display device, a response to the second request, the response to the second request comprising a PID filter list; (iii) determining, by the server, the first display device requested from the first vehicle for display by the first display device an additional PID not included within the PID filter list; (iv) generating, by the server, a modified PID filter list by adding the additional PID to the PID filter list; (v) receiving, at the server after generating the modified PID filter list, a next request sent over the communication network from a second display device, wherein the next request comprises the particular vehicle identifying information and the at least one symptom identifier; and (vi) transmitting, by the server over the communication network to the second display device, a response to the next request, the response to the next request comprising the modified PID filter list.

EEE 36 is the method of EEE 35, wherein the PID filter list and the modified PID filter list comprise index values into an ordered list of PIDs for vehicles identifiable by the particular vehicle identifying information.

EEE 37 is the method of any one of EEE 35 and 36, wherein the second display device is the first display device.

EEE 38 is the method of any one of EEE 35 to 37, further comprising: receiving, at the server, PID data provided to the first display device from the first vehicle; and determining, by the server, the PID data provided to the first display device from the first vehicle and subsequently received by the server includes PID data for the additional PID to be displayed by the first display device.

EEE 39 is the method of any one of EEE 35 to 38, further comprising: receiving, at the server, data indicating the first display device received an input requesting display of the additional PID, wherein the server determines the first display device requested from the first vehicle for display by the first display device the additional PID not included within the PID filter list based at least in part on the data indicating the first display device received an input requesting display of the additional PID.

EEE 40 is the method of any one of EEE 35 to 39, further comprising: retrieving, by the server based on the particular vehicle identifying information and the at least one symptom identifier received in the second request, the PID filter list from a computer-readable memory; and/or retrieving, by the server based on the particular vehicle identifying information and the at least one symptom identifier received in the next request, the modified PID filter list from a computer-readable memory.

EEE 41 is the method of any one of EEE 35 to 40, wherein determining the first display device requested from the first vehicle for display by the first display device an additional PID not included within the PID filter list comprises determining the additional PID was requested within a threshold amount of time after the server receives the second request or after the server transmits the response.

EEE 42 is the method of any one of EEE 35 to 41, wherein the first display device is one of multiple display devices registered with the server, wherein generating the modified PID filter list is conditioned on the server determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server has transmitted the PID filter list to the any of the multiple display devices, and wherein n of the $n^{th}$ time comprises a predetermined threshold number greater than one.

EEE 43 is a server comprising: a network communication interface for communicating with a display device over a communication network; and at least one processor coupled to network communication interface and programmed to: (i) receive, at the server, repair order (RO) data, wherein the RO data comprises data from one or more ROs that indicate particular vehicle identifying information, at least one symptom identifier, and a particular vehicle component; (ii) determine, at the server, symptom-to-parameter-identifier (PID) mapping data based on the received RO data and component-to-PID mapping data, wherein the componentto-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier; (iii) determine, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles; (iv) receive, at the server, a request sent over a communication network from a display device, wherein the request comprises the particular vehicle identifying information and the at least one symptom identifier; and (v) transmit, by the server over the communication network to the display device, a response to the request, the response comprising the PID filter list.

EEE 44 is the server of EEE 43, wherein the at least one symptom identifier comprises at least one diagnostic trouble code (DTC) that each vehicle of the set of vehicles can set active, and wherein the symptom-based subset of PIDs from the set of available PIDs for the set of vehicles comprises a DTC-based subset of PIDs from the set of available PIDs for the set of vehicles.

EEE 45 is the server of any one of EEE 43 and 44, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 46 is the server of any one of EEE 43 to 45, wherein the processor is further programmed to: (i) determine symptom-to-component-test mapping data based on the received RO data and component-to-component-test mapping data, wherein the symptom-to-component-test mapping data maps one or more component tests from a set of available component tests for the set of vehicles identifiable by the particular vehicle identifying information to the at least one symptom identifier; (ii) determine, based on the set of available component tests for the set of vehicles and the symptom-to-component-test mapping data, a component test filter list, wherein the component test filter list is associated with the particular vehicle identifying information and the at least one symptom identifier, and wherein the component test filter list indicates a symptom-based subset of component tests from the set of available component tests for the set of vehicles; and (iii) retrieve, based on the particular vehicle identifying information and the at least one symptom identifier received in the request, the component test filter list; wherein the response to the request comprises the component test filter list.

EEE 47 is the server of EEE 46, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of component tests from the set of available component tests for the set of vehicles comprises a DTC-based subset of component tests from the set of available component tests for the set of vehicles.

EEE 48 is the server of any one of EEE 46 and 47, wherein the component test filter list comprises a component test performable by an oscilloscope of the display device or a multimeter of the display device.

EEE 49 is the server of any one of EEE 46 to 48, wherein the PID filter list comprises index values into an ordered list of PIDs for vehicles identifiable by the particular vehicle identifying information, and/or the component test filter list comprises index values into an ordered list of component tests for vehicles identifiable by the particular vehicle identifying information.

EEE 50 is the server of any one of EEE 46 to 49, further comprising: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 51 is the server of EEE 50, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, wherein the symptom-based subset of component tests from the set of available component tests for the set of vehicles comprises a DTC-based subset of component tests from the set of available component tests for the set of vehicles, and wherein the symptom-based subset of functional tests from the set of available functional tests for the set of vehicles comprises a DTC-based subset of functional tests from the set of available functional tests for the set of vehicles.

EEE 52 is the server of any one of EEE 50 to 51, wherein the functional test filter list indicates a functional test that comprises transmission of a vehicle data message from the display device to the vehicle.

EEE 53 is the server of any one of EEE 50 to 52, wherein the PID filter list comprises index values into an ordered list of PIDs, component tests, and functional tests for vehicles identifiable by the particular vehicle identifying information.

EEE 54 is the server of EEE 43, further comprising: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 55 is the server of EEE 54, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of functional tests from the set of available functional tests for the set of vehicles comprises a DTC-based subset of functional tests from the set of available functional tests for the set of vehicles.

EEE 56 is the server of any one of EEE 54 and 55, wherein the functional test filter list indicates a functional test that comprises transmission of a vehicle data message from the display device to the vehicle.

EEE 57 is the server of any one of EEE 54 to 56, wherein the PID filter list comprises index values into an ordered list of PIDs and functional tests for vehicles identifiable by the particular vehicle identifying information.

EEE 58 is the server of EEE 43, further comprising: (i) determining, at the server, symptom-to-reset-procedure mapping data based on the received RO data and component-to-reset-procedure mapping data, wherein the symptom-to-reset-procedure mapping data maps one or more reset procedures from a set of available reset procedures for the set of vehicles identifiable by the particular vehicle identifying information to the at least one symptom identifier; (ii) determining, at the server based on the set of available reset procedures for the set of vehicles and the symptom-to-reset-procedure mapping data, a reset procedure filter list, wherein the reset procedure filter list is associated with the particular vehicle identifying information and the at least one symptom identifier, and wherein the reset procedure filter list indicates a symptom-based subset of reset procedures from the set of available reset procedures for the set of vehicles; and (iii) retrieving, by the server based on the particular vehicle identifying information and the symptom received in the request, the reset procedure filter list, wherein the response to the request comprises the reset procedure filter list.

EEE 59 is the server of EEE 58, wherein the at least one symptom identifier comprises at least one diagnostic trouble code (DTC) that each vehicle of the set of vehicles can set active, wherein the symptom-based subset of reset procedures from the set of available reset procedures for the set of vehicles comprises a DTC-based subset of reset procedures from the set of available reset procedures for the set of vehicles, and wherein the symptom-based subset of reset procedures from the set of available reset procedures for the set of vehicles comprises a DTC-based subset of reset procedures from the set of available reset procedures for the set of vehicles.

EEE 60 is the server of any one of EEE 58 and 59, wherein the reset procedure filter list comprises index values into an ordered list of reset procedures for vehicles identifiable by the particular vehicle identifying information.

EEE 61 is the server of any one of EEE 58 to 60, wherein the response comprises a first response and a second response, wherein the first response comprises the PID filter list and the second response comprises the reset procedure filter list, and wherein transmitting the response comprising the PID filter list comprises transmitting the first response, wherein the at least one processor is further programmed to: (i) establish a diagnostic session for the display device with respect to the first response and the second response; (ii) determine a vehicle repair has occurred with respect to the diagnostic session; and (iii) transmit, over the communication network to the display device, the second response in response to determining the vehicle repair has occurred with respect to the diagnostic session.

EEE 62 is the server of EEE 61, wherein determining the vehicle repair has occurred comprises determining a threshold amount of time has elapsed since the first response was transmitted to the display device.

EEE 63 is the server of any one of EEE 43 to 62, wherein determining the PID filter list comprises modifying an existing PID filter list, wherein the existing PID filter list comprises a different subset of PIDs from the set of available PIDs for the set of vehicles, wherein the existing PID filter list is associated with the particular vehicle identifying information and the at least one symptom identifier, and wherein modifying the existing PID filter list includes adding at least one PID from the set of available PIDs for the set of vehicles to the existing PID filter list and/or removing at least one PID from the existing PID filter list.

EEE 64 is the server of any one of EEE 43 to 63, wherein the RO data comprises a subset of a set of RO data, wherein the set of RO data comprises data from multiple ROs that indicate (i) the particular vehicle identifying information or different vehicle identifying information, (ii) the at least one symptom identifier or a different symptom, and (iii) the particular vehicle component or a different vehicle component, and wherein receiving the RO data comprises receiving the set of RO data, wherein the at least one processor is further programmed to: determine, based on the set of RO data, the subset of RO data by determining the set of RO data indicates the particular vehicle component is a most-replaced component and the at least one symptom identifier is a most-reported symptom for vehicles of the set of vehicles identifiable by the particular vehicle identifying information.

EEE 65 is the server of any one of EEE 43 to 64, wherein the PID filter list comprises index values into an ordered list of PIDs for vehicles identifiable by the particular vehicle identifying information.

EEE 66 is the server of any one of EEE 43 to 65, further comprising: (i) determining, at the server, a vehicle component related to the particular vehicle component; (ii) determining, at the server, at least one PID to add to the PID filter list based on component-to-PID mapping data that maps one or more PIDs from the set of available PIDs for the set of vehicles identifiable by the particular vehicle identifying information to the vehicle component related to the particular vehicle component; and (iii) adding, by the server, the at least one PID to the PID filter list.

EEE 67 is the server of EEE 66, wherein the server determines the vehicle component related to the particular vehicle component by searching data within a memory that identifies vehicle components of the vehicles of the set of vehicles in a hierarchical format based on systems and/or subsystems of the vehicles of the set of vehicles.

EEE 68 is the server of any one of EEE 1 to 66 wherein the processor is further programmed to: (i) receive a first set of PID values and a second set of PID values, wherein the first set of PID values are for a particular PID from a first set of vehicles with all diagnostic trouble codes (DTCs) for a particular ECU within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information; (ii) determine, from among the first set of PID values, a range of PID values for the particular PID; (iii) determine, from among the second set of PID values, one or more PID values for the particular PID is outside of the range of PID values for the particular PID by a threshold value; and (iv) add the particular PID to the PID filter list in response to determining the one or more PID values for the particular PID is outside of the range of PID values for the particular PID by the threshold value.

EEE 69 is the server of EEE 68, wherein PID filter list comprises one or more default PIDs before the particular PID is added to the PID filter list and after the particular PID is added to the PID filter list.

EEE 70 is the server of any one of EEE 68 to 69, wherein the response further comprises data indicating the range of PID values for the particular PID.

EEE 71 is the server of any one of EEE 68 to 70, wherein determining the one or more PID values for the particular PID is outside of the range of PID values comprises (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 72 is the server of any one of EEE 68 to 71, wherein adding the particular PID to the PID filter list is conditioned on the at least one processor determining the one or more PID values for the particular PID comprise at least a threshold number of PID values.

EEE 73 is the server of any one of EEE 68 to 72, wherein the range of PID values for the particular PID comprises a first range of PID values; wherein the processor is further programmed to determine each PID value of the first range of PID values was generated in a vehicle of the first set of vehicles while the vehicle is operating in a first operating state, and wherein the response further comprises data indicating the first range of PID values is associated with the first operating state.

EEE 74 is the server of EEE 73, wherein the processor is further programmed to: determine, from among the first set of PID values, a second range of PID values for the particular PID, wherein the processor is further programmed to determine each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 75 is the server of any one of EEE 73 and 74, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 76 is the server of any one of EEE 68 to 75, wherein determining the range of PID values for the particular PID comprises determining a range of values for the particular PID at one, two, three, or four standard deviations of a mean value of PID values for the particular PID within the first set of PID values.

EEE 77 is the server of any one of EEE 43 to 76, wherein the at least one processor is further programmed to: (i) receive a second request sent over a communication network from a first display device connected to a first vehicle, wherein the second request comprises the particular vehicle identifying information and the at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmit, over the communication network to the first display device, a response to the second request, the response to the second request comprising a PID filter list; (iii) determine the first display device requested from the first vehicle for display by the first display device an additional PID not included within the PID filter list; (iv) generate a modified PID filter list by adding the additional PID to the PID filter list; (v) receive, after generating the modified PID filter list, a next request sent over the communication network from a second display device, wherein the next request comprises the particular vehicle identifying information and the at least one symptom identifier; and (vi) transmit, over the communication network to the second display device, a response to the next request, the response to the next request comprising the modified PID filter list.

EEE 78 is the server of EEE 77, wherein the PID filter list and the modified PID filter list comprise index values into an ordered list of PIDs for vehicles identifiable by the particular vehicle identifying information.

EEE 79 is the server of any one of EEE 77 and 78, wherein the second display device is the first display device.

EEE 80 is the server of any one of EEE 77 to 79, wherein the at least one processor is further programmed to: receive PID data provided to the first display device from the first vehicle; and determine the PID data provided to the first display device from the first vehicle and subsequently received by the server includes PID data for the additional PID to be displayed by the first display device.

EEE 81 is the server of any one of EEE 77 to 80, wherein the at least one processor is further programmed to: receive data indicating the first display device received an input requesting display of the additional PID, wherein the at least one processor determines the first display device requested from the first vehicle for display by the first display device the additional PID not included within the PID filter list based at least in part on the data indicating the first display device received an input requesting display of the additional PID.

EEE 82 is the server of any one of EEE 77 to 81, wherein the at least one processor is further programmed to: retrieve, based on the particular vehicle identifying information and the at least one symptom identifier received in the second request, the PID filter list from a computer-readable memory; and/or retrieve, based on the particular vehicle identifying information and the at least one symptom identifier received in the next request, the modified PID filter list from a computer-readable memory.

EEE 83 is the server of any one of EEE 77 to 82, wherein determining the first display device requested from the first vehicle for display by the first display device an additional PID not included within the PID filter list comprises determining the additional PID was requested within a threshold amount of time after the server receives the second request or after the server transmits the response.

EEE 84 is the server of any one of EEE 77 to 83, wherein the first display device is one of multiple display devices registered with the server, wherein generating the modified PID filter list is conditioned on the at least one processor determining the first display device requesting from the first vehicle for display by the first display device the additional PID not included within the PID filter list is an $n^{th}$ time any of the multiple display devices has requested for display on the any of the multiple display devices the additional PID not included within the PID filter list after the at least one processor has transmitted the PID filter list to the any of the multiple display devices, and wherein n of the $n^{th}$ time comprises a predetermined threshold number greater than one.

EEE 85 is the server of any one of EEE 43 to 84, further comprising: a non-transitory computer-readable memory coupled to the at least one processor, wherein the at least one processor is programmed according to the any one of the EEE 43 to 84 by program instructions stored on the non-transitory computer-readable memory.

EEE 86 is a non-transitory computer-readable memory having stored therein instructions executable by one or more processors to cause a server to perform functions comprising: (i) receiving, at the server, repair order (RO) data, wherein the RO data comprises data from one or more ROs that indicate particular vehicle identifying information, at least one symptom identifier, and a particular vehicle component; (ii) determining, at the server, symptom-to-parameter-identifier (PID) mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier; (iii) determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles; (iv) receiving, at the server, a request sent over a communication network from a display device, wherein the request comprises the particular vehicle identifying information and the at least one symptom identifier; and (v) transmitting, by the server over the communication network to the display device, a response to the request, the response comprising the PID filter list.

EEE 87 is the non-transitory computer-readable memory of EEE 86, wherein the at least one symptom identifier comprises at least one diagnostic trouble code (DTC) that each vehicle of the set of vehicles can set active, and wherein the symptom-based subset of PIDs from the set of available PIDs for the set of vehicles comprises a DTC-based subset of PIDs from the set of available PIDs for the set of vehicles.

EEE 88 is the non-transitory computer-readable memory of any one of EEE 86 to 87, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 89 is the non-transitory computer-readable memory of any one of EEE 86 to 88, the functions further comprise: (i) determining, at the server, symptom-to-component-test mapping data based on the received RO data and component-to-component-test mapping data, wherein the symptom-to-component-test mapping data maps one or more component tests from a set of available component tests for the set of vehicles identifiable by the particular vehicle identifying information to the at least one symptom identifier; (ii) determining, at the server based on the set of available component tests for the set of vehicles and the symptom-to-component-test mapping data, a component test filter list, wherein the component test filter list is associated with the particular vehicle identifying information and the at least one symptom identifier, and wherein the component test filter list indicates a symptom-based subset of component tests from the set of available component tests for the set of vehicles; and (iii) retrieving, by the server based on the particular vehicle identifying information and the at least one symptom identifier received in the request, the component test filter list; wherein the response to the request comprises the component test filter list.

EEE 90 is the non-transitory computer-readable memory of EEE 89, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of component tests from the set of available component tests for the set of vehicles comprises a DTC-based subset of component tests from the set of available component tests for the set of vehicles.

EEE 91 is the non-transitory computer-readable memory of any one of EEE 89 and 90, wherein the component test filter list comprises a component test performable by an oscilloscope of the display device or a multimeter of the display device.

EEE 92 is the non-transitory computer-readable memory of any one of EEE 89 to 91, wherein the PID filter list comprises index values into an ordered list of PIDs for vehicles identifiable by the particular vehicle identifying information, and/or the component test filter list comprises index values into an ordered list of component tests for vehicles identifiable by the particular vehicle identifying information.

EEE 93 is the non-transitory computer-readable memory of any one of EEE 89 to 92, wherein the functions further comprise: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 94 is the non-transitory computer-readable memory of EEE 93, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, wherein the symptom-based subset of component tests from the set of available component tests for the set of vehicles comprises a DTC-based subset of component tests from the set of available component tests for the set of vehicles, and wherein the symptom-based subset of functional tests from the set of available functional tests for the set of vehicles comprises a DTC-based subset of functional tests from the set of available functional tests for the set of vehicles.

EEE 95 is the non-transitory computer-readable memory of any one of EEE 93 and 94, wherein the functional test filter list indicates a functional test that comprises transmission of a vehicle data message from the display device to the vehicle.

EEE 96 is the non-transitory computer-readable memory of any one of EEE 93 to 95, wherein the PID filter list comprises index values into an ordered list of PIDs, component tests, and functional tests for vehicles identifiable by the particular vehicle identifying information.

EEE 97 is the non-transitory computer-readable memory of EEE 96, wherein the functions further comprise: (i) determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier; (ii) determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and (iii) retrieving, by the server based on the particular vehicle identifying information and the symptom received in the request, the functional test filter list, wherein the response to the request comprises the functional test filter list.

EEE 98 is the non-transitory computer-readable memory of EEE 97, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of functional tests from the set of available functional tests for the set of vehicles comprises a DTC-based subset of functional tests from the set of available functional tests for the set of vehicles.

EEE 99 is the non-transitory computer-readable memory of any one of EEE 97 and 98, wherein the functional test filter list indicates a functional test that comprises transmission of a vehicle data message from the display device to the vehicle.

EEE 100 is the non-transitory computer-readable memory of any one of EEE 97 to 99, wherein the PID filter list comprises index values into an ordered list of PIDs and functional tests for vehicles identifiable by the particular vehicle identifying information.

EEE 101 is the non-transitory computer-readable memory of EEE 86, wherein the functions further comprise: (i) determining, at the server, symptom-to-reset-procedure mapping data based on the received RO data and component-to-reset-procedure mapping data, wherein the symptom-to-reset-procedure mapping data maps one or more reset procedures from a set of available reset procedures for the set of vehicles identifiable by the particular vehicle identifying information to the at least one symptom identifier; (ii) determining, at the server based on the set of available reset procedures for the set of vehicles and the symptom-to-reset-procedure mapping data, a reset procedure filter list, wherein the reset procedure filter list is associated with the particular vehicle identifying information and the at least one symptom identifier, and wherein the reset procedure filter list indicates a symptom-based subset of reset procedures from the set of available reset procedures for the set of vehicles; and (iii) retrieving, by the server based on the particular vehicle identifying information and the symptom received in the request, the reset procedure filter list, wherein the response to the request comprises the reset procedure filter list.

EEE 102 is the non-transitory computer-readable memory of EEE 101, wherein the at least one symptom identifier comprises at least one diagnostic trouble code (DTC) that each vehicle of the set of vehicles can set active, wherein the symptom-based subset of reset procedures from the set of available reset procedures for the set of vehicles comprises a DTC-based subset of reset procedures from the set of available reset procedures for the set of vehicles, and wherein the symptom-based subset of reset procedures from the set of available reset procedures for the set of vehicles comprises a DTC-based subset of reset procedures from the set of available reset procedures for the set of vehicles.

EEE 103 is the non-transitory computer-readable memory of any one of EEE 101 and 102, wherein the reset procedure filter list comprises index values into an ordered list of reset procedures for vehicles identifiable by the particular vehicle identifying information.

EEE 104 is the non-transitory computer-readable memory of any one of EEE 101 to 103, wherein the response comprises a first response and a second response, wherein the first response comprises the PID filter list and the second response comprises the reset procedure filter list, and wherein transmitting the response comprising the PID filter list comprises transmitting the first response, wherein the functions further comprise: (i) establishing, at the server, a diagnostic session for the display device with respect to the first response and the second response; (ii) determining, at the server, a vehicle repair has occurred with respect to the diagnostic session; and (iii) transmitting, by the server over the communication network to the display device, the second response in response to determining the vehicle repair has occurred with respect to the diagnostic session.

EEE 105 is the non-transitory computer-readable memory of EEE 104, wherein determining the vehicle repair has occurred comprises determining a threshold amount of time has elapsed since the first response was transmitted to the display device.

EEE 106 is the non-transitory computer-readable memory of any one of EEE 86 to 105, wherein determining the PID filter list comprises modifying an existing PID filter list, wherein the existing PID filter list comprises a different subset of PIDs from the set of available PIDs for the set of vehicles, wherein the existing PID filter list is associated with the particular vehicle identifying information and the at least one symptom identifier, and wherein modifying the existing PID filter list includes adding at least one PID from the set of available PIDs for the set of vehicles to the existing PID filter list and/or removing at least one PID from the existing PID filter list.

EEE 107 is the non-transitory computer-readable memory of any one of EEE 86 to 106, wherein the RO data comprises a subset of a set of RO data, wherein the set of RO data comprises data from multiple ROs that indicate (i) the particular vehicle identifying information or different vehicle identifying information, (ii) the at least one symptom identifier or a different symptom, and (iii) the particular vehicle component or a different vehicle component, and wherein receiving the RO data comprises receiving the set of RO data, wherein the functions further comprise: determining, at the processor based on the set of RO data, the subset of RO data by determining the set of RO data indicates the particular vehicle component is a most-replaced component and the at least one symptom identifier is a most-reported symptom for vehicles of the set of vehicles identifiable by the particular vehicle identifying information.

EEE 108 is the non-transitory computer-readable memory of any one of EEE 86 to 107, wherein the PID filter list comprises index values into an ordered list of PIDs for vehicles identifiable by the particular vehicle identifying information.

EEE 109 is the non-transitory computer-readable memory of any one of EEE 86 to 108, wherein the functions further comprise: (i) determining, at the server, a vehicle component related to the particular vehicle component; (ii) determining, at the server, at least one PID to add to the PID filter list based on component-to-PID mapping data that maps one or more PIDs from the set of available PIDs for the set of vehicles identifiable by the particular vehicle identifying information to the vehicle component related to the particular vehicle component; and (iii) adding, by the server, the at least one PID to the PID filter list.

EEE 110 is the non-transitory computer-readable memory of EEE 109, wherein the server determines the vehicle component related to the particular vehicle component by searching data within a memory that identifies vehicle components of the vehicles of the set of vehicles in a hierarchical format based on systems and/or subsystems of the vehicles of the set of vehicles.

EEE 111 is the non-transitory computer-readable memory of any one of EEE 86 to 110 wherein the functions further comprise: (i) receiving, at the server, a first set of PID values and a second set of PID values, wherein the first set of PID values are for a particular PID from a first set of vehicles with all diagnostic trouble codes (DTCs) for a particular ECU within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information; (ii) determining, by the server from among the first set of PID values, a range of PID values for the particular PID; (iii) determining, by the server from among the second set of PID values, one or more PID values for the particular PID is outside of the range of PID values for the particular PID by a threshold value; and (iv) adding, by the server, the particular PID to the PID filter list in response to determining the one or more PID values for the particular PID is outside of the range of PID values for the particular PID by the threshold value.

EEE 112 is the non-transitory computer-readable memory of EEE 111, wherein PID filter list comprises one or more default PIDs before the particular PID is added to the PID filter list and after the particular PID is added to the PID filter list.

EEE 113 is the non-transitory computer-readable memory of any one of EEE 111 to 112, wherein the response further comprises data indicating the range of PID values for the particular PID.

EEE 114 is the non-transitory computer-readable memory of any one of EEE 111 to 113, wherein determining the one or more PID values for the particular PID is outside of the range of PID values comprises (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 115 is the non-transitory computer-readable memory of any one of EEE 111 to 114, wherein adding the particular PID to the PID filter list is conditioned on the server determining the one or more PID values for the particular PID comprise at least a threshold number of PID values.

EEE 116 is the non-transitory computer-readable memory of any one of EEE 111 to 115, wherein the range of PID values for the particular PID comprises a first range of PID values; wherein the server determines each PID value of the first range of PID values was generated in a vehicle of the first set of vehicles while the vehicle is operating in a first operating state, and wherein the response further comprises data indicating the first range of PID values is associated with the first operating state.

EEE 117 is the non-transitory computer-readable memory of EEE 116, wherein the functions further comprise: determining, by the server from among the first set of PID values, a second range of PID values for the particular PID, wherein the server determines each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 118 is the non-transitory computer-readable memory of any one of EEE 116 and 117, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 119 is the non-transitory computer-readable memory of any one of EEE 111 to 118, wherein the function determining the range of PID values for the particular PID comprises determining a range of values for the particular PID at one, two, three, or four standard deviations of a mean value of PID values for the particular PID within the first set of PID values.

EEE 120 is the non-transitory computer-readable memory of any one of EEE 86 to 119, wherein the functions further comprise: (i) receiving, at the server, a second request sent over a communication network from a first display device connected to a first vehicle, wherein the second request comprises the particular vehicle identifying information and the at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmitting, by the server over the communication network to the first display device, a response to the second request, the response to the second request comprising a PID filter list; (iii) determining, by the server, the first display device requested from the first vehicle for display by the first display device an additional PID not included within the PID filter list; (iv) generating, by the server, a modified PID filter list by adding the additional PID to the PID filter list; (v) receiving, at the server after generating the modified PID filter list, a next request sent over the communication network from a second display device, wherein the next request comprises the particular vehicle identifying information and the at least one symptom identifier; and (vi) transmitting, by the server over the communication network to the second display device, a response to the next request, the response to the next request comprising the modified PID filter list.

EEE 121 is the non-transitory computer-readable memory of EEE 120, wherein the PID filter list and the modified PID filter list comprise index values into an ordered list of PIDs for vehicles identifiable by the particular vehicle identifying information.

EEE 122 is the non-transitory computer-readable memory of any one of EEE 120 and 121, wherein the second display device is the first display device.

EEE 123 is the non-transitory computer-readable memory of any one of EEE 120 to 122, wherein the functions further comprise: receiving, at the server, PID data provided to the first display device from the first vehicle; and determining, by the server, the PID data provided to the first display device from the first vehicle and subsequently received by the server includes PID data for the additional PID to be displayed by the first display device.

EEE 124 is the non-transitory computer-readable memory of any one of EEE 120 to 123, wherein the functions further comprise: receiving, at the server, data indicating the first display device received an input requesting display of the additional PID, wherein the server determines the first display device requested from the first vehicle for display by the first display device the additional PID not included within the PID filter list based at least in part on the data indicating the first display device received an input requesting display of the additional PID.

EEE 125 is the non-transitory computer-readable memory of any one of EEE 120 to 124, wherein the functions further comprise: retrieving, by the server based on the particular vehicle identifying information and the at least one symptom identifier received in the second request, the PID filter list from a computer-readable memory; and/or retrieving, by the server based on the particular vehicle identifying information and the at least one symptom identifier received in the next request, the modified PID filter list from a computer-readable memory.

EEE 126 is the non-transitory computer-readable memory of any one of EEE 120 to 125, wherein determining the first display device requested from the first vehicle for display by the first display device an additional PID not included within the PID filter list comprises determining the additional PID was requested within a threshold amount of time after the server receives the second request or after the server transmits the response.

EEE 127 is the non-transitory computer-readable memory of any one of EEE 120 to 126, wherein the first display device is one of multiple display devices registered with the server, wherein generating the modified PID filter list is conditioned on the server determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server has transmitted the PID filter list to the any of the multiple display devices, and wherein n of the $n^{th}$ time comprises a predetermined threshold number greater than one.

EEE 128 is a method for outputting a parameter identifier (PID) filter list, comprising: (i) receiving, at a server, a first set of PID values and a second set of PID values, wherein the first set of PID values are for a particular PID from a first set of vehicles with all diagnostic trouble codes (DTCs) for a particular ECU within each vehicle of first the set of vehicles set to inactive, wherein the second set of PID values are for the particular PID from a second set of vehicles with one or more particular DTCs for the particular ECU within each vehicle of the second set of vehicles set to active, and wherein the first set of vehicles and the second set of vehicles are identifiable by particular vehicle identifying information; (ii) determining, by the server from among the first set of PID values, a range of PID values for the particular PID; (iii) determining, by the server from among the second set of PID values, one or more PID values for the particular PID is outside of the range of PID values for the particular PID by a threshold value; (iv) adding, by the server, the particular PID to a PID filter list in response to determining the one or more PID values for the particular PID is outside of the range of PID values for the particular PID by the threshold value; (v) receiving, at the server, a request sent over a communication network from a display device, wherein the request comprises the particular vehicle identifying information and the particular DTC; (vi) retrieving, by the server based on the particular vehicle identifying information and the particular DTC received in the request, the PID filter list; and (vii) transmitting, by the server over the communication network to the display device, a response to the request, the response comprising the PID filter list.

EEE 129 is the method of EEE 128, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 130 is the method any one of EEE 128 and 129, wherein PID filter list comprises one or more default PIDs before the particular PID is added to the PID filter list and after the particular PID is added to the PID filter list.

EEE 131 is the method of any one of EEE 128 to 130, wherein the response further comprises data indicating the range of PID values for the particular PID.

EEE 132 is the method of any one of EEE 128 to 131, wherein the PID filter list comprises index values into an ordered list of PIDs for vehicles identifiable by the particular vehicle identifying information.

EEE 133 is the method of any one of EEE 128 to 132, wherein determining the one or more PID values for the particular PID is outside of the range of PID values comprises (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 134 is the method of any one of EEE 128 to 133, wherein adding the particular PID to the PID filter list is conditioned on the server determining the one or more PID values for the particular PID comprise at least a threshold number of PID values.

EEE 135 is the method of any one of EEE 128 to 134, wherein the range of PID values for the particular PID comprises a first range of PID values; wherein the server determines each PID value of the first range of PID values was generated in a vehicle of the first set of vehicles while the vehicle is operating in a first operating state, and wherein the response further comprises data indicating the first range of PID values is associated with the first operating state.

EEE 136 is the method of EEE 135, wherein the functions further comprise: determining, by the server from among the first set of PID values, a second range of PID values for the particular PID, wherein the server determines each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 137 is the method of any one of EEE 135 and 136, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 138 is the method of any one of EEE 128 to 137, wherein determining the range of PID values for the particular PID comprises determining a range of values for the particular PID at one, two, three, or four standard deviations of a mean value of PID values for the particular PID within the first set of PID values.

EEE 139 is a server comprising: a network communication interface for communicating with a display device over a communication network; and at least one processor coupled to network communication interface and programmed to: (i) receive, at the server, a first set of PID values and a second set of PID values, wherein the first set of PID values are for a particular PID from a first set of vehicles with all diagnostic trouble code (DTC) for a particular ECU within each vehicle of the set of vehicles set to inactive, wherein the second set of PID values are for the particular PID from a second set of vehicles with one or more particular DTC for the particular ECU within each vehicle of the second set of vehicles set to active, and wherein the first set of vehicles and the second set of vehicles are identifiable by particular vehicle identifying information; (ii) determine, by the server from among the first set of PID values, a range of PID values for the particular PID; (iii) determine, by the server from among the second set of PID values, one or more PID values for the particular PID is outside of the range of PID values for the particular PID by a threshold value; (iv) add, by the server, the particular PID to a PID filter list in response to determining the one or more PID values for the particular PID is outside of the range of PID values for the particular PID by the threshold value; (v) receive, at the server, a request sent over the communication network from a display device, wherein the request comprises the particular vehicle identifying information and the particular DTC; (vi) retrieve, by the server based on the particular vehicle identifying information and the particular DTC received in the request, the PID filter list; and (vii) transmit, by the server over the communication network to the display device, a response to the request, the response comprising the PID filter list.

EEE 140 is the server of EEE 139, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 141 is the server any one of EEE 139 and 140, wherein PID filter list comprises one or more default PIDs before the particular PID is added to the PID filter list and after the particular PID is added to the PID filter list.

EEE 142 is the server of any one of EEE 139 to 141, wherein the response further comprises data indicating the range of PID values for the particular PID.

EEE 143 is the server of any one of EEE 139 to 142, wherein the PID filter list comprises index values into an ordered list of PIDs for vehicles identifiable by the particular vehicle identifying information.

EEE 144 is the server of any one of EEE 139 to 143, wherein determining the one or more PID values for the particular PID is outside of the range of PID values comprises (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 145 is the server of any one of EEE 139 to 144, wherein adding the particular PID to the PID filter list is conditioned on the at least one processor determining the one or more PID values for the particular PID comprise at least a threshold number of PID values.

EEE 146 is the server of any one of EEE 139 to 145, wherein the range of PID values for the particular PID comprises a first range of PID values; wherein the server determines each PID value of the first range of PID values was generated in a vehicle of the first set of vehicles while the vehicle is operating in a first operating state, and wherein the response further comprises data indicating the first range of PID values is associated with the first operating state.

EEE 147 is the server of EEE 146, wherein the at least one processor is further programmed to: determine, from among the first set of PID values, a second range of PID values for the particular PID, wherein the at least one processor determines each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 148 is the server of any one of EEE 146 and 147, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 149 is the server of any one of EEE 139 to 148, wherein the at least one processor being programmed to determine the range of PID values for the particular PID comprises the at least one processor being programmed to determine a range of values for the particular PID at one, two, three, or four standard deviations of a mean value of PID values for the particular PID within the first set of PID values.

EEE 150 is the server of any one of EEE 139 to 149, further comprising: a non-transitory computer-readable memory coupled to the at least one processor, wherein the at least one processor is programmed according to any one of the EEE 139 to 149 by program instructions stored on the non-transitory computer-readable memory.

EEE 151 is a non-transitory computer-readable memory having stored therein instructions executable by one or more processors to cause a server to perform functions comprising: (i) receive, at the server, a first set of PID values and a second set of PID values, wherein the first set of PID values are for a particular PID from a first set of vehicles with all diagnostic trouble code (DTC) for a particular ECU within each vehicle of the set of vehicles set to inactive, wherein the second set of PID values are for the particular PID from a second set of vehicles with one or more particular DTC for the particular ECU within each vehicle of the second set of vehicles set to active, and wherein the first set of vehicles and the second set of vehicles are identifiable by particular vehicle identifying information; (ii) determine, by the server from among the first set of PID values, a range of PID values for the particular PID; (iii) determine, by the server from among the second set of PID values, one or more PID values for the particular PID is outside of the range of PID values for the particular PID by a threshold value; (iv) add, by the server, the particular PID to a PID filter list in response to determining the one or more PID values for the particular PID is outside of the range of PID values for the particular PID by the threshold value; (v) receive, at the server, a request sent over a communication network from a display device, wherein the request comprises the particular vehicle identifying information and the particular DTC; (vi) retrieve, by the server based on the particular vehicle identifying information and the particular DTC received in the request, the PID filter list; and (vii) transmit, by the server over the communication network to the display device, a response to the request, the response comprising the PID filter list.

EEE 152 is the non-transitory computer-readable memory of EEE 151, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 153 is the non-transitory computer-readable memory any one of EEE 151 and 152, wherein PID filter list comprises one or more default PIDs before the particular PID is added to the PID filter list and after the particular PID is added to the PID filter list.

EEE 154 is the non-transitory computer-readable memory of any one of EEE 151 to 153, wherein the response further comprises data indicating the range of PID values for the particular PID.

EEE 155 is the non-transitory computer-readable memory of any one of EEE 151 to 154, wherein the PID filter list comprises index values into an ordered list of PIDs for vehicles identifiable by the particular vehicle identifying information.

EEE 156 is the non-transitory computer-readable memory of any one of EEE 151 to 155, wherein determining the one or more PID values for the particular PID is outside of the range of PID values comprises (i) determining the second set of PID values comprises a first quantity of PIDs, (ii) determining the one or more PID values for the particular PID comprises a second quantify of PIDs, and (iii) determining the second quantity of PIDs exceeds a threshold percentage of the first quantity of PIDs.

EEE 157 is the non-transitory computer-readable memory of any one of EEE 151 to 156, wherein adding the particular PID to the PID filter list is conditioned on the server determining the one or more PID values for the particular PID comprise at least a threshold number of PID values.

EEE 158 is the non-transitory computer-readable memory of any one of EEE 151 to 157, wherein the range of PID values for the particular PID comprises a first range of PID values; wherein the server determines each PID value of the first range of PID values was generated in a vehicle of the first set of vehicles while the vehicle is operating in a first operating state, and wherein the response further comprises data indicating the first range of PID values is associated with the first operating state.

EEE 159 is the non-transitory computer-readable memory of EEE 158, wherein the functions further comprise: determining, by the server from among the first set of PID values, a second range of PID values for the particular PID, wherein the server determines each PID value of the second range of PID values was generated in a vehicle of the first set of vehicles while the vehicle is operating in a second operating state different than the first operating state, and wherein the response further comprises the second range of PID values and data indicating the second range of PID values is associated with the second operating state.

EEE 160 is the non-transitory computer-readable memory of any one of EEE 158 and 159, wherein the first operating state comprises a first engine revolutions per minute (RPM) value, a first engine load value, and/or a first engine temperature value, wherein the second operating state comprises a second engine RPM value if the first operating state comprise the first RPM value, wherein the second operating state comprises a second engine load value if the first operating state comprise the first engine load value, and wherein the second operating state comprises a second engine temperature value if the first operating state comprises the first engine temperature value.

EEE 161 is the non-transitory computer-readable memory of any one of EEE 151 to 160, wherein determining the range of PID values for the particular PID comprises determining a range of values for the particular PID at one, two, three, or four standard deviations of a mean value of PID values for the particular PID within the first set of PID values.

EEE 162 is a method for providing a modified parameter identifier (PID) filter list to a display device, comprising: (i) receiving, at a server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmitting, by the server over the communication network to the first display device, a response to the first request, the response to the first request comprising a PID filter list; (iii) determining, by the server, the first display device requested from the first vehicle for display by the first display device an additional PID not included within the PID filter list; (iv) generating, by the server, a modified PID filter list by adding the additional PID to the PID filter list; (v) receiving, at the server after generating the modified PID filter list, a next request sent over the communication network from a second display device, wherein the next request comprises the particular vehicle identifying information and the at least one symptom identifier; and (vi) transmitting, by the server over the communication network to the second display device, a response to the next request, the response to the next request comprising the modified PID filter list.

EEE 163 is the method of EEE 162, wherein the at least one symptom identifier comprises at least one diagnostic trouble code that each vehicle of the particular set of vehicles can set to active.

EEE 164 is the method of any one of EEE 162 and 163, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 165 is the method of any one of EEE 162 to 164, wherein the PID filter list and the modified PID filter list comprise index values into an ordered list of PIDs for vehicles identifiable by the particular vehicle identifying information.

EEE 166 is the method of any one of EEE 162 to 165, wherein the second display device is the first display device.

EEE 167 is the method of any one of EEE 162 to 166, further comprising: receiving, at the server, PID data provided to the first display device from the first vehicle; and determining, by the server, the PID data provided to the first display device from the first vehicle and subsequently received by the server includes PID data for the additional PID to be displayed by the first display device.

EEE 168 is the method of any one of EEE 162 to 167, further comprising: receiving, at the server, data indicating the first display device received an input requesting display of the additional PID, wherein the server determines the first display device requested from the first vehicle for display by the first display device the additional PID not included within the PID filter list based at least in part on the data indicating the first display device received an input requesting display of the additional PID.

EEE 169 is the method of any one of EEE 162 to 168, further comprising: retrieving, by the server based on the particular vehicle identifying information and the at least one symptom identifier received in the first request, the PID filter list from a computer-readable memory; and/or retrieving, by the server based on the particular vehicle identifying information and the at least one symptom identifier received in the next request, the modified PID filter list from a computer-readable memory.

EEE 170 is the method of any one of EEE 162 to 169, wherein determining the first display device requested from the first vehicle for display by the first display device an additional PID not included within the PID filter list comprises determining the additional PID was requested within a threshold amount of time after the server receives the first request or after the server transmits the response.

EEE 171 is the method of any one of EEE 162 to 170, wherein the first display device is one of multiple display devices registered with the server, wherein generating the modified PID filter list is conditioned on the server determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server has transmitted the PID filter list to the any of the multiple display devices, and wherein n of the $n^{th}$ time comprises a predetermined threshold number greater than one.

EEE 172 is a server comprising: a network communication interface for communicating with a display device over a communication network; and at least one processor coupled to network communication interface and programmed to: (i) receive, at a server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmit, by the server over the communication network to the first display device, a response to the first request, the response to the first request comprising a PID filter list; (iii) determine, by the server, the first display device requested from the first vehicle for display by the first display device an additional PID not included within the PID filter list; (iv) generate, by the server, a modified PID filter list by adding the additional PID to the PID filter list; (v) receive, at the server after generating the modified PID filter list, a next request sent over the communication network from a second display device, wherein the next request comprises the particular vehicle identifying information and the at least one symptom identifier; and (vi) transmit, by the server over the communication network to the second display device, a response to the next request, the response to the next request comprising the modified PID filter list.

EEE 173 is the server of EEE 172, wherein the at least one symptom identifier comprises at least one diagnostic trouble code that each vehicle of the particular set of vehicles can set to active.

EEE 174 is the server of any one of EEE 172 and 173, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 175 is the server of any one of EEE 172 to 174, wherein the PID filter list and the modified PID filter list comprise index values into an ordered list of PIDs for vehicles identifiable by the particular vehicle identifying information.

EEE 176 is the server of any one of EEE 172 to 175, wherein the second display device is the first display device.

EEE 177 is the server of any one of EEE 172 to 176, wherein the at least one processor is further programmed to: receive PID data provided to the first display device from the first vehicle; and determine the PID data provided to the first display device from the first vehicle and subsequently received by the server includes PID data for the additional PID to be displayed by the first display device.

EEE 178 is the server of any one of EEE 172 to 177, wherein the at least one processor is further programmed to: (i) receive data indicating the first display device received an input requesting display of the additional PID, and (ii) determine the first display device requested from the first vehicle for display by the first display device the additional PID not included within the PID filter list based at least in part on the data indicating the first display device received an input requesting display of the additional PID.

EEE 179 is the server of any one of EEE 172 to 178, wherein the at least one processor is further programmed to: retrieve, based on the particular vehicle identifying information and the at least one symptom identifier received in the first request, the PID filter list from a computer-readable memory; and/or retrieve, based on the particular vehicle identifying information and the at least one symptom identifier received in the next request, the modified PID filter list from a computer-readable memory.

EEE 180 is the server of any one of EEE 172 to 179, wherein the at least one processor being programmed to determine the first display device requested from the first vehicle for display by the first display device an additional PID not included within the PID filter list comprises the at least one processor being programmed to determine the additional PID was requested within a threshold amount of time after the server receives the first request or after the server transmits the response.

EEE 181 is the server of any one of EEE 172 to 180, wherein the first display device is one of multiple display devices registered with the server, wherein generating the modified PID filter list is conditioned on the server determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server has transmitted the PID filter list to the any of the multiple display devices, and wherein n of the $n^{th}$ time comprises a predetermined threshold number greater than one.

EEE 182 is the server of any one of EEE 172 to 181, further comprising: a non-transitory computer-readable memory coupled to the at least one processor, wherein the at least one processor is programmed according to the any one of the EEE 172 to 181 by program instructions stored on the non-transitory computer-readable memory.

EEE 183 is a non-transitory computer readable memory having stored therein instructions executable by one or more processors to cause a server to perform functions comprising: (i) receive, at the server, a first request sent over a communication network from a first display device connected to a first vehicle, wherein the first request comprises particular vehicle identifying information and at least one symptom identifier, wherein the particular vehicle identifying information identifies a particular set of vehicles, wherein the particular set of vehicles comprises the first vehicle, and wherein the at least one symptom identifier comprises a symptom that each vehicle of the particular set of vehicles can exhibit; (ii) transmit, by the server over the communication network to the first display device, a response to the first request, the response to the first request comprising a PID filter list; (iii) determine, by the server, the first display device requested from the first vehicle for display by the first display device an additional PID not included within the PID filter list; (iv) generate, by the server, a modified PID filter list by adding the additional PID to the PID filter list; (v) receive, at the server after generating the modified PID filter list, a next request sent over the communication network from a second display device, wherein the next request comprises the particular vehicle identifying information and the at least one symptom identifier; and (vi) transmit, by the server over the communication network to the second display device, a response to the next request, the response to the next request comprising the modified PID filter list.

EEE 184 is the non-transitory computer readable memory of EEE 183, wherein the at least one symptom identifier comprises at least one diagnostic trouble code that each vehicle of the particular set of vehicles can set to active.

EEE 185 is the non-transitory computer readable memory of any one of EEE 183 and 184, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

EEE 186 is the non-transitory computer readable memory of any one of EEE 183 to 185, wherein the PID filter list and the modified PID filter list comprise index values into an ordered list of PIDs for vehicles identifiable by the particular vehicle identifying information.

EEE 187 is the non-transitory computer readable memory of any one of EEE 183 to 186, wherein the second display device is the first display device.

EEE 188 is the non-transitory computer readable memory of any one of EEE 183 to 187, wherein the functions further comprise: receiving, at the server, PID data provided to the first display device from the first vehicle; and determining, by the server, the PID data provided to the first display device from the first vehicle and subsequently received by the server includes PID data for the additional PID to be displayed by the first display device.

EEE 189 is the non-transitory computer readable memory of any one of EEE 183 to 188, wherein the functions further comprise: receiving, at the server, data indicating the first display device received an input requesting display of the additional PID, wherein the server determines the first display device requested from the first vehicle for display by the first display device the additional PID not included within the PID filter list based at least in part on the data indicating the first display device received an input requesting display of the additional PID.

EEE 190 is the non-transitory computer readable memory of any one of EEE 183 to 189, wherein the functions further comprise: retrieving, by the server based on the particular vehicle identifying information and the at least one symptom identifier received in the first request, the PID filter list from a computer-readable memory; and/or retrieving, by the server based on the particular vehicle identifying information and the at least one symptom identifier received in the next request, the modified PID filter list from a computer-readable memory.

EEE 191 is the non-transitory computer readable memory of any one of EEE 183 to 190, wherein determining the first display device requested from the first vehicle for display by the first display device an additional PID not included within the PID filter list comprises determining the additional PID was requested within a threshold amount of time after the server receives the first request or after the server transmits the response.

EEE 192 is the non-transitory computer readable memory of any one of EEE 183 to 191, wherein the first display device is one of multiple display devices registered with the server, wherein generating the modified PID filter list is conditioned on the server determining the first display device requesting from the first vehicle for display by the first display device the additional PID not included within the PID filter list is an $n^{th}$ time any of the multiple display devices has requested for display on the any of the multiple display devices the additional PID not included within the PID filter list after the server has transmitted the PID filter list to the any of the multiple display devices, and wherein n of the $n^{th}$ time comprises a predetermined threshold number greater than one.

We claim:

1. A method at a server for outputting a parameter identifier (PID) filter list, comprising:
receiving, at a server, repair order (RO) data, wherein the RO data comprises data from one or more ROs that indicate particular vehicle identifying information, at least one symptom identifier, and a particular vehicle component;
determining, at the server, symptom-to-parameter-identifier (PID) mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier;
determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles;
receiving, at the server, a request sent over a communication network from a display device, wherein the request comprises the particular vehicle identifying information and the at least one symptom identifier; and
transmitting, by the server over the communication network to the display device, a response to the request, the response comprising the PID filter list.

2. The method of claim 1,
wherein the at least one symptom identifier comprises at least one diagnostic trouble code (DTC) that each vehicle of the set of vehicles can set active, and
wherein the symptom-based subset of PIDs from the set of available PIDs for the set of vehicles comprises a DTC-based subset of PIDs from the set of available PIDs for the set of vehicles.

3. The method of claim 1, wherein the particular vehicle identifying information comprises a vehicle manufacturer identifier, and (i) at least one vehicle model year identifier and at least one vehicle model identifier, or (ii) at least one vehicle model year identifier, at least one vehicle model identifier, and at least one engine identifier.

4. The method of claim 1, further comprising:
determining, at the server, symptom-to-component-test mapping data based on the received RO data and component-to-component-test mapping data, wherein the symptom-to-component-test mapping data maps one or more component tests from a set of available component tests for the set of vehicles identifiable by the particular vehicle identifying information to the at least one symptom identifier;
determining, at the server based on the set of available component tests for the set of vehicles and the symptom-to-component-test mapping data, a component test filter list, wherein the component test filter list is associated with the particular vehicle identifying information and the at least one symptom identifier, and wherein the component test filter list indicates a symptom-based subset of component tests from the set of available component tests for the set of vehicles; and
retrieving, by the server based on the particular vehicle identifying information and the at least one symptom identifier received in the request, the component test filter list;
wherein the response to the request comprises the component test filter list.

5. The method of claim 4,
wherein the at least one symptom identifier comprises at least one diagnostic trouble code (DTC) that each vehicle of the set of vehicles can set active,
wherein the symptom-based subset of PIDs from the set of available PIDs for the set of vehicles comprises a DTC-based subset of PIDs from the set of available PIDs for the set of vehicles, and
wherein the symptom-based subset of component tests from the set of available component tests for the set of vehicles comprises a DTC-based subset of component tests from the set of available component tests for the set of vehicles.

6. The method of claim 4, wherein the component test filter list comprises a component test performable by an oscilloscope of the display device or a multimeter of the display device.

7. The method of claim 4, wherein the PID filter list comprises index values into an ordered list of PIDs for vehicles identifiable by the particular vehicle identifying information, and/or the component test filter list comprises index values into an ordered list of component tests for vehicles identifiable by the particular vehicle identifying information.

8. The method of claim 4, further comprising:
determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier;
determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and retrieving, by the server based on the particular vehicle identifying information and the symptom received in the request, the functional test filter list, wherein the response to the request comprises the functional test filter list.

9. The method of claim 8, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, wherein the symptom-based subset of component tests from the set of available component tests for the set of vehicles comprises a DTC-based subset of component tests from the set of available component tests for the set of vehicles, and wherein the symptom-based subset of functional tests from the set of available functional tests for the set of vehicles comprises a DTC-based subset of functional tests from the set of available functional tests for the set of vehicles.

10. The method of claim 8, wherein the functional test filter list indicates a functional test that comprises transmission of a vehicle data message from the display device to the vehicle.

11. The method of claim 8, wherein the PID filter list comprises index values into an ordered list of PIDs, component tests, and functional tests for vehicles identifiable by the particular vehicle identifying information.

12. The method of claim 1, further comprising:

determining, at the server, symptom-to-functional-test mapping data based on the received RO data and component-to-functional-test mapping data, wherein the symptom-to-functional-test mapping data maps one or more functional tests from a set of available functional tests for the set of vehicles identifiable by the particular vehicle identifying information to the at least one symptom identifier;

determining, at the server based on the set of available functional tests for the set of vehicles and the symptom-to-functional-test mapping data, a functional test filter list, wherein the functional test filter list is associated with the particular vehicle identifying information and the at least one symptom identifier, and wherein the functional test filter list indicates a symptom-based subset of functional tests from the set of available functional tests for the set of vehicles; and retrieving, by the server based on the particular vehicle identifying information and the symptom received in the request, the functional test filter list, wherein the response to the request comprises the functional test filter list.

13. The method of claim 12, wherein the at least one symptom identifier comprises at least one diagnostic trouble code (DTC) that each vehicle of the set of vehicles can set active, wherein the symptom-based subset of PIDs from the set of available PIDs for the set of vehicles comprises a DTC-based subset of PIDs from the set of available PIDs for the set of vehicles, and wherein the symptom-based subset of functional tests from the set of available functional tests for the set of vehicles comprises a DTC-based subset of functional tests from the set of available functional tests for the set of vehicles.

14. The method of claim 12, wherein the functional test filter list indicates a functional test that comprises transmission of a vehicle data message from the display device to the vehicle.

15. The method of claim 12, wherein the PID filter list comprises index values into an ordered list of PIDs and functional tests for vehicles identifiable by the particular vehicle identifying information.

16. The method of claim 1, determining, at the server, symptom-to-reset-procedure mapping data based on the received RO data and component-to-reset-procedure mapping data, wherein the symptom-to-reset-procedure mapping data maps one or more reset procedures from a set of available reset procedures for the set of vehicles identifiable by the particular vehicle identifying information to the at least one symptom identifier;

determining, at the server based on the set of available reset procedures for the set of vehicles and the symptom-to-reset-procedure mapping data, a reset procedure filter list, wherein the reset procedure filter list is associated with the particular vehicle identifying information and the at least one symptom identifier, and wherein the reset procedure filter list indicates a symptom-based subset of reset procedures from the set of available reset procedures for the set of vehicles; and retrieving, by the server based on the particular vehicle identifying information and the symptom received in the request, the reset procedure filter list;

wherein the response to the request comprises the reset procedure filter list.

17. The method of claim 16, wherein the at least one symptom identifier comprises at least one diagnostic trouble code (DTC) that each vehicle of the set of vehicles can set active, wherein the symptom-based subset of reset procedures from the set of available reset procedures for the set of vehicles comprises a DTC-based subset of reset procedures from the set of available reset procedures for the set of vehicles, and wherein the symptom-based subset of reset procedures from the set of available reset procedures for the set of vehicles comprises a DTC-based subset of reset procedures from the set of available reset procedures for the set of vehicles.

18. The method of claim 16, wherein the reset procedure filter list comprises index values into an ordered list of reset procedures for vehicles identifiable by the particular vehicle identifying information.

19. The method of claim 16, wherein the response comprises a first response and a second response, wherein the first response comprises the PID filter list and the second response comprises the reset procedure filter list, and wherein transmitting the response comprising the PID filter list comprises transmitting the first response, the method further comprising:

establishing, at the server, a diagnostic session for the display device with respect to the first response and the second response;

determining, at the server, a vehicle repair has occurred with respect to the diagnostic session; and transmitting, by the server over the communication network to the display device, the second response in response to determining the vehicle repair has occurred with respect to the diagnostic session.

20. The method of claim 19, wherein determining the vehicle repair has occurred comprises determining a threshold amount of time has elapsed since the first response was transmitted to the display device.

21. The method of claim 1, wherein determining the PID filter list comprises modifying an existing PID filter list, wherein the existing PID filter list comprises a different subset of PIDs from the set of available PIDs for the set of vehicles, wherein the existing PID filter list is associated with the particular vehicle identifying information and the at least one symptom identifier, and wherein modifying the existing PID filter list includes adding at least one PID from the set of available PIDs for the set of vehicles to the existing PID filter list and/or removing at least one PID from the existing PID filter list.

22. The method of claim 1, wherein the RO data comprises a subset of a set of RO data, wherein the set of RO data comprises data from multiple ROs that indicate (i) the particular vehicle identifying information or different vehicle identifying information, (ii) the at least one symptom identifier or a different symptom, and (iii) the particular vehicle component or a different vehicle component, and wherein receiving the RO data comprises receiving the set of RO data, the method further comprising:

determining, at the processor based on the set of RO data, the subset of RO data by determining the set of RO data indicates the particular vehicle component is a most-replaced component and the at least one symptom identifier is a most-reported symptom for vehicles of the set of vehicles identifiable by the particular vehicle identifying information.

23. The method of claim 1, wherein the PID filter list comprises index values into an ordered list of PIDs for vehicles identifiable by the particular vehicle identifying information.

24. The method of claim 1, further comprising:

determining, at the server, a vehicle component related to the particular vehicle component;

determining, at the server, at least one PID to add to the PID filter list based on component-to-PID mapping data that maps one or more PIDs from the set of available PIDs for the set of vehicles identifiable by the particular vehicle identifying information to the vehicle component related to the particular vehicle component; and adding, by the server, the at least one PID to the PID filter list.

25. The method of claim 24, wherein the server determines the vehicle component related to the particular vehicle component by searching data within a memory that identifies vehicle components of the vehicles of the set of vehicles in a hierarchical format based on systems and/or subsystems of the vehicles of the set of vehicles.

26. A server comprising:

a network communication interface for communicating with a display device over a communication network; and at least one processor coupled to network communication interface and programmed to:

receive, at the server, repair order (RO) data, wherein the RO data comprises data from one or more ROs that indicate particular vehicle identifying information, at least one symptom identifier, and a particular vehicle component;

determine, at the server, symptom-to-parameter-identifier (PID) mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier;

determine, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles;

receive, at the server, a request sent over a communication network from a display device, wherein the request comprises the particular vehicle identifying information and the at least one symptom identifier; and transmit, by the server over the communication network to the display device, a response to the request, the response comprising the PID filter list.

27. The server of claim 26, further comprising:

a non-transitory computer-readable memory coupled to the at least one processor, wherein the at least one processor is programmed according to claim 26 by program instructions stored on the non-transitory computer-readable memory.

28. A non-transitory computer-readable memory having stored therein instructions executable by one or more processors to cause a server to perform functions comprising:

receiving, at the server, repair order (RO) data, wherein the RO data comprises data from one or more ROs that indicate particular vehicle identifying information, at least one symptom identifier, and a particular vehicle component;

determining, at the server, symptom-to-parameter-identifier (PID) mapping data based on the received RO data and component-to-PID mapping data, wherein the component-to-PID mapping data maps one or more PIDs from a set of available PIDs for a set of vehicles identifiable by the particular vehicle identifying information to the particular vehicle component, and wherein the symptom-to-PID mapping data maps the one or more PIDs from the set of available PIDs for the set of vehicles identifiable by the particular vehicle identifying information to the at least one symptom identifier;

determining, at the server based on the set of available PIDs for the set of vehicles and the symptom-to-PID mapping data, a PID filter list, wherein the PID filter list is associated with the particular vehicle identifying information and the at least one symptom identifier, and wherein the PID filter list indicates a symptom-based subset of PIDs from the set of available PIDs for the set of vehicles;

receiving, at the server, a request sent over a communication network from a display device, wherein the request comprises the particular vehicle identifying information and the at least one symptom identifier; and transmitting, by the server over the communication network to the display device, a response to the request, the response comprising the PID filter list.

* * * * *